United States Patent
Duan et al.

(10) Patent No.: US 12,479,850 B2
(45) Date of Patent: Nov. 25, 2025

(54) COMPOUND HAVING AXL AND C-MET KINASE INHIBITORY ACTIVITY, PREPARATION THEREOF AND APPLICATION THEREOF

(71) Applicant: Shanghai Institute of Materia Medica, Chinese Academy of Sciences, Pudong Shanghai (CN)

(72) Inventors: Wenhu Duan, Pudong Shanghai (CN); Meiyu Geng, Pudong Shanghai (CN); Hefeng Zhang, Pudong Shanghai (CN); Jian Ding, Pudong Shanghai (CN); Jing Ai, Pudong Shanghai (CN); Xia Peng, Pudong Shanghai (CN); Yinchun Ji, Pudong Shanghai (CN)

(73) Assignee: SHANGHAI INSTITUTE OF MATERIA MEDICA, CHINESE ACADEMY OF SCIENCES, Shanghai (CN)

( * ) Notice: Subject to any disclaimer, the term of this patent is extended or adjusted under 35 U.S.C. 154(b) by 805 days.

(21) Appl. No.: 17/640,424

(22) PCT Filed: Sep. 3, 2020

(86) PCT No.: PCT/CN2020/113265
§ 371 (c)(1),
(2) Date: Mar. 4, 2022

(87) PCT Pub. No.: WO2021/043217
PCT Pub. Date: Mar. 11, 2021

(65) Prior Publication Data
US 2022/0324869 A1    Oct. 13, 2022

(30) Foreign Application Priority Data
Sep. 6, 2019  (CN) .......................... 201910843097.5

(51) Int. Cl.
| C07D 487/04 | (2006.01) |
| A61P 35/00 | (2006.01) |
| C07D 401/14 | (2006.01) |
| C07D 405/14 | (2006.01) |
| C07F 7/08 | (2006.01) |

(52) U.S. Cl.
CPC ............ *C07D 487/04* (2013.01); *A61P 35/00* (2018.01); *C07D 401/14* (2013.01); *C07D 405/14* (2013.01); *C07F 7/0832* (2013.01)

(58) Field of Classification Search
CPC ..... A61P 35/00; C07D 401/12; C07D 401/14; C07D 403/12; C07D 405/14; C07D 471/04; C07D 487/04; C07D 498/04; C07F 7/0812; C07F 7/0832
See application file for complete search history.

(56) References Cited

FOREIGN PATENT DOCUMENTS

| CN | 103958497 A | 7/2014 |
| CN | 106029661 A | 10/2016 |
| CN | 106543145 A | 3/2017 |
| CN | 109348715 A | 2/2019 |
| CN | 110041316 A * | 7/2019 ......... A61K 31/4709 |
| WO | 2019101178 A1 | 5/2019 |
| WO | 2020042618 A1 | 3/2020 |
| WO | 2020047184 A1 | 3/2020 |

OTHER PUBLICATIONS

Kollar et. al. "Functionalisation of the uracil ring via palladium-catalysed aminocarbonylation", Tetrahedron, 75, 4632-4639 (Year: 2019).*
CAS Registry File (2332978-28-4, obtained from the internet Jan. 17, 2025, entered into STN Jun. 14, 2019) (Year: 2019).*
Machine Translation of CN110041316A (Year: 2019).*
Office Action issued May 16, 2023 in JP Application No. 2022-514985 (machine English translation).
Int'l Search Report issued Nov. 30, 2020 in Int'l Application No. PCT/CN2020/113265.

* cited by examiner

*Primary Examiner* — Jeffrey H Murray
*Assistant Examiner* — Daniel John Burkett
(74) *Attorney, Agent, or Firm* — Panitch Schwarze Belisario & Nadel LLP

(57) ABSTRACT

A compound having Axl and c-Met kinase inhibitory activity, a preparation method therefor and an application thereof are provided. Specifically, provided herein are a compound having the structure represented by formula (I), a preparation method therefor and an application thereof in the preparation of a medication for the treatment and/or prevention of tumor-associated diseases and/or kinase-related diseases.

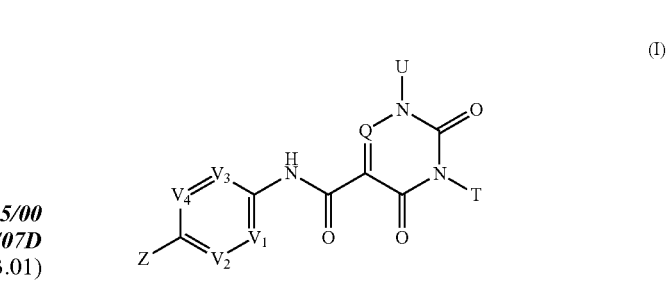

7 Claims, No Drawings

COMPOUND HAVING AXL AND C-MET KINASE INHIBITORY ACTIVITY, PREPARATION THEREOF AND APPLICATION THEREOF

CROSS-REFERENCE TO RELATED APPLICATIONS

This application is a Section 371 of International Application No. PCT/CN2020/113265, filed Sep. 3, 2020, which was published in the Chinese language on Mar. 11, 2021, under International Publication No. WO 2021/043217 A1, which claims priority under 35 U.S.C. § 119(b) to Chinese Application No. 201910843097.5, filed Sep. 6, 2019, the disclosure of each of which is incorporated herein by reference in its entirety.

TECHNICAL FIELD

The invention relates to pharmaceutical field, in particular to compounds having Axl and c-Met kinase inhibitory activity, preparation thereof and application thereof.

BACKGROUND ART

Protein kinase is a protein (enzyme) that regulates various cellular functions by phosphorylation of specific amino acids on a protein. Proteins regulate their activity and binding ability to other components through conformational changes. The activity of a protein kinase refers to the rate at which a kinase binds a phosphate group to a substrate, and the rate can be determined by detecting the amount of substrate converted to a product over a period of time. Phosphorylation of the substrate occurs at the activation site of the protein kinase.

Tyrosine kinase is a protein enzyme that catalyzes the transfer of adenosine triphosphate to a protein tyrosine residue. These kinases play an important role in growth factor-mediated cell proliferation, differentiation and migration.

Axl (also known as Ufo, Ark or Tyro7) is a receptor tyrosine kinase, which forms the TAM subfamily of receptor tyrosine kinases together with Tyro3 and Mer. The protein molecule encoded by growth arrest specific gene 6 (Gas6) is one of the common ligands of TAM subfamily members. The activation of Axl is carried out by stopping the binding of specific protein 6 (Gas6) by its homologous protein ligand growth, by homodimerization of its extracellular domain or crosstalk through interleukin IL-15 receptor or HER2. Axl plays an important regulatory role in regulating the body's inflammatory immune response, maintaining the homeostasis of the body's phagocytosis and regulating the differentiation and maturation of NK cells. Altered expression of the Axl gene has been demonstrated in various human cancers. Abnormal expression of Axl activates anti-tumor cell apoptosis, promotes tumor cell invasion and metastasis, promotes tumor angiogenesis, and promotes the occurrence and development of tumors in multiple links. In particular, recent studies have shown that the dimer produced by Axl overexpression and binding between Axl and EGFR is an important reason for the acquired resistance of tumor cells to EGFR inhibitors. The combination of Axl inhibitors in preclinical studies can effectively overcome the resistance of EGFR inhibitors. In addition, abnormal activation of Axl overexpression is also closely related to drug resistance of other targeted inhibitors and chemotherapeutic drugs, suggesting that Axl may have a wide range of application space for combination drugs. Unlike other kinases, Axl is highly expressed in macrophages and dendritic cells in the tumor microenvironment, and can synergistically promote tumor progression by interacting with tumor cells and other stromal cells. Therefore, in recent years, the research and development of targeted Axl inhibitors has become the frontier and hot spot of anti-tumor drug research. Small molecule inhibitors developed for them have shown effects in tumor therapy.

c-Met, aka the tyrosine protein kinase Met or HGFR, was originally identified as the MET oncogene in osteosarcoma cell lines treated with chemical carcinogens. c-Met protein can transform non-tumorigenic cells and endow them with invasive and metastatic properties. The carcinogenic potential is the result of spontaneous dimerization and constitutive activation of c-Met. The abnormal expression of HGF and MET is related to the occurrence and poor prognosis of a wide range of solid tumors including breast cancer, prostate cancer, thyroid cancer, lung cancer, etc. Studies in vitro and in vivo have shown that the increase and imbalance of c-Met activation cause a wide range of biological responses related to malignant phenotypes. These responses include increased mobility/invasion, increased tumorigenicity, enhanced angiogenesis, etc. Once the abnormally activated and overexpressed HGF/c-Met signaling pathway in tumor cells is blocked, tumor cells will have a series of changes such as cell morphology change, decreased value-added, decreased tumorigenicity, and decreased invasion ability.

Other pathological conditions related to protein kinases also include psoriasis, cirrhosis, diabetes, angiogenesis, restenosis, ophthalmic diseases, rheumatoid arthritis and other inflammatory diseases, immune diseases, cardiovascular diseases such as arteriosclerosis and various kidney diseases.

There is a demand for Axl and c-Met kinase inhibitors used as pharmaceutical formulations.

SUMMARY OF THE INVENTION

The object of the present invention is to provide a compound of formula (I), a preparation method thereof, and its use in anti-tumor.

In the first aspect of the present invention, it provides a compound of formula (I) or its stereoisomer, geometric isomer, tautomer, its pharmaceutically acceptable salt, its prodrug, its hydrate or solvate,

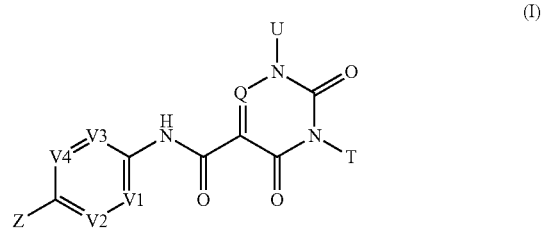

wherein, T is selected from the group consisting of substituted or unsubstituted C3-C11 cycloalkyl, substituted or unsubstituted 3-11 membered heterocycloalkyl, substituted or unsubstituted 5-10 membered aryl, and substituted or unsubstituted 5-10 membered heteroaryl; the "substituted" means that one or more hydrogen atoms on the group is substituted by a substituent selected from the group consisting of further substituted or unsubstituted C1-C6 alkyl, further substituted or unsubstituted C3-C8 cycloalkyl, halogen, hydroxyl, mercapto, cyano, amino, further substituted or unsubstituted C1-C6 alkoxy, further substituted or unsubstituted C1-C6 alkylamino and further substituted or unsubstituted C1-C6 alkylthio;

U is selected from the group consisting of substituted or unsubstituted C1-C6 alkyl, substituted or unsubstituted C2-C6 alkenyl, substituted or unsubstituted C2-C6 alkynyl, substituted or unsubstituted C3-C11 cycloalkyl, substituted or unsubstituted 3-11 membered heterocycloalkyl, substituted or unsubstituted 5-10 membered aryl, and substituted or unsubstituted 5-10 membered heteroaryl; the "substituted" means that one or more hydrogen atoms on the group is substituted by a substituent selected from the group consisting of hydroxy, further substituted or unsubstituted C1-C6 alkyl, further substituted or unsubstituted C1-C6 alkoxy, further substituted or unsubstituted C1-C6 alkylamino, further substituted or unsubstituted C1-C6 alkylthio, further substituted or unsubstituted C2-C6 alkenyl, further substituted or unsubstituted C2-C6 alkynyl, further substituted or unsubstituted C3-C11 cycloalkyl, further substituted or unsubstituted 5-10 membered aryl, further substituted or unsubstituted 3-11 membered heterocycloalkyl, further substituted or unsubstituted 5-10 membered heteroaryl, —C(=O)R$^a$, —C(=O)OR$^a$, —C(=O)NR$^a$R$^b$, —S(=O)$_2$R$^a$ and —S(=O)$_2$NR$^a$R$^b$;

Q is selected from N or C—R$^c$;

V1, V2, V3 and V4 are the same or different, and are each independently selected from N or C—R$^d$;

Z is selected from a group shown in formula (II), formula (III), formula (IV) or formula (V):

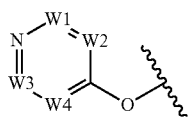

(II)

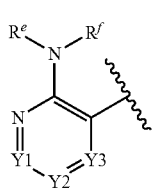

(III)

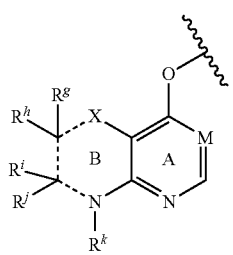

(IV)

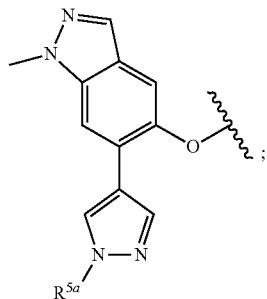

(V)

W1, W2, W3, W4, Y1, Y2 and Y3 are at each occurrence independently selected from N or C—R$^{1a}$.

M is C—H or N;

each bond represented by a dotted line is selected from the group consisting of single bond, and double bond;

X is absent, or X is C—R$^1$, N—R$^1$, O, S, and N;

R$^g$, R$^h$, R$^i$, R$^j$ and R$^k$ are at each occurrence independently present or absent, provided that the number of the present R$^g$, R$^h$, R$^i$, R$^j$ and R$^k$ makes that the valence of each atom in the B ring is maintained; or, R$^g$ and R$^h$ together, or R$^i$ and R$^j$ together, form =O; or, either R$^g$ or R$^i$ together with the atoms to which they are attached can form substituted or unsubstituted 5-10 membered aryl, substituted or unsubstituted C3-C11 cycloalkyl, substituted or unsubstituted 3-15 membered heterocycloalkyl, or substituted or unsubstituted 5-10 membered heteroaryl, and the new ring formed is fused with the B ring;

R$^g$, R$^h$, R$^i$, R$^j$, R$^k$, R$^l$ and R$^{5a}$ are at each occurrence independently selected from the group consisting of H, substituted or unsubstituted C1-C6 alkyl, substituted or unsubstituted C2-C6 alkenyl, substituted or unsubstituted C2-C6 alkynyl, substituted or unsubstituted C3-C11 cycloalkyl, substituted or unsubstituted 3-11 membered heterocycloalkyl, substituted or unsubstituted 5-10 membered aryl, substituted or unsubstituted 5-10 membered heteroaryl, halogen, —CN, —C(=O)R$^m$, —C(=O)OR$^m$, —C(=O)NR$^m$R$^n$, —NC, —NO$_2$, —NR$^m$R$^n$, —NR$^m$C(=O)R$^n$, —NR$^m$(C=O)OR$^n$, —NR$^m$(C=O)NR$^n$R$^o$, —NR$^m$(S=O)$_2$R$^n$, —NR$^m$(S=O)$_2$NR$^n$R$^o$, —OR$^m$, —OCN, —OC(=O)R$^m$, —OC(=O)NR$^m$R$^n$, —OC(=O)OR$^m$ and —S(=O)$_2$NR$^m$R$^n$; the "substituted" means that one or more hydrogen atoms on the group is substituted by a substituent selected from the group consisting of further substituted or unsubstituted C1-C6 alkyl, further substituted or unsubstituted C1-C6 alkoxy, further substituted or unsubstituted C1-C6 alkylamino, further substituted or unsubstituted C1-C6 alkylthio, further substituted or unsubstituted C2-C6 alkenyl, further substituted or unsubstituted C2-C6 alkynyl, further substituted or unsubstituted C3-C11 cycloalkyl, further substituted or unsubstituted 5-10 membered aryl, further substituted or unsubstituted 3-11 membered heterocycloalkyl, further substituted or unsubstituted 5-10 membered heteroaryl, —C(=O)R$^m$, —C(=O)OR$^m$, —C(=O)NR$^m$R$^n$, —S(=O)$_2$R$^m$ and —S(=O)$_2$NR$^m$R$^n$;

each R$^{1a}$ is independently selected from the group consisting of H, substituted or unsubstituted C1-C6 alkyl, substituted or unsubstituted C2-C6 alkenyl, substituted or unsubstituted C2-C6 alkynyl, substituted or unsubstituted C3-C11 cycloalkyl, substituted or unsubstituted 3-11 membered heterocycloalkyl, substituted or unsubstituted 5-10 membered aryl, substituted or unsubstituted 5-10 membered heteroaryl, halogen, —CN, —C(=O)R$^m$, —C(=O)OR$^m$, —C(=O)NR$^m$R$^n$, —NC, —NO$_2$, —OR$^m$, —OCN, —OC(=O)R$^m$, —OC(=O)NR$^m$R$^n$, —OC(=O)OR$^m$, and —S(=O)$_2$NR$^m$R$^n$; the "substituted" means that one or more hydrogen atoms on the group is substituted by a substituent selected from the group consisting of further substituted or unsubstituted C1-C6 alkyl, further substituted or unsubstituted C2-C6 alkenyl, further substituted or unsubstituted C2-C6 alkynyl, halogen, further substituted or unsubstituted —(CH$_2$)$_t$—(C3-C11 cycloalkyl), further substituted or unsubstituted —(CH$_2$)$_t$-(3-11 membered heterocycloalkyl), further substituted or unsubstituted —(CH$_2$)$_t$—CN, further substituted or unsubstituted —(CH$_2$)$_t$—OR$^m$, further substituted or unsubstituted —(CH$_2$)$_t$—NR$^p$R$^q$, further substituted or unsubstituted —(CH$_2$)$_t$—S(=O)$_2$—(C1-C6 alkyl), further substituted or unsubstituted —(CH$_2$)$_t$—C(=O)NR$^p$R$^q$, further substituted or unsubstituted —(CH$_2$)$_t$—C(=O)-(3-11 membered heterocycloalkyl), further substituted or unsubstituted C1-C6 alkoxy, further substituted or unsubstituted C1-C6 alkamino, further substituted or unsubstituted C1-C6 alkylthio, further substituted or unsubstituted C3-C8 cycloalkyl, further substituted or unsubstituted 5-10 membered aryl, further substituted or unsubstituted 3-10 membered heterocycloalkyl containing 1-3 heteroatoms selected from N, O and S, further substituted or unsubstituted 5-10 membered heteroaryl, —C(=O)R$^m$, —C(=O)OR$^m$, —C(=O)NR$^p$R$^q$, —S(=O)$_2$R$^m$, and —S(=O)$_2$NR$^p$R$^q$;

each t is independently selected from 0, 1, 2, 3 or 4;

R$^a$, R$^b$, R$^c$, R$^e$, R$^f$, R$^m$, R$^n$ and R$^o$ are at each occurrence independently selected from the group consisting of H, substituted or unsubstituted C1-C6 alkyl, substituted or unsubstituted C2-C6 alkenyl, substituted or unsubstituted C2-C6 alkynyl, substituted or unsubstituted C3-C11 cycloalkyl, substituted or unsubstituted 3-11 membered heterocycloalkyl, substituted or unsubstituted 5-10 membered aryl, and substituted or unsubstituted 5-10 membered heteroaryl;

R$^d$ is selected from the group consisting of H, substituted or unsubstituted C1-C6 alkyl, substituted or unsubstituted C3-C8 cycloalkyl, halogen, hydroxyl, cyano, amino, substituted or unsubstituted C1-C6 alkoxy, substituted or unsubstituted C1-C6 alkylamino and substituted or unsubstituted C1-C6 alkylthio;

R$^p$ and R$^q$ are at each occurrence independently selected from the group consisting of H, substituted or unsubstituted C1-C6 alkyl, substituted or unsubstituted C2-C6 alkenyl, substituted or unsubstituted C2-C6 alkynyl, substituted or unsubstituted C3-C11 cycloalkyl, substituted or unsubstituted 3-11 membered heterocycloalkyl, substituted or unsubstituted 5-10 membered aryl, and substituted or unsubstituted 5-10 membered heteroaryl; or, either R$^p$ or R$^q$ together with the atoms to which they are connected can form substituted or unsubstituted 5-10 membered aryl, substituted or unsubstituted C3-C11 cycloalkyl, substituted or unsubstituted 3-11 membered heterocycloalkyl or substituted or unsubstituted 5-10 membered heteroaryl;

"further substituted" in T, U, R$^g$, R$^h$, R$^i$, R$^j$, R$^k$, R$^l$, R$^{5a}$ and R$^{1a}$ or "substituted" in R$^a$, R$^b$, R$^c$, R$^d$, R$^e$, R$^f$, R$^m$, R$^n$, R$^o$, R$^p$ and R$^q$ means that one or more hydrogen atoms on the group is substituted by a substituent selected from the group consisting of C1-C6 alkyl, halogenated C1-C6 alkyl, C3-C8 cycloalkyl, halogenated C3-C8 cycloalkyl, hydroxyl, C1-C6 alkoxy, halogenated C1-C6 alkoxy, C1-C6 alkylthio, halogenated C1-C6 alkylthio, C1-C6 alkylsilyl, halogenated C1-C6 alkylsilyl, —O—(C3-C8 cycloalkyl), —O-(3-11 membered heterocycloalkyl), —O-(halogenated C3-C8 cycloalkyl), —S(=O)$_2$—(C1-C6 alkyl), —S(=O)$_2$—(C3-C8 cycloalkyl), —S(=O)$_2$-(3-11 membered heterocycloalkyl), —C(=O)-(3-11 membered heterocycloalkyl), —C(=O)—(C1-C6 alkyl), —C(=O)—(C3-C8 cycloalkyl), —C(=O)O-(3-11 membered heterocycloalkyl), —C(=O)O—(C1-C6 alkyl), —C(=O)O—(C3-C8 cycloalkyl), —C(=O)NR$^a$R$^b$, halogen, 3-11 membered heterocycloalkyl, amino, phenyl substituted by 1-3 groups selected from halogen, C1-C6 alkyl, C3-C8 cycloalkyl, C1-C6 alkoxy, hydroxyl, cyano, nitro and amino or unsubstituted phenyl, cyano, C2-C6 alkenyl, and C2-C6 alkynyl.

In another preferred embodiment, the compound is selected from a compound of formula (VI) or formula (VII):

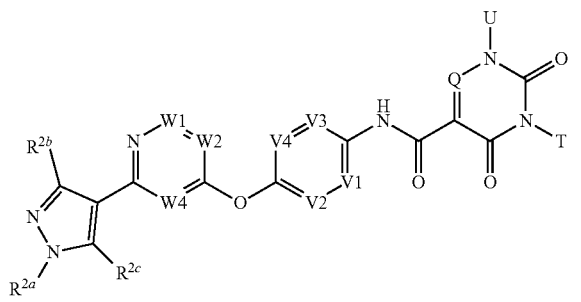

(VI)

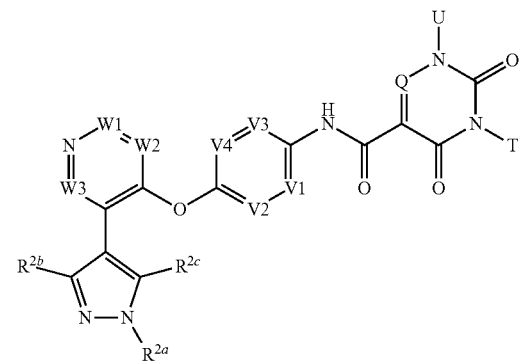

(VII)

wherein, T, U, Q, V1, V2, V3, V4, W1, W2, W3, and W4 are as defined above;

R$^{2a}$, R$^{2b}$ and R$^{2c}$ are at each occurrence independently selected from the group consisting of H, substituted or unsubstituted C1-C6 alkyl, substituted or unsubstituted C2-C6 alkenyl, substituted or unsubstituted C2-C6 alkynyl, halogen, substituted or unsubstituted —(CH$_2$)$_t$—(C3-C11 cycloalkyl), substituted or unsubstituted —(CH$_2$)$_t$-(3-11 membered heterocycloalkyl), substituted or unsubstituted —(CH$_2$)$_t$—CN, substituted or unsubstituted —(CH$_2$)$_t$—OR$^{2d}$, substituted or unsubstituted —(CH$_2$)$_t$—NR$^{2d}$R$^{2e}$, substituted or unsubstituted —(CH$_2$)$_t$—S(=O)$_2$—(C1-C6 alkyl), substituted or unsubstituted —(CH$_2$)$_t$—C(=O)N—NR$^{2d}$R$^{2e}$, substituted or unsubstituted —(CH$_2$)$_t$—C(=O)-(3-11 membered heterocycloalkyl), and substituted or unsubstituted —(CH$_2$)$_t$-(3-11 membered heterocycloalkyl);

R$^{2d}$ and R$^{2e}$ are at each occurrence independently selected from the group consisting of H, substituted or unsubstituted C1-C6 alkyl, substituted or unsubstituted C2-C6 alkenyl, substituted or unsubstituted C2-C6 alkynyl, substituted or unsubstituted C3-C11 cycloalkyl, substituted or unsubstituted 3-11 membered heterocycloalkyl, substituted or unsubstituted 5-10 membered aryl, and substituted or unsubstituted 5-10 membered heteroaryle; or either R$^{2d}$ or R$^{2e}$ together with the atoms to which they are attached can form substituted or unsubstituted 5-10 membered aryl, substituted or unsubstituted C3-C11 cycloalkyl, substituted or unsubstituted 3-11 membered heterocycloalkyl, or substituted or unsubstituted 5-10 membered heteroaryl;

"substituted" in R$^{2a}$, R$^{2b}$, R$^{2c}$, R$^{2d}$ and R$^{2e}$ means that one or more hydrogen atoms on a group is substituted by a substituent selected from the group consisting of C1-C6 alkyl, halogenated C1-C6 alkyl, C3-C8 cycloalkyl, halogenated C3-C8 cycloalkyl, hydroxyl, C1-C6 alkoxy, halogenated C1-C6 alkoxy, C1-C6 alkylthio, halogenated C1-C6 alkylthio, C1-C6 alkylsilyl, halogenated C1-C6 alkylsilyl, —O—(C3-C8 cycloalkyl), —O-(3-11 membered heterocycloalkyl), —O-(halogenated C3-C8 cycloalkyl), —S(=O)$_2$—(C1-C6 alkyl), —S(=O)$_2$—(C3-C8 cycloalkyl), —S(=O)$_2$-(3-11 membered heterocycloalkyl), —C(=O)-(3-11 membered heterocycloalkyl), —C(=O)—(C1-C6 alkyl), —C(=O)—(C3-C8 cycloalkyl), —C(=O)O-(3-11 membered heterocycloalkyl), —C(=O)O—(C1-C6 alkyl), —C(=O)O—(C3-C8 cycloalkyl), —C(=O)NR$^a$R$^b$, halogen, 3-11 membered heterocycloalkyl unsubstituted or substituted by C1-C6 alkyl, amino, phenyl substituted by 1-3 groups selected from halogen, C1-C6 alkyl, C3-C8 cycloalkyl, C1-C6 alkoxy, hydroxyl, cyano, nitro and amino, C2-C6 alkenyl, C2-C6 alkynyl, unsubstituted phenyl and cyano;

each d, and t is independently selected from 0, 1, 2, 3 or 4;

R$^a$ and R$^b$ are as defined above.

In another preferred embodiment, the compound is selected from a compound of formula (IX) or formula (X):

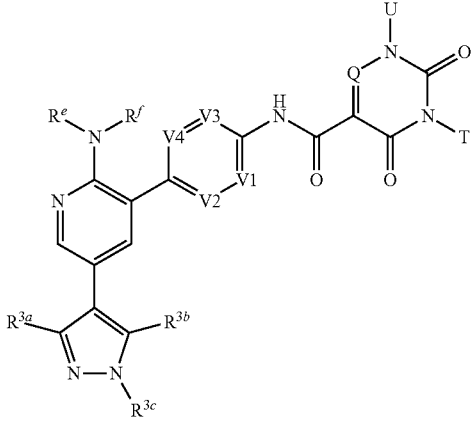

(IX)

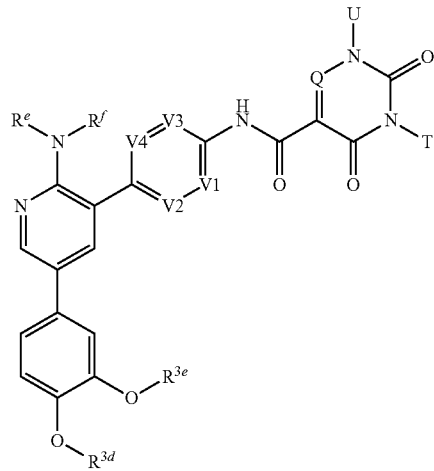

(X)

wherein, T, U, Q, V1, V2, V3, V4, R$^e$ and R$^f$ are as defined above;

R$^{3a}$, R$^{3b}$, R$^{3c}$, R$^{3d}$ and R$^{3e}$ are at each occurrence independently selected from the group consisting of H, substituted or unsubstituted C1-C6 alkyl, substituted or unsubstituted C2-C6 alkenyl, substituted or unsubstituted C2-C6 alkynyl, halogen, substituted or unsubstituted —(CH$_2$)$_t$—(C3-C11 cycloalkyl), substituted or unsubstituted —(CH$_2$)$_t$-(3-11 membered heterocycloalkyl), substituted or unsubstituted —(CH$_2$)$_t$—CN, substituted or unsubstituted —(CH$_2$)$_t$—OR$^{3f}$, substituted or unsubstituted —(CH$_2$)$_t$—NR$^{3f}$R$^{3g}$, substituted or unsubstituted —(CH$_2$)$_t$—S(=O)2-(C1-C6 alkyl), substituted or unsubstituted —(CH$_2$)$_t$—C(=O)N—NR$^{3f}$R$^{3g}$, substituted or unsubstituted —(CH$_2$)$_t$—C(=O)-(3-11 membered heterocycloalkyl);

R$^{3f}$ and R$^{3g}$ are at each occurrence independently selected from the group consisting of H, substituted or unsubstituted C1-C6 alkyl, substituted or unsubstituted C2-C6 alkenyl, substituted or unsubstituted C2-C6 alkynyl, substituted or unsubstituted C3-C11 cycloalkyl, substituted or unsubstituted 3-11 membered heterocycloalkyl, substituted or unsubstituted 5-10 membered aryl, and substituted or unsubstituted 5-10 membered heteroaryl; or either R$^{3f}$ or R$^{3g}$ together with the atoms to which they are attached can form substituted or unsubstituted 5-10 membered aryl, substituted or unsubstituted C3-C11 cycloalkyl, substituted or unsubstituted 3-11 membered heterocycloalkyl or substituted or unsubstituted 5-10 membered heteroaryl;

"substituted" in R$^{3a}$, R$^{3b}$, R$^{3c}$, R$^{3d}$, R$^{3e}$, R$^{3f}$, and R$^{3g}$ means that one or more hydrogen atoms on a group is substituted by a substituent selected from the group consisting of C1-C6 alkyl, halogenated C1-C6 alkyl, C3-C8 cycloalkyl, halogenated C3-C8 cycloalkyl, hydroxyl, C1-C6 alkoxy, halogenated C1-C6 alkoxy, CT-C6 alkylthio, halogenated CT-C6 alkylthio, C1-C6 alkylsilyl, halogenated C1-C6 alkylsilyl, —O—(C3-C8 cycloalkyl), —O-(3-11 membered heterocycloalkyl), —O-(halogenated C3-C8 cycloalkyl), —S(=O)$_2$—(C1-C6 alkyl), —S(=O)$_2$—(C3-C8 cycloalkyl), —S(=O)$_2$-(3-11 membered heterocycloalkyl), —C(=O)-(3-11 membered heterocycloalkyl), —C(=O)—(C1-C6 alkyl), —C(=O)—(C3-C8 cycloalkyl), —C(=O)O-(3-11 membered heterocycloalkyl), —C(=O)O—(C1-C6 alkyl), —C(=O)O—(C3-C8 cycloalkyl), —C(=O)NR$^a$R$^b$, halogen, 3-11 membered heterocycloalkyl, amino, phenyl substituted by 1-3 groups selected from halogen, C1-C6 alkyl, C3-C8 cycloalkyl, C1-C6 alkoxy, hydroxyl, cyano, nitro and amino, C2-C6 alkenyl, C2-C6 alkynyl, unsubstituted phenyl and cyano;

t is independently selected from 0, 1, 2, 3 or 4;

R$^a$ and R$^b$ are as defined above.

In another preferred embodiment, the compound is selected from a compound of formula (XI) or formula (XII):

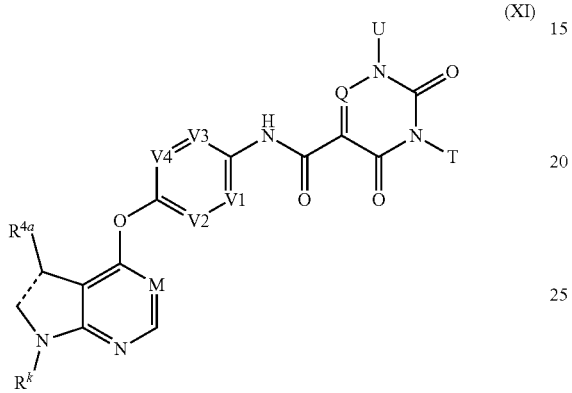

(XI)

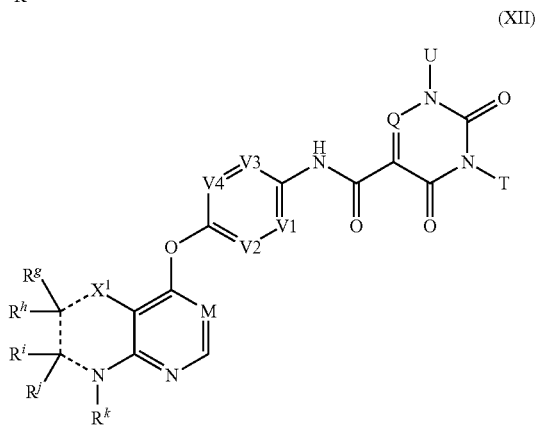

(XII)

wherein, T, U, Q, V1, V2, V3, V4, M, R$^g$, R$^h$, R$^i$, R$^j$, R$^k$ and dotted line are as defined above;

X$^1$ is N or O;

R$^{4a}$ is selected from the group consisting of H, halogen, substituted or unsubstituted C1-C6 alkyl, substituted or unsubstituted C2-C6 alkenyl, substituted or unsubstituted C2-C6 alkynyl, substituted or unsubstituted C3-C11 cycloalkyl, substituted or unsubstituted 3-11 membered heterocycloalkyl, substituted or unsubstituted 5-10 membered aryl and substituted or unsubstituted 5-10 membered heteroaryl; the "substituted" means that one or more hydrogen atoms on the group is substituted by a substituent selected from the group consisting of further substituted or unsubstituted C1-C6 alkyl, further substituted or unsubstituted C1-C6 alkoxy, further substituted or unsubstituted C1-C6 alkylamino, further substituted or unsubstituted C1-C6 alkylthio, further substituted or unsubstituted C2-C6 alkenyl, further substituted or unsubstituted C2-C6 alkynyl, further substituted or unsubstituted C3-C8 cycloalkyl, further substituted or unsubstituted 5-10 membered aryl, further substituted or unsubstituted 3-11 membered heterocycloalkyl, further substituted or unsubstituted 5-10 membered heteroaryl, —C(=O)R$^a$, —C(=O)OR$^a$, —C(=O)NR$^a$R$^b$, —S(=O)$_2$R$^a$ and —S(=O)$_2$NR$^a$R$^b$; the "further substituted" means being substituted by one or more substituents selected from the group consisting of C1-C6 alkyl, halogenated C1-C6 alkyl, C3-C8 cycloalkyl, halogenated C3-C8 cycloalkyl, hydroxyl, C1-C6 alkoxy, halogenated C1-C6 alkoxy, C1-C6 alkylthio, halogenated C1-C6 alkylthio, C1-C6 alkylsilyl, halogenated C1-C6 alkylsilyl, —O—(C3-C8 cycloalkyl), —O-(3-11 membered heterocycloalkyl), —O-(halogenated C3-C8 cycloalkyl), —S(=O)$_2$—(C1-C6 alkyl), —S(=O)$_2$—(C3-C8 cycloalkyl), —S(=O)$_2$-(3-11 membered heterocycloalkyl), —C(=O)-(3-11 membered heterocycloalkyl), —C(=O)—(C1-C6 alkyl), —C(=O)—(C3-C8 cycloalkyl), —C(=O)O-(3-11 membered heterocycloalkyl), —C(=O)O—(C1-C6 alkyl), —C(=O)O—(C3-C8 cycloalkyl), —C(=O)NR$^a$R$^b$, halogen, 3-11 membered heterocycloalkyl, amino, phenyl substituted by 1-3 groups selected from halogen, C1-C6 alkyl, C3-C8 cycloalkyl, C1-C6 alkoxy, hydroxyl, cyano, nitro and amino or unsubstituted phenyl, cyano, C2-C6 alkenyl and C2-C6 alkynyl;

R$^a$ and R$^b$ are as defined above.

In another preferred embodiment, Q is C—H.

In another preferred embodiment, T is selected from the group consisting of substituted or unsubstituted C3-C11 cycloalkyl, and substituted or unsubstituted 5-10 membered aryl; the "substituted" means that one or more hydrogen atoms on a group is substituted by a substituent selected from the group consisting of further substituted or unsubstituted C1-C6 alkyl, further substituted or unsubstituted C3-C8 cycloalkyl, halogen, hydroxyl, mercapto, cyano, amino, further substituted or unsubstituted C1-C6 alkoxy, further substituted or unsubstituted C1-C6 alkylamino and further substituted or unsubstituted C1-C6 alkylthio; the "further substituted" means that one or more hydrogen atoms on a group is substituted by a substituent selected from the group consisting of C1-C6 alkyl, halogenated C1-C6 alkyl, C3-C8 cycloalkyl, halogenated C3-C8 cycloalkyl, hydroxyl, C1-C6 alkoxy, halogenated C1-C6 alkoxy, C1-C6 alkylthio, halogenated C1-C6 alkylthio, C1-C6 alkylsilyl, halogenated C1-C6 alkylsilyl, —O—(C3-C8 cycloalkyl), —O-(3-11 membered heterocycloalkyl), —O-(halogenated C3-C8 cycloalkyl), —S(=O)$_2$—(C1-C6 alkyl), —S(=O)$_2$—(C3-C8 cycloalkyl), —S(=O)$_2$-(3-11 membered heterocycloalkyl), —C(=O)-(3-11 membered heterocycloalkyl), —C(=O)—(C1-C6 alkyl), —C(=O)—(C3-C8 cycloalkyl), —C(=O)O-(3-11 membered heterocycloalkyl), —C(=O)O—(C1-C6 alkyl), —C(=O)O—(C3-C8 cycloalkyl), —C(=O)NR$^a$R$^b$, halogen, 3-11 membered heterocycloalkyl, amino, phenyl substituted by 1-3 groups selected from halogen, C1-C6 alkyl, C3-C8 cycloalkyl, C1-C6 alkoxy, hydroxyl, cyano, nitro and amino or unsubstituted phenyl, cyano, C2-C6 alkenyl and C2-C6 alkynyl;

R$^a$ and R$^b$ are as defined above.

In another preferred embodiment, U is selected from the group consisting of substituted or unsubstituted C1-C6 alkyl, substituted or unsubstituted C2-C6 alkenyl, substituted or unsubstituted C2-C6 alkynyl, substituted or unsubstituted C3-C11 cycloalkyl, and substituted or unsubstituted 5-10 membered aryl.

In another preferred embodiment, the compound is selected from a compound shown in Table 1.

In the second aspect of the present invention, it provides a pharmaceutical composition comprising a pharmaceutically acceptable carrier and one or more therapeutically effective amounts of the compound or its stereoisomer, geometric isomer, tautomer, its pharmaceutically acceptable salt, its prodrug, its hydrate or solvate of the first aspect of the present invention.

In another preferred embodiment, the dosage form of the pharmaceutical composition is selected from the group consisting of an oral dosage form, a lyophilized preparation and an injection.

In the third aspect of the invention, it provides a use of the compound or its stereoisomer, geometric isomer, tautomer, its pharmaceutically acceptable salt, its prodrug, its hydrate or solvate according to the first aspect of the present invention for the preparation of a drug, and the drug is used for a use selected from the group consisting of:
1) for the prevention and/or treatment of tumor-related diseases; and
2) for the prevention and/or treatment of diseases related to protein tyrosine kinase activity.

In another preferred embodiment, the tumor-related diseases are selected from the group consisting of chronic myelogenous leukemia, chronic myelodysplastic disease, lung cancer, skin cancer, prostate cancer, esophageal cancer, ovarian cancer, pancreatic cancer, stomach pain, gastric cancer, liver cancer, thyroid cancer, kidney cancer, glioblastoma, malignant Glioma, breast cancer, acute myeloid leukemia, colorectal cancer, colon cancer, rectal cancer, endometrial cancer, uterine cancer, cervical cancer, malignant glioma, ocular pigment layer melanoma, osteosarcoma, soft tissue sarcoma, glioma, melanoma, head and neck cancer, bladder cancer, cholangiocarcinoma, nasopharyngeal carcinoma, synovial sarcoma, rhabdomyosarcoma, fibrosarcoma, leiomyosarcoma, myeloma and lymphoma.

In another preferred embodiment, the melanoma is a malignant melanoma.

In another preferred embodiment, the lung cancer is non-small cell lung cancer (NSCLC).

In another preferred embodiment, the diseases related to protein tyrosine kinase activity are selected from the group consisting of psoriasis, cirrhosis, diabetes, angiogenesis, restenosis, ophthalmic disease, inflammatory disease, immune disease, and cardiovascular disease.

In another preferred embodiment, the inflammatory disease is selected from the group consisting of rheumatoid arthritis, systemic lupus erythematosus, nephritis, multiple sclerosis, and myocarditis.

In another preferred embodiment, the cardiovascular disease is selected from the group consisting of arteriosclerosis, nephropathy, hypertension, myocardial hypertrophy, and myocardial infarction.

In the fourth aspect of the present invention, it provides a tyrosine kinase inhibitor comprising one or more inhibitory effective amounts of the compound or its stereoisomer, geometric isomer, tautomer, its pharmaceutically acceptable salt, its prodrug, its hydrate or solvate according to the first aspect of the present invention.

In another preferred embodiment, the inhibitor is an Axl inhibitor.

In another preferred embodiment, the inhibitor is a c-Met inhibitor.

In the fifth aspect of the present invention, it provides a method for a use selected from the group consisting of:
1) inhibiting tyrosine kinase activity;
2) inhibiting Axl kinase activity;
3) inhibiting c-Met kinase activity; and
4) inhibiting Axl kinase activity and c-Met kinase activity;
the method comprises the step of administering an inhibitory effective amount of the compound or its stereoisomer, geometric isomer, tautomer, its pharmaceutically acceptable salt, its prodrug, its hydrate or solvate to a patient in need thereof.

In another preferred embodiment, the method is non-diagnostic and/or non-therapeutic.

In the sixth aspect of the present invention, it provides a method for a use selected from the group consisting of:
1) prevention and/or treatment of tumor-related diseases;
2) prevention and/or treatment of diseases related to protein tyrosine kinase activity;
3) prevention and/or treatment of Axl-related diseases;
4) prevention and/or treatment of c-Met-related diseases;
5) prevention and/or treatment of diseases related to abnormal expression of Gas6/Axl signaling pathway; and
6) prevention and/or treatment of diseases related to abnormal expression of HGF/c-Met signaling pathway;
the method comprises the step of administering a prophylactic and/or therapeutical effective amount of the compound or its stereoisomer, geometric isomer, tautomer, its pharmaceutically acceptable salt, its prodrug, its hydrate or solvate to a patient in need thereof.

In another preferred embodiment, the diseases related to abnormal expression of Gas6/Axl signaling pathway are selected from the group consisting of colon cancer, rectal cancer, skin cancer, gastric cancer, lung cancer, endometrial cancer, malignant melanoma, thyroid cancer, glioma, esophageal cancer, prostate cancer, ovarian cancer, diseases related to tumorigenesis and poor prognosis such as breast pain, and acquired resistance of EGFR that may be mediated by high expression thereof.

In another preferred embodiment, the disease related to abnormal expression of HGF/c-Met signaling pathway is selected from the group consisting of breast cancer, prostate cancer, thyroid cancer, and lung cancer.

It should be understood that within the scope of the present invention, the above-mentioned technical features of the present invention and the technical features specifically described in the following (e.g. Examples) can be combined with each other to form a new or preferred technical solutions, which will not redundantly be described one by one herein.

DETAILED DESCRIPTION OF THE INVENTION

After long-term and intensive research, a compound represented by the general formula (I) having novel structure and significant kinase inhibitory effect has been unexpectedly developed. The kinase inhibitor prepared with the compound of the present invention can achieve a significant inhibitory effect on Axl and/or c-Met enzyme activity at the nM level, and the inhibitor also has a significant inhibitory effect on the proliferation of Axl or c-Met-dependent cancer cells at the cell level, which is of great significance for the development of novel anti-tumor drugs. On this basis, the present invention has been completed.

Terms

In the present invention, unless specifically indicated, the terms used have the general meaning well known to those skilled in the art.

In the present invention, the term "halogen" refers to F, Cl, Br or I.

In the present invention, C1-C6 alkyl refers to a straight or branched chain alkyl including 1-6 carbon atoms, such as methyl, ethyl, propyl, isopropyl, butyl, isobutyl, tert-butyl, neopentyl, tert-pentyl, or similar groups.

In the present invention, the term "C2-C6 alkenyl" refers to a straight or branched chain alkenyl having 2 to 6 carbon atoms containing a double bond, including but not limited to vinyl, propenyl, butenyl, isobutenyl, pentenyl and hexenyl, etc.

In the present invention, the term "C2-C6 alkynyl" refers to a straight or branched chain alkynyl having 2 to 6 carbon atoms containing a triple bond, including but not limited to ethynyl, propynyl, butynyl, isobutynyl, pentynyl and hexynyl, etc.

In the present invention, the term "C3-C11 cycloalkyl" refers to a cyclic alkyl having 3 to 11 carbon atoms on the ring, including but not limited to cyclopropyl, cyclobutyl, cyclopentyl, cyclohexyl, cycloheptyl, cyclooctyl, and the like. The terms "C3-C8 cycloalkyl" and "C3-C6 cycloalkyl" have similar meanings. The aforementioned "C3-C11 cycloalkyl", "C3-C8 cycloalkyl" and "C3-C6 cycloalkyl" are all monovalent groups, and the terms "C3-C11 cycloalkylene", "C3-C8 cycloalkylene" and "C3-C6 cycloalkylene" have similar meanings, but they are divalent groups.

In the present invention, the term "C1-C6 alkoxy" refers to a straight or branched chain alkoxy having 1 to 6 carbon atoms, including but not limited to methoxy, ethoxy, propoxy, isopropoxy, butoxy, etc. It is preferably C1-C4 alkoxy.

In the present invention, the term "C1-C6 alkylamino" has the following structure: —NH—C1-C6 alkyl or —N—(C1-C6 alkyl)$_2$, which can be mono-substituted or disubstituted: representative examples include, but are not limited to methylamino, ethylamino, propylamino, isopropylamino, butylamino, isobutylamino, sec-butylamino, tert-butylamino, dimethylamino, diethylamino, dipropylamino, diisopropylamino, dibutylamino, diisobutylamino, disec-butylamino, di-tert-butylamino, or similar groups.

In the present invention, the term "C1-C6 alkylthio" has the following structure: —S—C1-C6 alkyl, representative examples include, but are not limited to methylthio, ethylthio, propylthio, isopropylthio, butylthio, isobutylthio, sec-butylthio, t-butylthio, or similar groups.

In the present invention, the term "C1-C6 alkylsilyl" refers to a silyl substituted by a straight or branched chain alkyl having 1-6 carbon atoms, which may be mono-substituted, disubstituted or trisubstituted; representative examples include but are not limited to methylsilyl, ethylsilyl, propylsilyl, isopropylsilyl, butylsilyl, isobutylsilyl, sec-butylsilyl, tert-butylsilyl, dimethylsilyl, diethylsilyl, dipropylsilyl, diisopropylsilyl, dibutylsilyl, diisobutylsilyl, di-sec-butylsilyl, di-tert-butylsilyl, trimethylsilyl, triethylsilyl, tripropylsilyl, triisopropylsilyl, tributylsilyl, triisobutylsilyl, tri-sec-butylsilyl, tri-tert-butylsilyl, or similar groups.

In the present invention, the term "3-11 membered heterocycloalkyl" is a 3-11 membered heterocyclyl containing 1, 2 or 3 heteroatoms selected from the group consisting of N, O, S and Se, wherein the cyclic system of each cycloalkyl may be monocyclic or polycyclic, including (but not limited to) the following groups: tetrahydrofuran, tetrahydropyran, tetrahydropyrrol, tetrahydrothiophenyl, piperidinyl, azetidinyl, azapanyl, morpholinyl, or similar groups. The term "3-15 membered heterocycloalkyl" has a similar meaning. The term "3-11 membered heterocycloalkyl" is a monovalent group, and the term "3-11 membered heterocycloalkylene" has a similar meaning, but is a divalent group.

In the present invention, the term "5-10 membered aromatic ring" or "5-10 membered aryl" has the same meaning, preferably "C6-C10 aryl". The term "C6-C10 aryl" refers to an aromatic ring group having 6 to 10 carbon atoms in the ring that does not contain heteroatoms, such as phenyl, naphthyl and the like.

In the present invention, the terms "5-10 membered aromatic heterocycle" or "5-10 membered heteroaryl" have the same meaning and refer to a heteroaromatic group containing one to multiple heteroatoms, and the cyclic system of heteroaryl can be monocyclic or polycyclic. For example, "C3-C10 heteroaryl" refers to an aromatic heterocyclyl containing 1 to 4 heteroatoms selected from oxygen, sulfur, nitrogen and selenium and 3 to 10 carbon atoms. Non-limiting examples include: furyl, thienyl, pyridyl, pyrazolyl, pyrrolyl, N-alkylpyrrolyl, pyrimidinyl, pyrazinyl, imidazolyl, tetrazolyl and the like. The heteroaryl ring may be fused to an aryl, heterocyclyl or cycloalkyl ring, wherein the ring connected to the parent structure is a heteroaryl ring. Heteroaryl can be optionally substituted or unsubstituted.

In the present invention, the term "halogenated" means substituted by halogen.

In the present invention, the term "substituted" means that one or more hydrogen atoms on a specific group are replaced by a specific substituent. The specific substituents are the substituents described correspondingly in the foregoing, or the substituents appearing in the respective examples. Unless otherwise specified, a substituted group may have a substituent selected from a specific group at any substitutable position of the group, and the substituent may be the same or different at each position. Those skilled in the art should understand that the combinations of substituents contemplated by the present invention are those that are stable or chemically achievable. The substituents are, for example (but not limited to): halogen, hydroxyl, carboxyl (—COOH), C1-C6 alkyl, C2-C6 alkenyl, C2-C6 alkynyl, C3-C8 cycloalkyl, 3-12 membered heterocyclyl, aryl, heteroaryl, C1-C8 aldehyde group, C2-C10 acyl, C2-C10 ester group, amino, C1-C6 alkoxy, C1-C10 sulfonyl group and the like.

In the present invention, the term "multiple" independently refers to 2, 3, 4, 5.

In the present invention, the chiral carbon atoms of the compound may optionally be R configuration or S configuration, or a mixture of R configuration and S configuration.

Unless otherwise specified, the structural formula described herein are intended to include all isomeric forms (e.g., enantiomer, diastereomer, and geometric isomers (or conformational isomer): for example, R, S configurations containing asymmetric centers, (Z) and (E) isomers, and (Z) and (E) conformational isomers of double bonds. Thus, a single stereochemical isomer or a mixture of enantiomers, diastereoisomers or geometric isomers (or conformational isomers) thereof of the compound of the invention is within the scope of the invention.

The term "tautomer" means that structural isomers with different energies can exceed the low energy barrier, thus transforming into each other. For example, proton tautomers (that is, proton shift) include intertransformation through proton migration, such as 1H-indazole and 2H-indazole, 1H-benzo [d] imidazole and 3H-benzo [d] imidazole, valence tautomers include mutual transformation through some bonded electron recombination.

Compound
The invention provides a compound of formula (I) or its stereoisomer, geometric isomer, tautomer, its pharmaceutically acceptable salt, its prodrug, its hydrate or solvate,
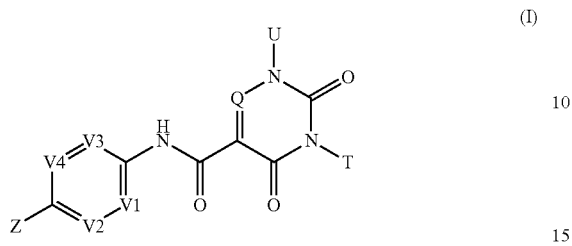
(I)
wherein, each group is as defined above.
In another preferred embodiment, the compound is selected from the compounds listed in Table 1.
TABLE 1
| Compound | Structural formula |
|---|---|
| No.1 | |
| No.2 | |
| No.3 | |

TABLE 1-continued
| Compound | Structural formula |
|---|---|
| No.4 | 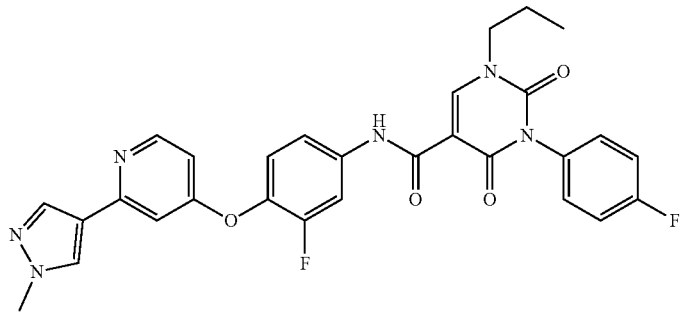 [SMILES: CCCn1cc(C(=O)Nc2ccc(Oc3ccnc(-c4cnn(C)c4)c3)c(F)c2)c(=O)n(-c2ccc(F)cc2)c1=O] |
| No.5 | 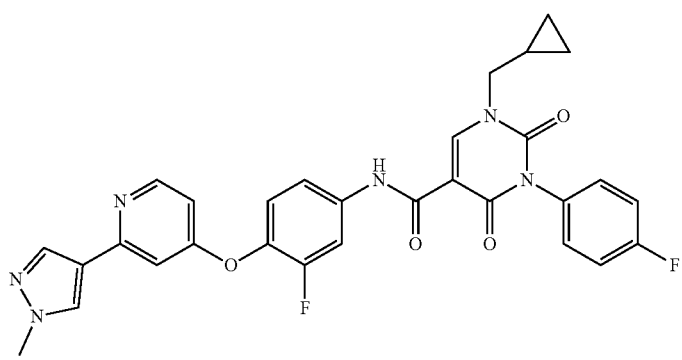 [SMILES: Cn1cc(-c2cc(Oc3ccc(NC(=O)c4cn(CC5CC5)c(=O)n(-c5ccc(F)cc5)c4=O)cc3F)ccn2)cn1] |
| No.6 | 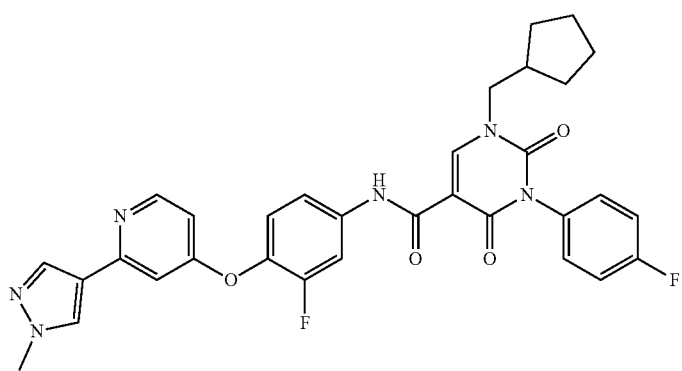 [SMILES: Cn1cc(-c2cc(Oc3ccc(NC(=O)c4cn(CC5CCCC5)c(=O)n(-c5ccc(F)cc5)c4=O)cc3F)ccn2)cn1] |
| No.7 | 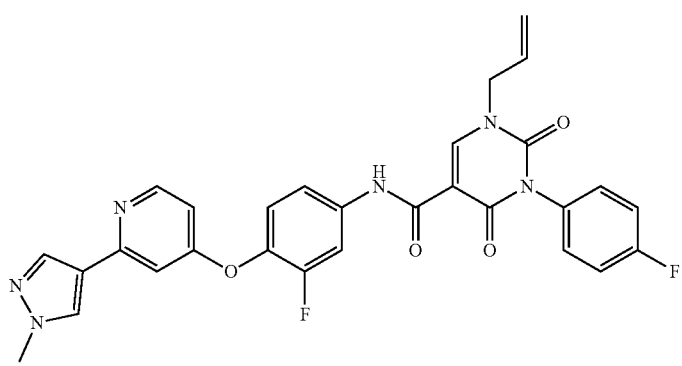 [SMILES: C=CCn1cc(C(=O)Nc2ccc(Oc3ccnc(-c4cnn(C)c4)c3)c(F)c2)c(=O)n(-c2ccc(F)cc2)c1=O] |

TABLE 1-continued
| Compound | Structural formula |
|---|---|
| No.8 | 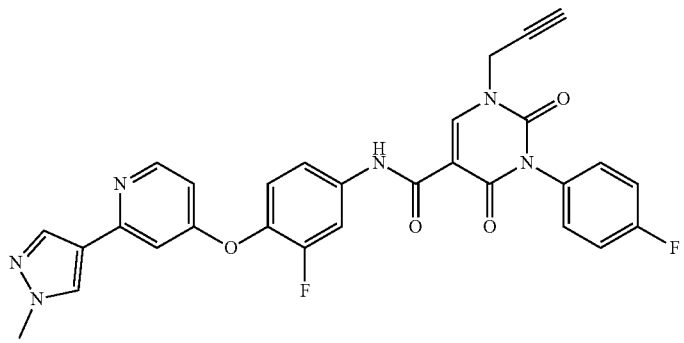 [SMILES: C#CCn1cc(C(=O)Nc2ccc(Oc3ccnc(-c4cnn(C)c4)c3)c(F)c2)c(=O)n(-c2ccc(F)cc2)c1=O] |
| No.9 | 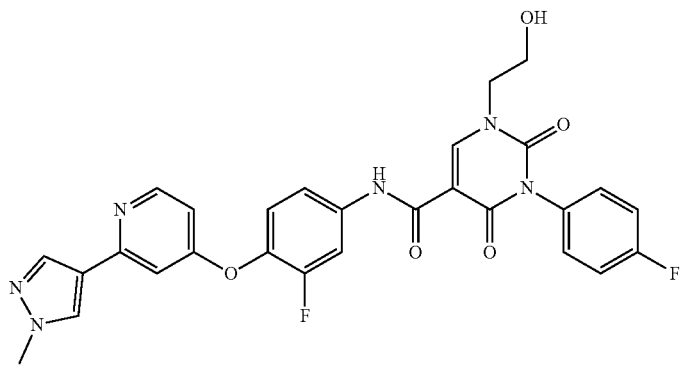 [SMILES: Cn1cc(-c2cc(Oc3ccc(NC(=O)c4cn(CCO)c(=O)n(-c5ccc(F)cc5)c4=O)cc3F)ccn2)cn1] |
| No.10 | 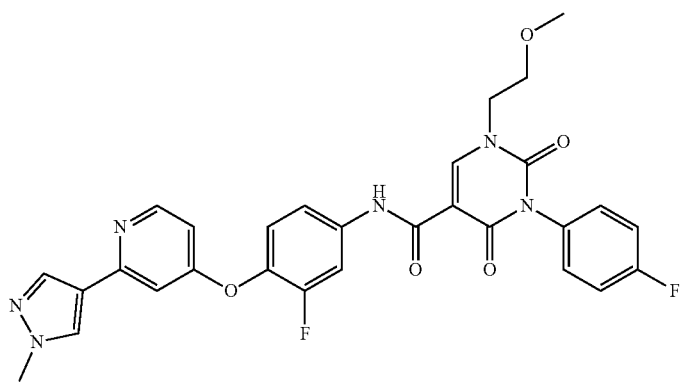 [SMILES: COCCn1cc(C(=O)Nc2ccc(Oc3ccnc(-c4cnn(C)c4)c3)c(F)c2)c(=O)n(-c2ccc(F)cc2)c1=O] |
| No.11 | 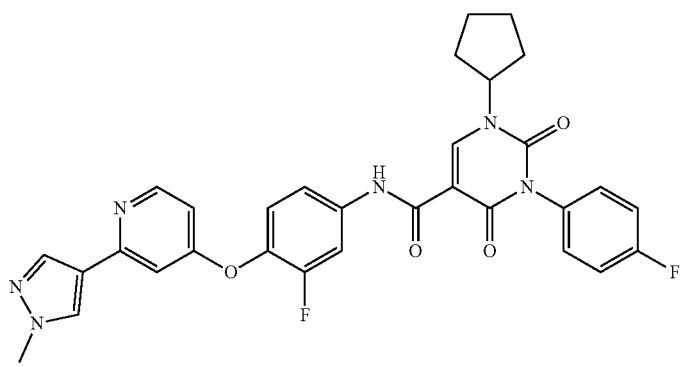 [SMILES: Cn1cc(-c2cc(Oc3ccc(NC(=O)c4cn(C5CCCC5)c(=O)n(-c5ccc(F)cc5)c4=O)cc3F)ccn2)cn1] |

TABLE 1-continued
Compound Structural formula
No.12
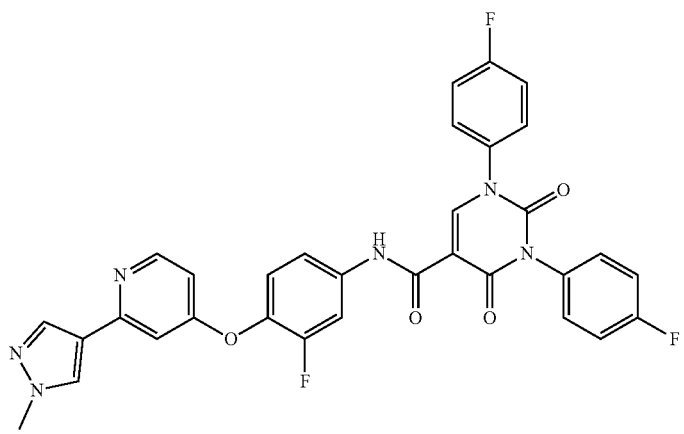 [SMILES: Cn1cc(-c2cc(Oc3ccc(NC(=O)c4cn(-c5ccc(F)cc5)c(=O)n(-c5ccc(F)cc5)c4=O)cc3F)ccn2)cn1]
No.13
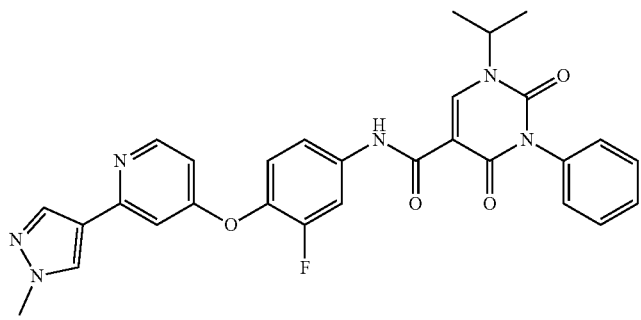 [SMILES: CC(C)n1cc(C(=O)Nc2ccc(Oc3ccnc(-c4cnn(C)c4)c3)c(F)c2)c(=O)n(-c2ccccc2)c1=O]
No.14
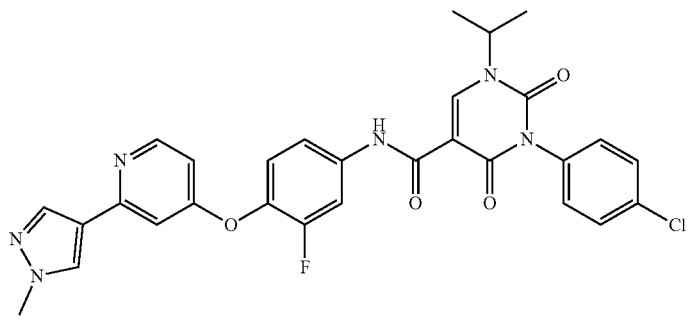 [SMILES: CC(C)n1cc(C(=O)Nc2ccc(Oc3ccnc(-c4cnn(C)c4)c3)c(F)c2)c(=O)n(-c2ccc(Cl)cc2)c1=O]
No.15
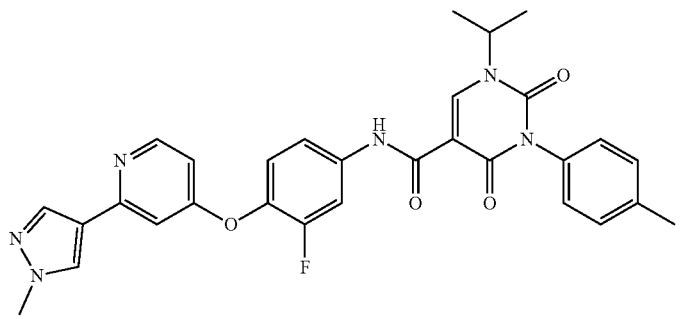 [SMILES: Cc1ccc(-n2c(=O)c(C(=O)Nc3ccc(Oc4ccnc(-c5cnn(C)c5)c4)c(F)c3)cn(C(C)C)c2=O)cc1]

TABLE 1-continued
| Compound | Structural formula |
|---|---|
| No.16 | 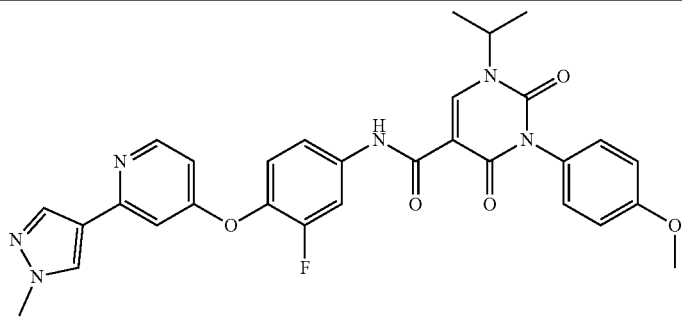 |
| No.17 | 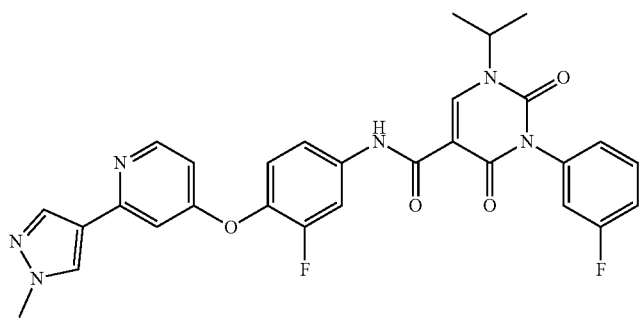 [SMILES: CC(C)n1cc(C(=O)Nc2ccc(Oc3ccnc(-c4cnn(C)c4)c3)c(F)c2)c(=O)n(-c2cccc(F)c2)c1=O] |
| No.18 | 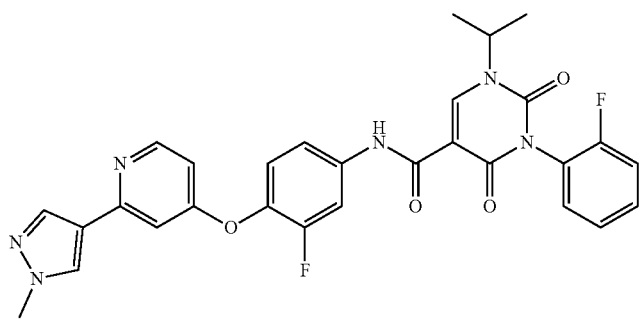 [SMILES: CC(C)n1cc(C(=O)Nc2ccc(Oc3ccnc(-c4cnn(C)c4)c3)c(F)c2)c(=O)n(-c2ccccc2F)c1=O] |
| No.19 | 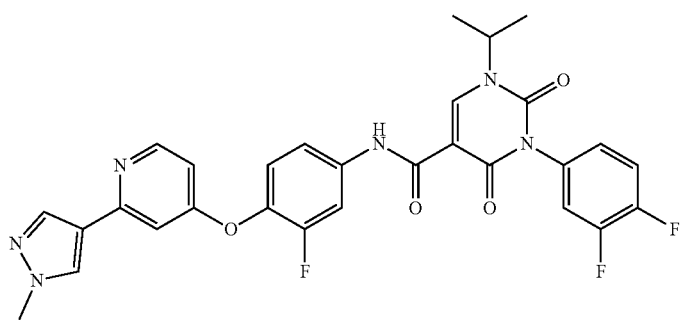 [SMILES: CC(C)n1cc(C(=O)Nc2ccc(Oc3ccnc(-c4cnn(C)c4)c3)c(F)c2)c(=O)n(-c2ccc(F)c(F)c2)c1=O] |
| No.20 | 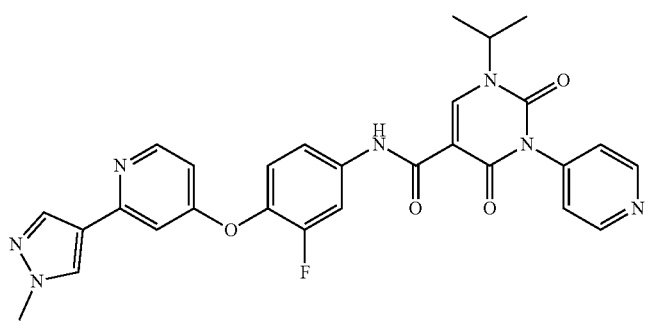 [SMILES: CC(C)n1cc(C(=O)Nc2ccc(Oc3ccnc(-c4cnn(C)c4)c3)c(F)c2)c(=O)n(-c2ccncc2)c1=O] |

TABLE 1-continued
| Compound | Structural formula |
|---|---|
| No.21 | 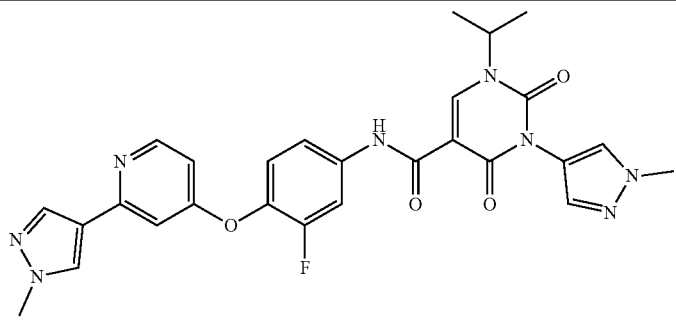 |
| No.22 | 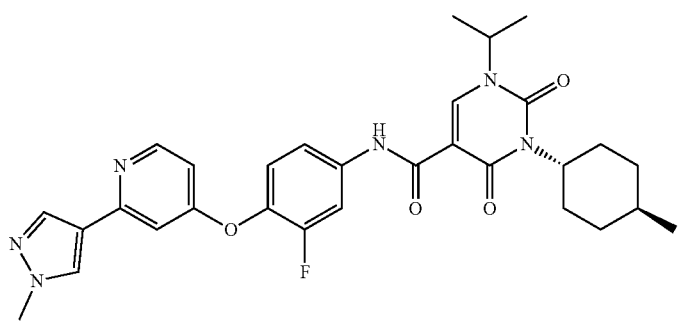 [SMILES: CC(C)n1cc(C(=O)Nc2ccc(Oc3ccnc(-c4cnn(C)c4)c3)c(F)c2)c(=O)n([C@H]2CC[C@H](C)CC2)c1=O] |
| No.23 | 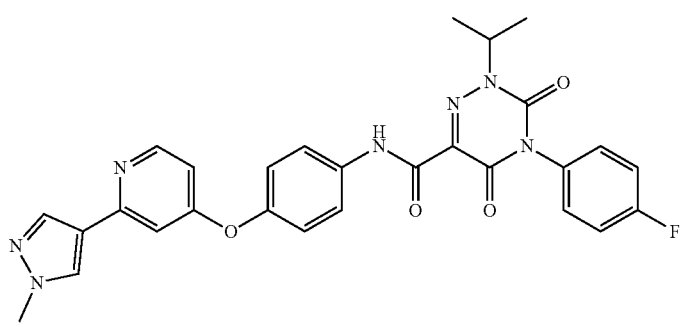 [SMILES: CC(C)n1nc(C(=O)Nc2ccc(Oc3ccnc(-c4cnn(C)c4)c3)cc2)c(=O)n(-c2ccc(F)cc2)c1=O] |
| No.24 | 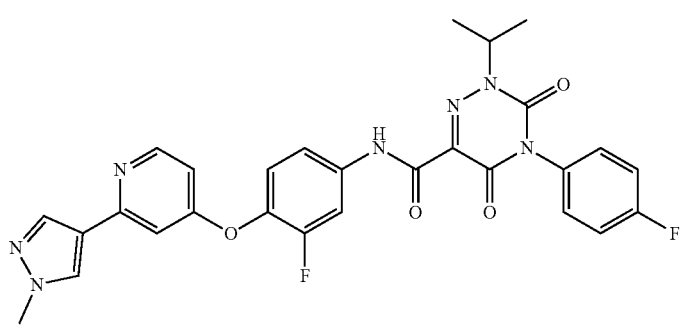 [SMILES: CC(C)n1nc(C(=O)Nc2ccc(Oc3ccnc(-c4cnn(C)c4)c3)c(F)c2)c(=O)n(-c2ccc(F)cc2)c1=O] |
| No.25 | 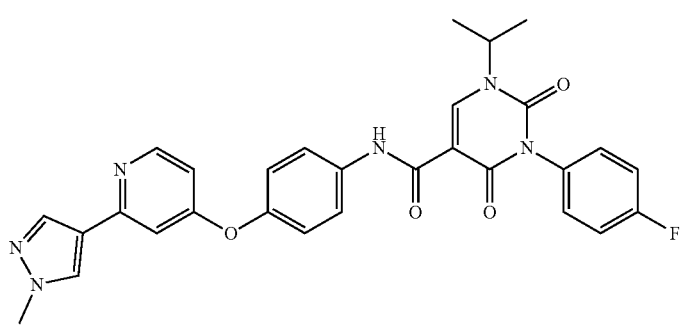 [SMILES: CC(C)n1cc(C(=O)Nc2ccc(Oc3ccnc(-c4cnn(C)c4)c3)cc2)c(=O)n(-c2ccc(F)cc2)c1=O] |

TABLE 1-continued
Compound Structural formula
No.26
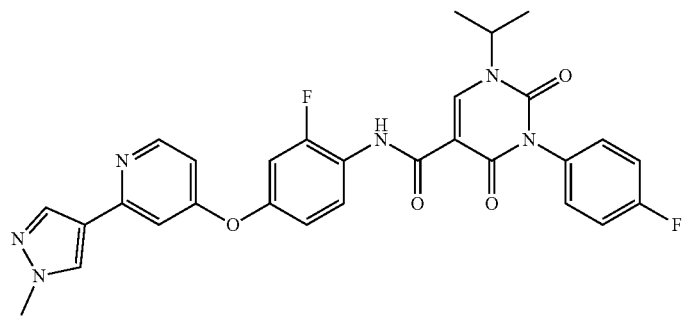 [SMILES: CC(C)n1cc(C(=O)Nc2ccc(Oc3ccnc(-c4cnn(C)c4)c3)cc2F)c(=O)n(-c2ccc(F)cc2)c1=O]
No.27
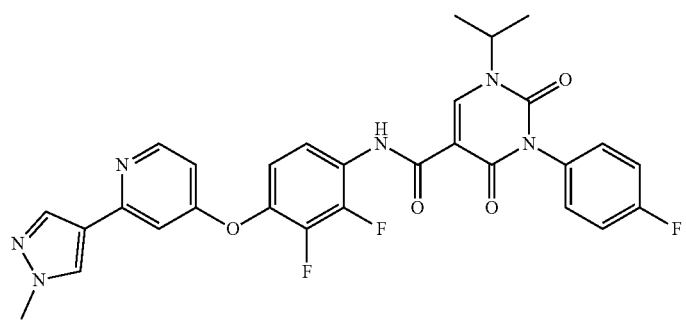 [SMILES: CC(C)n1cc(C(=O)Nc2ccc(Oc3ccnc(-c4cnn(C)c4)c3)c(F)c2F)c(=O)n(-c2ccc(F)cc2)c1=O]
No.28
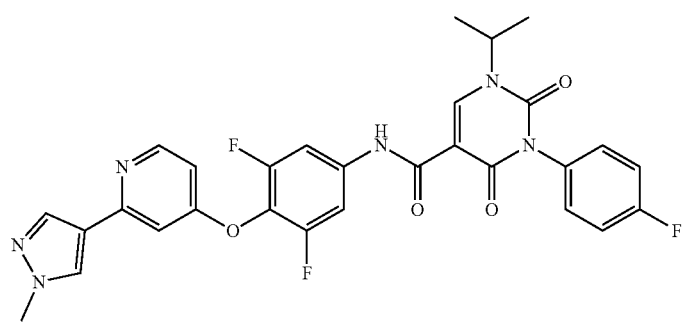 [SMILES: CC(C)n1cc(C(=O)Nc2cc(F)c(Oc3ccnc(-c4cnn(C)c4)c3)c(F)c2)c(=O)n(-c2ccc(F)cc2)c1=O]
No.29
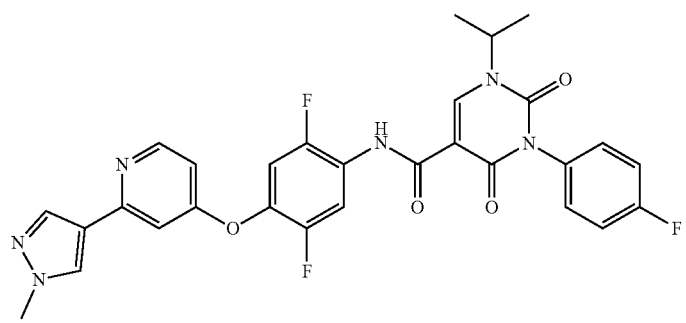 [SMILES: CC(C)n1cc(C(=O)Nc2cc(F)c(Oc3ccnc(-c4cnn(C)c4)c3)cc2F)c(=O)n(-c2ccc(F)cc2)c1=O]

TABLE 1-continued

Compound Structural formula

No.30

No.31

No.32

No.33

TABLE 1-continued
| Compound | Structural formula |
| --- | --- |
| No.34 | 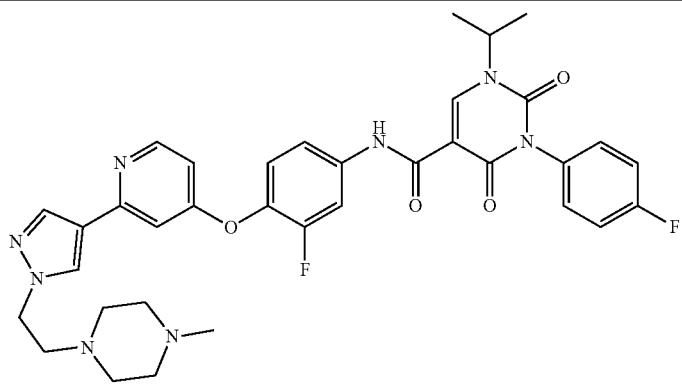 |
| No.35 | 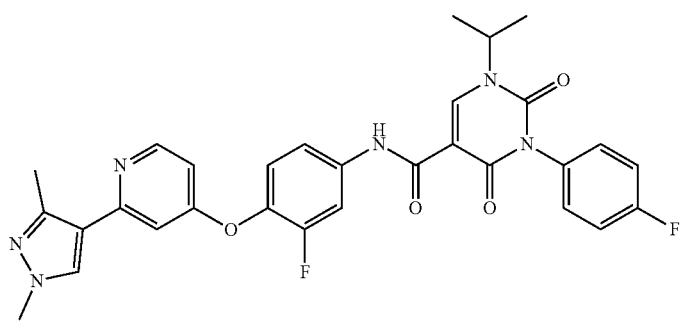 [SMILES: Cc1nn(C)cc1-c1cc(Oc2ccc(NC(=O)c3cn(C(C)C)c(=O)n(-c4ccc(F)cc4)c3=O)cc2F)ccn1] |
| No.36 | 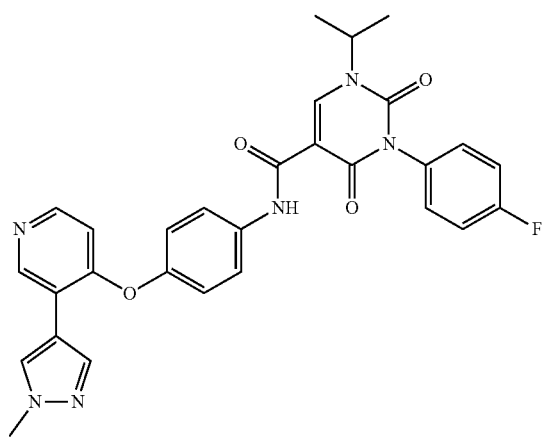 [SMILES: CC(C)n1cc(C(=O)Nc2ccc(Oc3ccncc3-c3cnn(C)c3)cc2)c(=O)n(-c2ccc(F)cc2)c1=O] |
| No.37 | 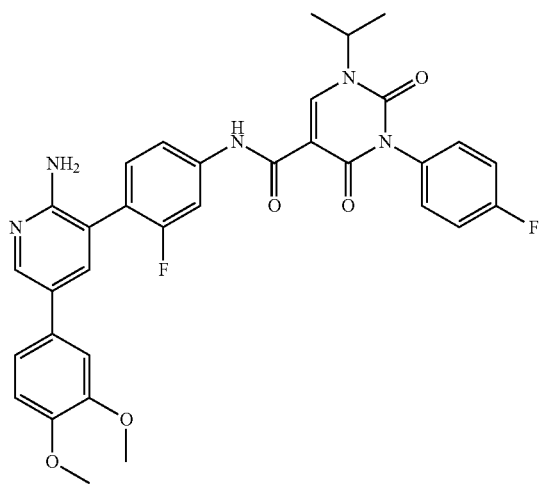 [SMILES: COc1ccc(-c2cnc(N)c(-c3ccc(NC(=O)c4cn(C(C)C)c(=O)n(-c5ccc(F)cc5)c4=O)cc3F)c2)cc1OC] |

TABLE 1-continued
| Compound | Structural formula |
|---|---|
| No.38 | 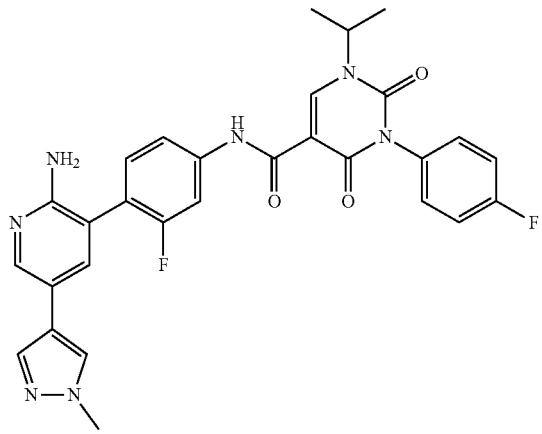 [SMILES: CC(C)n1cc(C(=O)Nc2ccc(-c3cc(-c4cnn(C)c4)cnc3N)c(F)c2)c(=O)n(-c2ccc(F)cc2)c1=O] |
| No.39 | 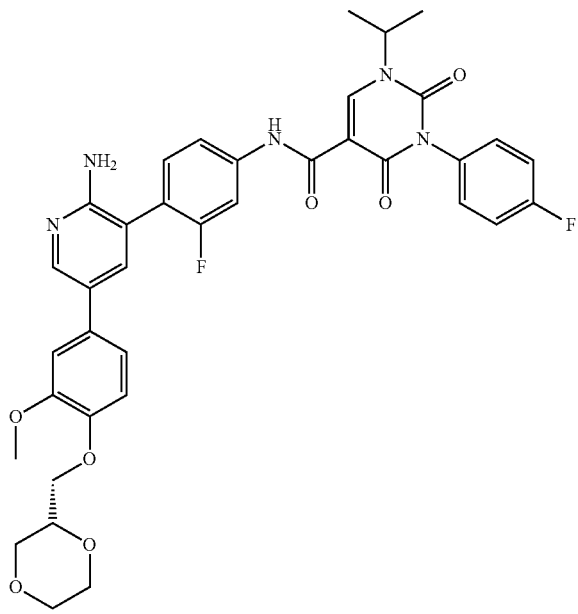 |
| No.40 | 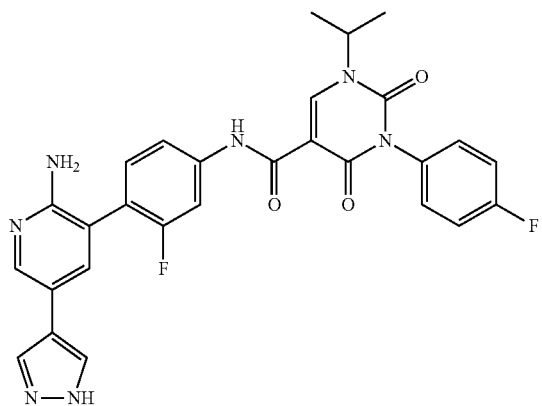 [SMILES: CC(C)n1cc(C(=O)Nc2ccc(-c3cc(-c4cn[nH]c4)cnc3N)c(F)c2)c(=O)n(-c2ccc(F)cc2)c1=O] |

TABLE 1-continued
| Compound | Structural formula |
|---|---|
| No.41 | 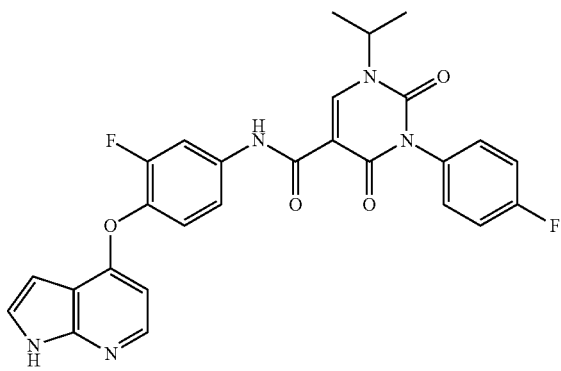 [SMILES: CC(C)n1cc(C(=O)Nc2ccc(Oc3ccnc4[nH]ccc34)c(F)c2)c(=O)n(-c2ccc(F)cc2)c1=O] |
| No.42 | 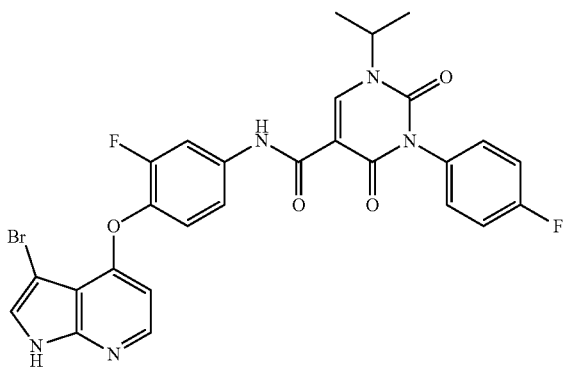 [SMILES: CC(C)n1cc(C(=O)Nc2ccc(Oc3ccnc4[nH]cc(Br)c34)c(F)c2)c(=O)n(-c2ccc(F)cc2)c1=O] |
| No.43 | 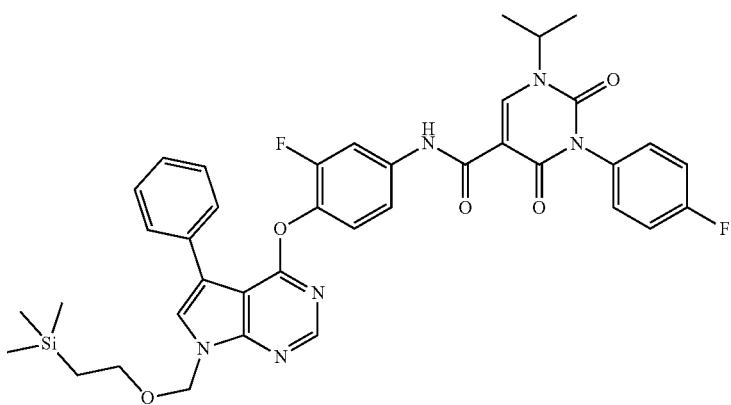 [SMILES: CC(C)n1cc(C(=O)Nc2ccc(Oc3ncnc4c3c(-c3ccccc3)cn4COCC[Si](C)(C)C)c(F)c2)c(=O)n(-c2ccc(F)cc2)c1=O] |
| No.44 | 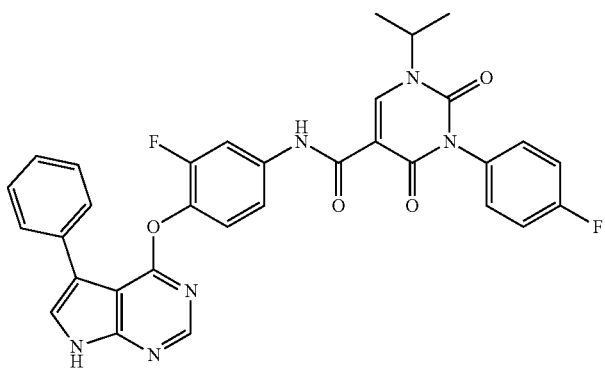 [SMILES: CC(C)n1cc(C(=O)Nc2ccc(Oc3ncnc4[nH]cc(-c5ccccc5)c34)c(F)c2)c(=O)n(-c2ccc(F)cc2)c1=O] |

TABLE 1-continued
| Compound | Structural formula |
|---|---|
| No.45 | 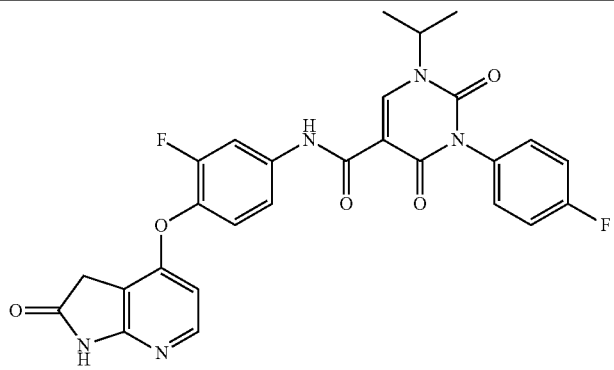 |
| No.46 | 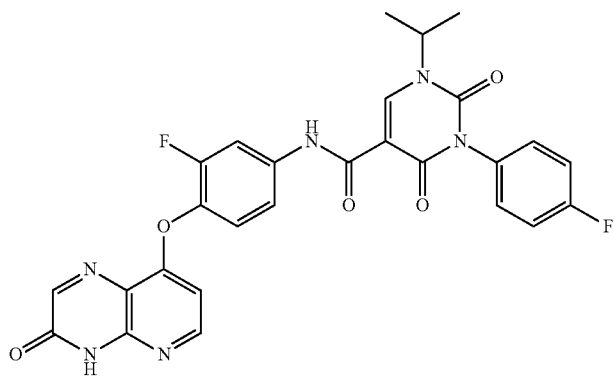 [SMILES: CC(C)n1cc(C(=O)Nc2ccc(Oc3ccnc4[nH]c(=O)cnc34)c(F)c2)c(=O)n(-c2ccc(F)cc2)c1=O] |
| No.47 | 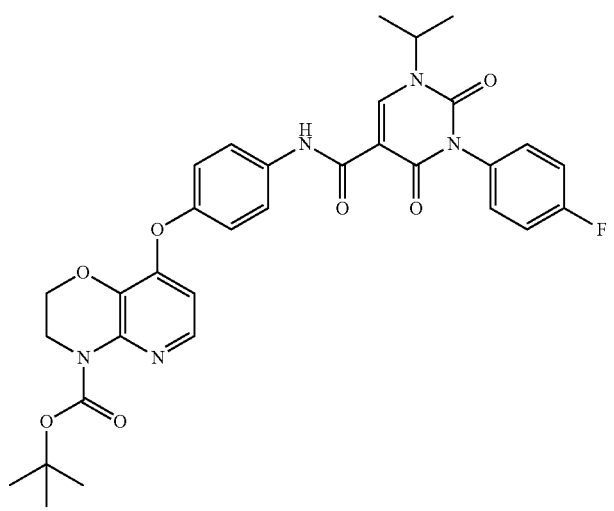 [SMILES: CC(C)n1cc(C(=O)Nc2ccc(Oc3ccnc4c3OCCN4C(=O)OC(C)(C)C)cc2)c(=O)n(-c2ccc(F)cc2)c1=O] |
| No.48 | 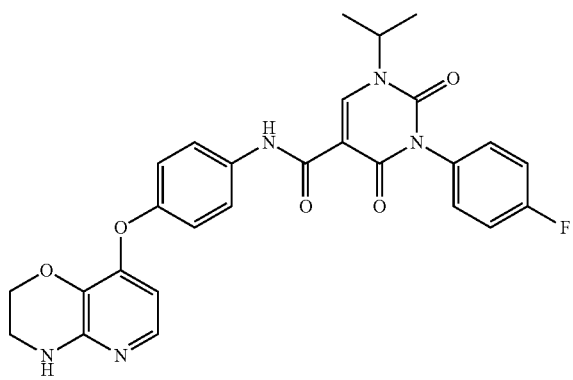 [SMILES: CC(C)n1cc(C(=O)Nc2ccc(Oc3ccnc4c3OCCN4)cc2)c(=O)n(-c2ccc(F)cc2)c1=O] |

TABLE 1-continued
| Compound | Structural formula |
|---|---|
| No.49 | 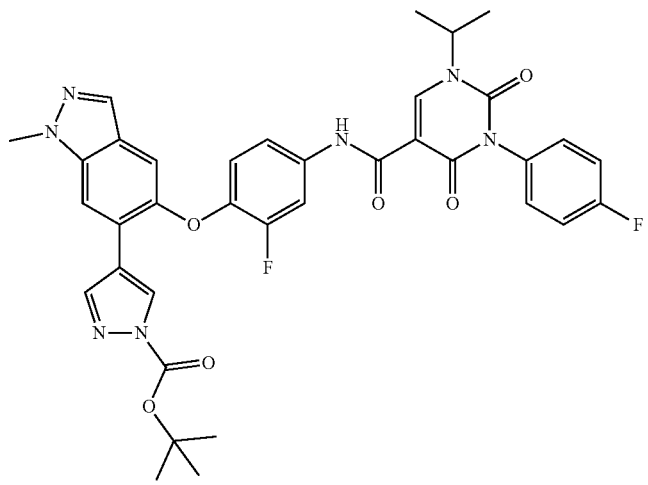 [SMILES: CC(C)n1cc(C(=O)Nc2ccc(Oc3cc4cnn(C)c4cc3-c3cnn(C(=O)OC(C)(C)C)c3)c(F)c2)c(=O)n(-c2ccc(F)cc2)c1=O] |
| No.50 | 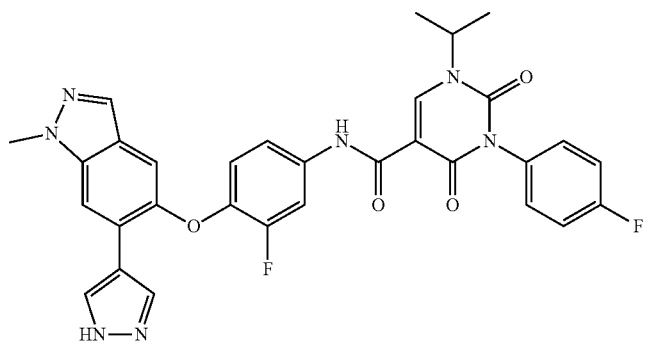 [SMILES: CC(C)n1cc(C(=O)Nc2ccc(Oc3cc4cnn(C)c4cc3-c3cn[nH]c3)c(F)c2)c(=O)n(-c2ccc(F)cc2)c1=O] |
| No.51 | 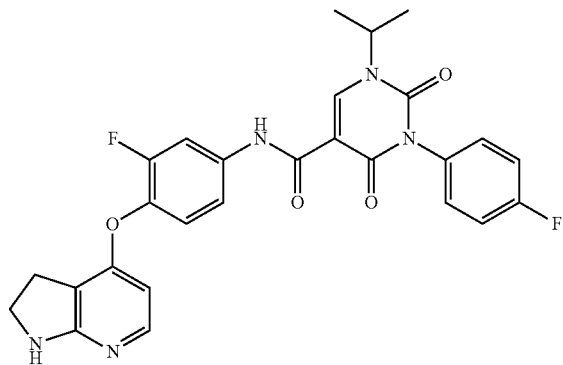 [SMILES: CC(C)n1cc(C(=O)Nc2ccc(Oc3ccnc4c3CCN4)c(F)c2)c(=O)n(-c2ccc(F)cc2)c1=O] |
| No.52 | 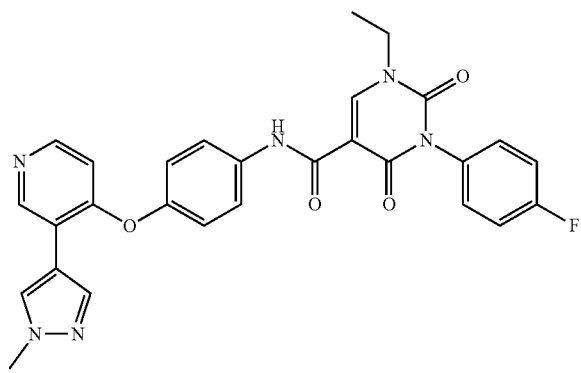 [SMILES: CCn1cc(C(=O)Nc2ccc(Oc3ccncc3-c3cnn(C)c3)cc2)c(=O)n(-c2ccc(F)cc2)c1=O] |

TABLE 1-continued

| Compound | Structural formula |
|---|---|
| No.53 | |
| No.54 | |
| No.55 | |
| No.56 | |

TABLE 1-continued

Compound | Structural formula

No.57

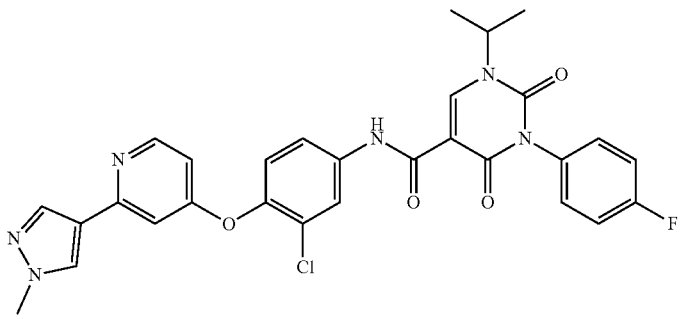 [SMILES: CC(C)n1cc(C(=O)Nc2ccc(Oc3ccnc(-c4cnn(C)c4)c3)c(Cl)c2)c(=O)n(-c2ccc(F)cc2)c1=O]

No.58

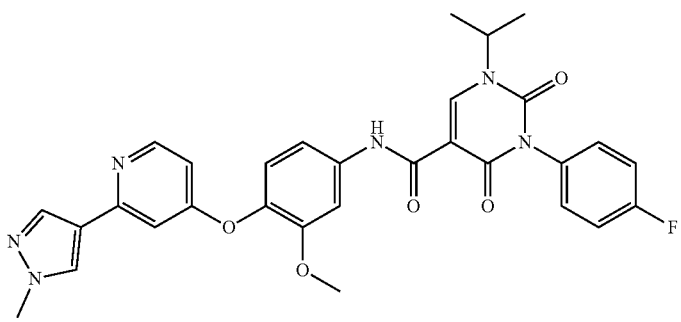 [SMILES: COc1cc(NC(=O)c2cn(C(C)C)c(=O)n(-c3ccc(F)cc3)c2=O)ccc1Oc1ccnc(-c2cnn(C)c2)c1]

As used herein, the term "pharmaceutically acceptable salt" refers to a salt formed by a compound of the present invention with an acid or base suitable for use as a medicine. Pharmaceutically acceptable salts include inorganic salts and organic salts. A preferred class of salts is the salts of the compounds of the invention formed with acids. Suitable acids for forming salts include, but are not limited to, inorganic acids such as hydrochloric acid, hydrobromic acid, hydrofluoric acid, sulfuric acid, nitric acid, and phosphoric acid; organic acids such as formic acid, acetic acid, trifluoroacetic acid, propionic acid, oxalic acid, malonic acid, succinic acid, fumaric acid, maleic acid, lactic acid, malic acid, tartaric acid, citric acid, picric acid, benzoic acid, methylsulfonic acid, ethanesulfonic acid, p-toluenesulfonic acid, benzenesulfonic acid, and naphthalenesulfonic acid; and amino acids such as proline, phenylalanine, aspartic acid and glutamic acid.

Another preferred class of salts are salts of the compounds of the invention formed with bases, such as alkali metal salts (for example sodium or potassium salts), alkaline earth metal salts (for example magnesium or calcium salts), ammonium salts (such as lower grades alkanol ammonium salts and other pharmaceutically acceptable amine salts), such as methylamine salt, ethylamine salt, propylamine salt, dimethylamine salt, trimethylamine salt, diethylamine salt, triethylamine salt, tert-butylamine salt, ethylenediamine salt, hydroxyethylamine salt, dihydroxyethylamine salt, trishydroxyethylamine salt, and an amine salt formed from morpholine, piperazine, and lysine, respectively.

The term "solvate" refers to a complex in which the compound of the present invention coordinates with solvent molecules at a specific ratio. "Hydrate" refers to a complex formed by the coordination of the compound of the invention with water.

The term "prodrug" includes compounds which themselves can be biologically active or inactive, when administered by an appropriate manner, they can be formed into a compound of formula (I), or salts or solution consisted of the compound of formula (I) by metabolization or chemical reaction in the human body. The prodrug includes, but is not limited to a carboxylic acid ester, a carbonate, a phosphate, a nitrate, a sulfate, a sulfone ester, a sulfoxide ester, an amino compound, a carbamate, an azo compound, phosphoramide, glucoside, ether, acetal and the like of the compound.

Preparation Method

The preparation method of the compound with a structure of formula (I) according to the present invention is more specifically described below, but these specific methods do not constitute any limitation. The compounds of the present invention may also be conveniently prepared by optionally combining various synthetic methods described in the specification or known in the art, and such combinations are readily made by those skilled in the art to which the present invention pertains.

The reaction is carried out in a solvent suitable for the reagent, and the material used is suitable for the conversion being performed. In addition, in the following description of the synthesis method, it should be understood that all the proposed reaction conditions, including the selection of the solvent, the reaction atmosphere, the reaction temperature, the duration of the experiment and the post-treatment procedure, are selected as conditions that should be readily recognized by those skilled in the field of organic synthesis and that are standard for the reaction.

It should be understood that the examples and embodiments described herein are for illustrative purposes only, and that various modifications or changes resulting from them will be suggested to those skilled in the art and should be included within the spirit and scope of this application and the scope of the claims. Specific chemical transformations are listed in subsequent reaction routes, and those skilled in the art will recognize that a variety of different reagents can be used instead of the listed reagents.

Typically, the preparation process of the compounds of the present invention is as follows, wherein the starting materials and reagents used are commercially available unless otherwise specified.

At a certain temperature, the compound of formula (a) is reacted with the compound of formula (b) for a period of time to form the compound of formula (I);

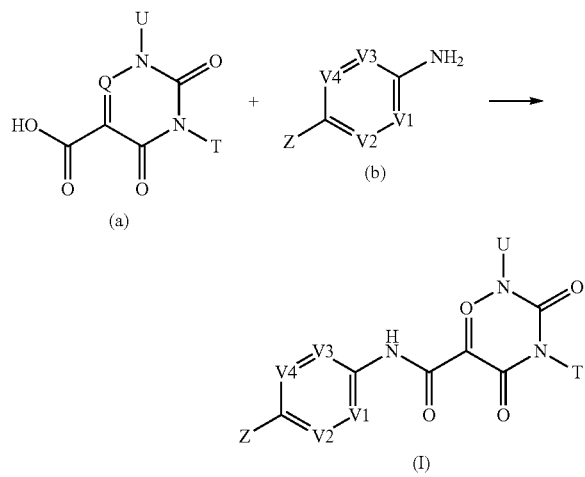

wherein, T, U, Q, V1, V2, V3, V4, and Z are as defined above.

Pharmaceutical Composition and Method for Administration

Since the compounds of the present invention have excellent kinase inhibitory activity, especially Axl and c-Met kinase inhibitory activity, the compounds of the present invention and their various crystal forms, and their pharmaceutically acceptable inorganic or organic salts, hydrates or solvates, and pharmaceutical compositions containing the compounds of the present invention as main active ingredients can be used to treat, prevent and alleviate diseases related to kinase, especially Axl and/or c-Met activity or expression level. According to the prior art, the compound of the present invention can be used to treat the following diseases: cancer; the cancers include chronic myelogenous leukemia, chronic myelodysplastic disease, lung cancer, skin cancer, prostate cancer, esophageal cancer, ovarian cancer, pancreatic cancer, gastric cancer, liver cancer, thyroid cancer, kidney cancer, glioblastoma, malignant glioma, breast cancer, acute myeloid leukemia, colorectal cancer, uterine cancer, cervical cancer, malignant glioma, ocular pigment layer melanoma, osteosarcoma, soft tissue sarcoma, glioma, melanoma, head and neck cancer, bladder cancer, cholangiocarcinoma, nasopharyngeal carcinoma, synovial sarcoma, rhabdomyosarcoma, fibrosarcoma, leiomyosarcoma, myeloma and lymphoma.

The pharmaceutical composition of the present invention comprises a safe and effective amount of a compound of the present invention or a pharmacologically acceptable salt thereof, and a pharmacologically acceptable excipient or carrier. In which, "safe and effective amount" is meant that the amount of the compound is sufficient to significantly improve the condition without causing serious side effects. Generally, the pharmaceutical composition contains 1-2000 mg of the compound of the present invention/dose, more preferably, 50-200 mg of the compound of the present invention/dose. Preferably, the "dose" is a capsule or tablet.

"Pharmaceutically acceptable carrier" means one or more compatible solid or liquid fillers or gelatinous materials which are suitable for human use and should be of sufficient purity and sufficiently low toxicity. "Compatibility" means that each component in the composition can be admixed with the compounds of the present invention and with each other without significantly reducing the efficacy of the compounds. Some examples of pharmaceutically acceptable carriers include cellulose and the derivatives thereof (such as sodium carboxymethyl cellulose, sodium ethyl cellulose, and cellulose acetate, etc.), gelatin, talc, solid lubricants (such as stearic acid, and magnesium stearate), calcium sulfate, vegetable oils (such as soybean oil, sesame oil, peanut oil, and olive oil, etc.), polyols (such as propylene glycol, glycerol, mannitol, and sorbitol, etc.), emulsifiers (such as Tween®), wetting agent (such as sodium dodecyl sulfate), coloring agents, flavoring agents, stabilizers, antioxidants, preservatives, and pyrogen-free water, etc.

The pharmaceutical composition is an injection, a capsule, a tablet, a pill, a powder, or a granule.

The administration mode of the compound or pharmaceutical composition of the present invention is not particularly limited, and representative administration modes include, but are not limited to oral, intratumoral, rectal, parenteral (intravenous, intramuscular or subcutaneous) and topical administration.

Solid dosage forms for oral administration include capsules, tablets, pills, powders and granules. In these solid dosage forms, the active ingredient is mixed with at least one conventional inert excipient (or carrier), such as sodium citrate or dicalcium phosphate, or mixed with any of the following components: (a) fillers or compatibilizer, for example, starch, lactose, sucrose, glucose, mannitol and silicic acid; (b) binders, for example, hydroxymethyl cellulose, alginate, gelatin, polyvinylpyrrolidone, sucrose and arabic gum; (c) humectants, such as, glycerol; (d) disintegrating agents such as agar, calcium carbonate, potato starch or tapioca starch, alginic acid, certain composite silicates, and sodium carbonate; (e) retarding solvents, for example, wax, (f) absorption accelerators, for example, quaternary ammonium compound; (g) wetting agents, for example, cetyl alcohol and glyceryl monostearate; (h) adsorbents, for example, kaolin; and (i) lubricants, for example, talc, calcium stearate, magnesium stearate, solid polyethylene glycol, sodium dodecyl sulfate or mixture thereof. In capsules, tablets and pills, the dosage forms may also contain buffering agents.

Solid dosage forms such as tablets, dragees, capsules, pills and granules can be prepared with coatings and shells such as enteric coatings and other materials known in the art. They may contain opacifying agents and the release of the active compound or compound in such compositions may be released in a portion of the digestive tract in a delayed manner. Examples of embedding components that can be employed are polymeric materials and waxy materials. If necessary, the active compound may also be in microencapsulated form with one or more of the above-mentioned excipients.

Liquid dosage forms for oral administration include pharmaceutically acceptable emulsions, solutions, suspensions, syrups or tinctures. In addition to the active compound, the liquid dosage form may contain inert diluents conventionally used in the art, such as water or other solvents, solubilizers and emulsifiers, for example, ethanol, isopropanol, ethyl carbonate, ethyl acetate, propylene glycol, 1,3-butanediol, dimethylformamide and oils, especially cottonseed oil, peanut oil, corn germ oil, olive oil, castor oil and sesame oil or mixtures of these substances.

In addition to these inert diluents, the compositions may contain adjuvants such as wetting agents, emulsifying and suspending agents, sweetening agents, flavoring agents and spices.

In addition to the active compound, the suspension may contain suspending agent, for example, ethoxylated isooctadecanol, polyoxyethylene sorbitol and dehydrated sorbitan ester, microcrystalline cellulose, aluminum methoxide and agar, or the mixture thereof etc.

The compositions for parenteral injection may comprise physiologically acceptable sterile aqueous or anhydrous solutions, dispersions, suspensions or emulsions, and sterile powders which can be re-dissolved into sterile injectable solutions or dispersions. Suitable aqueous and non-aqueous carriers, diluents, solvents or excipients include water, ethanol, polyols and any suitable mixtures thereof.

Dosage forms for the compounds of the invention for topical administration include ointments, powders, patches, sprays and inhalants. The active ingredient is mixed under sterile conditions with a physiologically acceptable carrier and any preservatives, buffers, or propellants which may be required if necessary.

The compounds of the present invention can be administered alone or in combination with other pharmaceutically acceptable compounds (such as anti-tumor drugs).

The treatment method of the present invention can be administered alone or in combination with other treatment means or therapeutic drugs.

When the pharmaceutical composition is used, a safe and effective amount of the compound of the present invention is applied to a mammal (such as a human) in need of treatment, wherein the dosage at the time of administration is the pharmaceutically effective dosage, for people having a body weight of 60 kg, the daily dose is usually 1~2000 mg, preferably 5~500 mg. Of course, specific doses should also consider factors such as the administration route, and the health of the patient, etc., which are within the skill of the skilled physician.

Compared with the prior art, the present invention has the following main advantages:

The compound of the invention can effectively inhibit Axl kinase and c-Met kinase activities;

The compound of the invention can effectively inhibit the proliferation activity of Axl-dependent cell lines and c-Met-dependent cell lines.

The present invention will be further illustrated below with reference to the specific examples. It should be understood that these examples are only to illustrate the invention but not to limit the scope of the invention. Experimental methods in which the specific conditions are not specified in the following examples are usually in accordance with conventional conditions such as the conditions described in Sambrook et al., Molecular Cloning: Laboratory Manual (New York: Cold Spring Harbor Laboratory Press, 1989), or in accordance with the conditions recommended by the manufacturer. Unless indicated otherwise, percentage and parts are calculated by weight.

Unless otherwise defined, all professional and scientific terminology used in the text have the same meanings as known to the skilled in the art. In addition, any methods and materials similar or equal with the record content can apply to the methods of the invention. The method of the preferred embodiment described herein and the material are only for demonstration purposes.

Example 1

N-(3-fluoro-4-((2-(1-methyl-1H-pyrazol-4-yl)pyridin-4-yl)oxy)phenyl)-3-(4-fluorophenyl)-1-methyl-2,4-dioxo-1,2,3,4-tetrahydropyrimidin-5-carboxamide

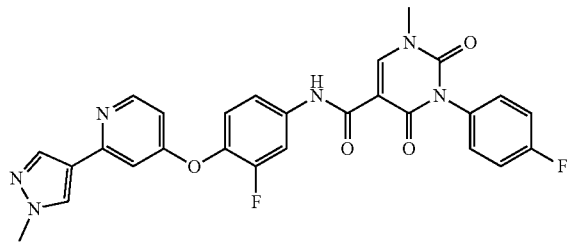 [SMILES: Cn1cc(-c2cc(Oc3ccc(NC(=O)c4cn(C)c(=O)n(-c5ccc(F)cc5)c4=O)cc3F)ccn2)cn1]

Step 1: Preparation of diethyl 2-[3-(4-fluorophenyl) ureido methylene] malonate

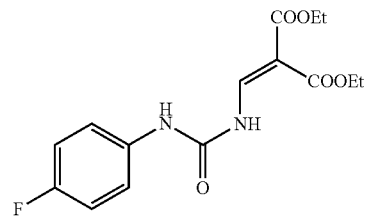 [SMILES: CCOC(=O)C(=CNC(=O)Nc1ccc(F)cc1)C(=O)OCC]

Diethyl 2-aminomethylene-malonate (8.35 g, 44.6 mmol) and 4-fluorophenylisocyanate (5.3 mL, 46.9 mmol) were dissolved in 12 mL of 1,2-dichloroethane, N,N-diisopropylethylamine was added dropwise, and then the mixture was stirred at 80° C. overnight. The temperature of the mixture was reduced to room temperature, then the mixture was cooled in an ice bath, filtered by suction to obtain a solid which was washed with methyl tert-butyl ether, and dried by suction to obtain 12.9 g of product, yield: 89%.

$^1$H NMR (300 MHz, DMSO-$d_6$) δ 10.58 (d, J=12.5 Hz, 1H), 10.42 (s, 1H), 8.46 (d, J=12.5 Hz, 1H), 7.56-7.45 (m, 2H), 7.19 (t, J=8.9 Hz, 2H), 4.19 (dq, J=27.1, 7.1 Hz, 4H), 1.25 (dt, J=8.9, 7.1 Hz, 6H).

Step 2: Preparation of ethyl 3-(4-fluorophenyl)-2,4-dioxo-1,2,3,4-tetrahydropyrimidin-5-formate

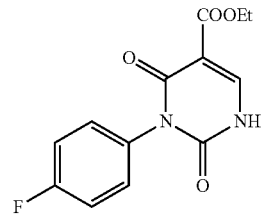 [SMILES: CCOC(=O)c1c[nH]c(=O)n(-c2ccc(F)cc2)c1=O]

Diethyl 2-[3-(4-fluorophenyl) ureido methylene] malonate (12.9 g, 39.6 mmol) was added to 57 mL of ethanol, sodium ethoxide (20%, dissolved in ethanol) was added dropwise, after the addition, and the mixture was stirred at room temperature for 3 hours. The reaction mixture was diluted with ethyl acetate, washed twice with 1 mol/L hydrochloric acid, washed once with water, washed once with saturated sodium chloride aqueous solution, and ethyl acetate layer was finally concentrated to obtain a residue which was slurried with petroleum ether-ethyl acetate (1/1), and filtered by suction to obtain a solid. The solid was washed with a small amount of methyl tert-butyl ether and dried by suction to obtain 5.2 g of product, yield: 47%.

$^1$H NMR (400 MHz, DMSO-$d_6$) δ 12.09 (s, 1H), 8.26 (s, 1H), 7.37-7.25 (m, 4H), 4.18 (q, J=7.1 Hz, 2H), 1.24 (t, J=7.1 Hz, 3H).

Step 3: Preparation of ethyl 3-(4-fluorophenyl)-1-methyl-2,4-dioxo-1,2,3,4-tetrahydropyrimidin-5-formate

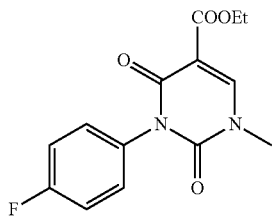

Ethyl 3-(4-fluorophenyl)-2,4-dioxo-1,2,3,4-tetrahydropyrimidin-5-formate (200 mg, 0.72 mmol), methyl iodide (0.134 mL, 2.16 mmol) and anhydrous potassium carbonate (199 mg, 1.43 mmol) were added to 0.5 mL of N,N-dimethylformamide, then stirred at 65° C. for 8 hours. The heating was stopped, and the temperature was cooled to room temperature, the reaction mixture was filtered by suction and washed with 15 mL of ethyl acetate. The resulting filtrate was washed once with 1 mol/L sodium carbonate aqueous solution, washed once with water, washed once with saturated sodium chloride aqueous solution, and then the ethyl acetate layer was concentrated and dried by suction to obtain 77 mg of solid, yield: 92%.

$^1$H NMR (300 MHz, CDCl$_3$) δ 8.32 (s, 1H), 7.17 (d, J=6.6 Hz, 4H), 4.34 (q, J=7.1 Hz, 2H), 3.54 (s, 3H), 1.35 (t, J=7.1 Hz, 3H).

Step 4: Preparation of 3-(4-fluorophenyl)-1-methyl-2,4-dioxo-1,2,3,4-tetrahydropyrimidin-5-carboxylic acid

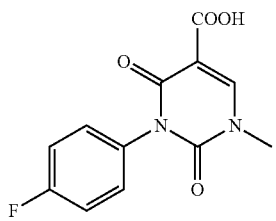 [SMILES: Cn1cc(C(=O)O)c(=O)n(-c2ccc(F)cc2)c1=O]

Ethyl 3-(4-fluorophenyl)-1-methyl-2,4-dioxo-1,2,3,4-tetrahydropyrimidin-5-formate was added to 0.84 mL of dioxane, 0.31 mL of concentrated hydrochloric acid was added dropwise, and then the reaction was heated to 75° C. After 6.5 hours, the heating was stopped, and the temperature was cooled to room temperature, then water was added under stirring, filtered by suction to obtain a solid, and the solid was washed with water, then washed with petroleum ether, and dried by suction to obtain 91 mg of product, yield: 73%.

$^1$H NMR (300 MHz, DMSO-$d_6$) δ 12.60 (s, 1H), 8.81 (s, 1H), 7.39-7.26 (m, 4H), 3.47 (s, 3H).

Step 5: Preparation of 4-((2-chloropyridin-4-yl)oxy)-3-fluoroaniline

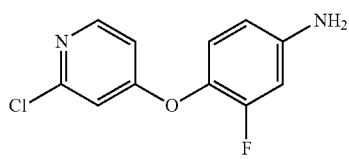 [SMILES: Nc1ccc(Oc2ccnc(Cl)c2)c(F)c1]

4-amino-2-fluorophenol (704 mg, 5.5 mmol) was dissolved in 5 mL of N,N-diethylacetamide, potassium tert-butoxide (640 mg, 5.7 mmol) was added under stirring, and then stirred at room temperature for 0.5 hours. Then 2,4-dichloropyridine (700 mg, 4.7 mmol) was added and the temperature was raised to 85° C. for reacting. After 4 hours, the heating was stopped, and the temperature was cooled to room temperature. The reaction solution was poured into water, extracted four times with ethyl acetate, ethyl acetate layers were combined, washed five times with saturated sodium chloride, and the organic phase was finally dried over anhydrous sodium sulfate and concentrated to obtain 1.27 g of crude product.

$^1$H NMR (300 MHz, DMSO-$d_6$) δ 8.26 (d, J=5.7 Hz, 1H), 7.01 (t, J=9.0 Hz, 1H), 6.96-6.88 (m, 2H), 6.55-6.39 (m, 2H), 5.53 (s, 2H).

Step 6: Preparation of 3-fluoro-4-((2-(1-methyl-1H-pyrazol-4-yl)pyridin-4-yl)oxy)aniline

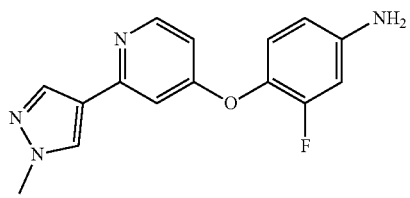 [SMILES: Cn1cc(-c2cc(Oc3ccc(N)cc3F)ccn2)cn1]

4-((2-chloropyridin-4-yl)oxy)-3-fluoroaniline (500 mg, 2.1 mmol), 1-methylpyrazole-4-boronic acid pinacol ester (546 mg, 2.6 mmol) were added to a mixed solution of 12 mL dioxane and 2 mL of water, then potassium carbonate (871 mg, 6.3 mmol) and palladium tetratriphenylphosphorus (243 mg, 0.2 mmol) were added, and then reacted at 100° C. under argon protection. After 12 hours, the heating was stopped, and the temperature was cooled to room temperature. The reaction solution was poured into water, extracted twice with ethyl acetate, and ethyl acetate layers were combined, washed once with saturated sodium chloride, and the organic phase was finally dried over anhydrous sodium sulfate, concentrated and purified by column chromatography to obtain 643 mg of product, yield: 100%.

$^1$H NMR (300 MHz, CDCl$_3$) δ 8.32 (dd, J=5.8, 0.5 Hz, 1H), 7.86-7.81 (m, 2H), 6.95-6.87 (m, 2H), 6.57 (ddd, J=5.8, 2.5, 0.6 Hz, 1H), 6.48 (dd, J=11.9, 2.6 Hz, 1H), 6.42 (ddd, J=8.6, 2.7, 1.2 Hz, 1H), 3.88 (s, 3H), 2.64 (s, 2H).

Step 7: Preparation of N-(3-fluoro-4-((2-(1-methyl-1H-pyrazol-4-yl)pyridin-4-yl)oxy)phenyl)-3-(4-fluorophenyl)-1-methyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline (40 mg, 0.14 mmol), 3-(4-fluorophenyl)-1-methyl-2,4-dioxo-1,2,3,4-tetrahydropyrimidin-5-formic acid (37 mg, 0.14 mmol), O-(7-azabenzotriazol)-N,N,N,N-tetramethyluronium hexafluorophosphate (62 mg, 0.17 mmol) and triethylamine (28 mg, 0.28 mmol) were added to 1 mL of N,N-dimethylformamide, and stirred at room temperature. After 14 hours, the reaction solution was poured into water, extracted three times with ethyl acetate, and the ethyl acetate layers were combined, washed five times with saturated sodium chloride, and the organic phase was finally dried over anhydrous sodium sulfate, concentrated, and purified by column chromatography to obtain 70 mg of product, yield: 94%.

$^1$H NMR (400 MHz, DMSO-$d_6$) δ 11.02 (s, 1H), 8.88 (s, 1H), 8.37 (d, J=5.7 Hz, 1H), 8.26 (s, 1H), 8.00-7.94 (m, 2H), 7.50 (dd, J=8.9, 2.3 Hz, 1H), 7.38 (qd, J=9.1, 4.2 Hz, 5H), 7.24 (d, J=2.5 Hz, 1H), 6.65 (dd, J=5.9, 2.4 Hz, 1H), 3.86 (s, 3H), 3.54 (s, 3H).

Example 2

1-ethyl-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-formamide

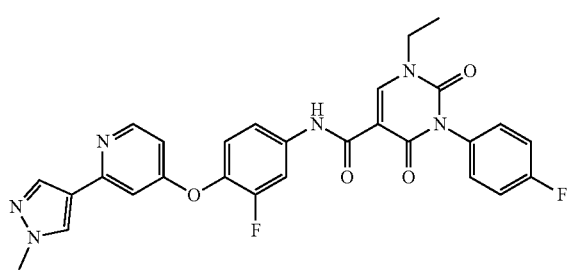 [SMILES: CCn1cc(C(=O)Nc2ccc(Oc3ccnc(-c4cnn(C)c4)c3)c(F)c2)c(=O)n(-c2ccc(F)cc2)c1=O]

Step 1: Preparation of ethyl 3-(4-fluorophenyl)-1-ethyl-2,4-dioxo-1,2,3,4-tetrahydropyrimidin-5-formate

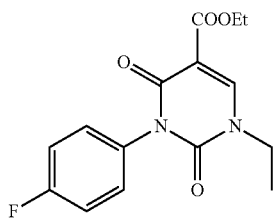

Methyl iodide was replaced with ethyl iodide, and the remaining required raw materials, reagents and preparation methods were the same as step 3 in Example 1 to obtain a product, yield: 96%.

$^1$H NMR (300 MHz, CDCl$_3$) δ 8.32 (d, J=1.8 Hz, 1H), 7.17 (d, J=6.9 Hz, 4H), 4.34 (q, J=7.0 Hz, 2H), 3.95 (q, J=7.1 Hz, 2H), 1.42 (t, J=7.3 Hz, 3H), 1.35 (t, J=7.2 Hz, 3H).

Step 2: Preparation of 3-(4-fluorophenyl)-1-ethyl-2,4-dioxo-1,2,3,4-tetrahydropyrimidin-5-carboxylic acid

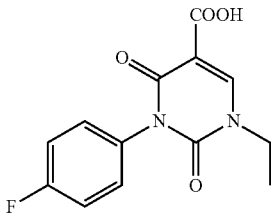 [SMILES: CCn1cc(C(=O)O)c(=O)n(-c2ccc(F)cc2)c1=O]

Ethyl 3-(4-fluorophenyl)-1-methyl-2,4-dioxo-1,2,3,4-tetrahydropyrimidin-5-formate was replaced with ethyl 3-(4-fluorophenyl)-1-ethyl-2,4-dioxo-1,2,3,4-tetrahydropyrimidin-5-formate, and the remaining required raw materials, reagents and preparation methods were the same as step 4 in Example 1 to obtain a product with a yield of 78%.

$^1$H NMR (300 MHz, DMSO-$d_6$) δ 12.62 (s, 1H), 8.81 (s, 1H), 7.42-7.28 (m, 4H), 3.95 (q, J=7.1 Hz, 2H), 1.25 (t, J=7.1 Hz, 3H).

Step 3: Preparation of 1-ethyl-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-formamide 3-(4-fluorophenyl)-1-methyl-2,4-dioxo-1,2,3,4-tetrahydropyrimidin-5-carboxylic acid was replaced with 3-(4-fluorophenyl)-1-ethyl-2,4-dioxo-1,2,3,4-tetrahydropyrimidin-5-carboxylic acid, and the remaining required raw materials, reagents and preparation methods were the same as step 7 in Example 1 to obtain a product with a yield of 99%.

$^1$H NMR (400 MHz, DMSO-$d_6$) δ 11.02 (s, 1H), 8.89 (s, 1H), 8.37 (d, J=5.7 Hz, 1H), 8.26 (s, 1H), 8.02-7.93 (m, 2H), 7.54-7.31 (m, 6H), 7.24 (d, J=2.5 Hz, 1H), 6.65 (dd, J=5.8, 2.5 Hz, 1H), 4.02 (q, J=7.0 Hz, 2H), 3.86 (s, 3H), 1.29 (t, J=7.1 Hz, 3H).

Example 3

N-(3-fluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide

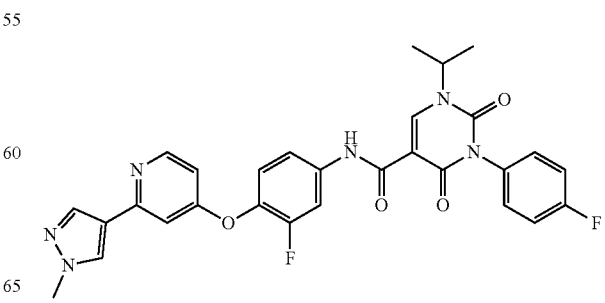

Step 1: Preparation of ethyl 3-(4-fluorophenyl)-1-isopropyl-2,4-dioxo-1,2,3,4-tetrahydropyrimidin-5-formate

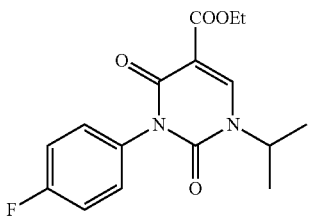 [SMILES: CCOC(=O)c1cn(C(C)C)c(=O)n(-c2ccc(F)cc2)c1=O]

Methyl iodide was replaced with isopropyl iodide, and the remaining required raw materials, reagents and preparation methods were the same as step 3 in Example 1 to obtain a product with a yield of 86%.

$^1$H NMR (400 MHz, DMSO-$d_6$) δ 8.43 (s, 1H), 7.33-7.23 (m, 4H), 4.68 (p, J=6.8 Hz, 1H), 4.20 (q, J=7.1 Hz, 2H), 1.35 (d, J=6.8 Hz, 6H), 1.23 (t, J=7.1 Hz, 3H).

Step 2: Preparation of 3-(4-fluorophenyl)-1-isopropyl-2,4-dioxo-1,2,3,4-tetrahydropyrimidin-5-carboxylic acid

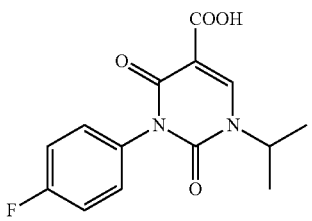 [SMILES: CC(C)n1cc(C(=O)O)c(=O)n(-c2ccc(F)cc2)c1=O]

Ethyl 3-(4-fluorophenyl)-1-methyl-2,4-dioxo-1,2,3,4-tetrahydropyrimidin-5-formate was replaced with ethyl 3-(4-fluorophenyl)-1-isopropyl-2,4-dioxo-1,2,3,4-tetrahydropyrimidin-5-formate, and the remaining required raw materials, reagents and preparation methods were the same as step 4 in Example 1 to obtain a product with a yield of 100%.

$^1$H NMR (400 MHz, DMSO-$d_6$) δ 12.68 (s, 1H), 8.59 (s, 1H), 7.35 (qd, J=9.0, 6.0 Hz, 4H), 4.72 (p, J=6.8 Hz, 1H), 1.39 (d, J=6.8 Hz, 6H).

Step 3: Preparation of N-(3-fluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 95%.

$^1$H NMR (400 MHz, DMSO-$d_6$) δ 11.04 (s, 1H), 8.68 (s, 1H), 8.37 (d, J=5.7 Hz, 1H), 8.27 (s, 1H), 8.03-7.93 (m, 2H), 7.55-7.47 (m, 1H), 7.48-7.31 (m, 5H), 7.25 (d, J=2.5 Hz, 1H), 6.64 (dd, J=5.7, 2.5 Hz, 1H), 4.78 (p, J=6.8 Hz, 1H), 3.86 (s, 3H), 1.42 (d, J=6.8 Hz, 6H).

Example 4

N-(3-fluoro-4-((2-(1-methyl-1H-pyrazol-4-yl)pyridin-4-yl)oxy)phenyl)-3-(4-fluorophenyl)-1-propyl-2,4-dioxo-1,2,3,4-tetrahydropyrimidin-5-carboxamide

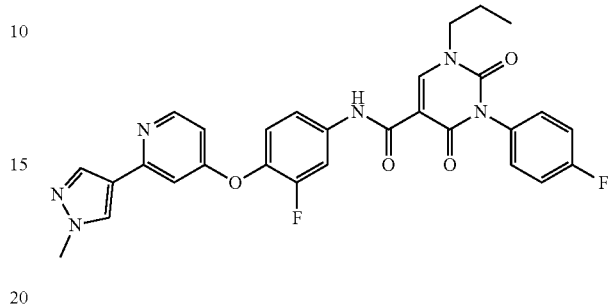

Step 1: Preparation of ethyl 3-(4-fluorophenyl)-1-propyl-2,4-dioxo-1,2,3,4-tetrahydropyrimidin-5-formate

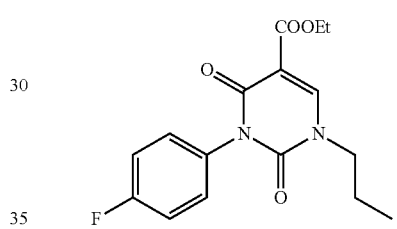

Methyl iodide was replaced with 1-propyl iodide, and the remaining required raw materials, reagents and preparation methods were the same as step 3 in Example 1 to obtain a product with a yield of 88%.

$^1$H NMR (300 MHz, CDCl$_3$) δ 8.29 (s, 1H), 7.17 (d, J=6.9 Hz, 4H), 4.34 (q, J=7.1 Hz, 2H), 3.84 (t, 2H), 1.82 (h, J=7.5 Hz, 2H), 1.35 (t, J=7.1 Hz, 3H), 1.00 (t, J=7.4 Hz, 3H).

Step 2: Preparation of 3-(4-fluorophenyl)-1-propyl-2,4-dioxo-1,2,3,4-tetrahydropyrimidin-5-carboxylic acid

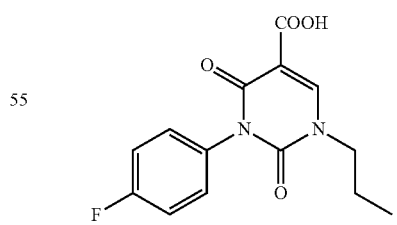

Ethyl 3-(4-fluorophenyl)-1-methyl-2,4-dioxo-1,2,3,4-tetrahydropyrimidin-5-formate was replaced with ethyl 3-(4-fluorophenyl)-1-propyl-2,4-dioxo-1,2,3,4-tetrahydropyrimidin-5-formate, and the remaining required raw materials, reagents and preparation methods were the same as step 4 in Example 1 to obtain a product with a yield of 61%.

¹H NMR (300 MHz, CDCl₃) δ 12.29 (s, 1H), 8.53 (s, 1H), 7.23 (d, J=6.4 Hz, 4H), 3.91 (t. 2H), 1.83 (h, J=15.2, 7.7 Hz, 2H), 1.02 (t, J=7.4 Hz, 3H).

Step 3: Preparation N-(3-fluoro-4-((2-(1-methyl-1H-pyrazol-4-yl)pyridin-4-yl)oxy)phenyl)-3-(4-fluorophenyl)-1-propyl-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 3-(4-fluorophenyl)-1-propyl-2,4-dioxo-1,2,3,4-tetrahydropyrimidin-5-carboxylic acid, and the remaining required raw materials, reagents and preparation methods were the same as step 7 in Example 1 to obtain a product with a yield of 98%.

¹H NMR (400 MHz, DMSO-d₆) δ 11.04 (s, 1H), 8.87 (s, 1H), 8.38 (d, J=5.7 Hz, 1H), 8.28 (s, 1H), 8.03-7.94 (m, 2H), 7.51 (ddd, J=8.9, 2.6, 1.2 Hz, 1H), 7.48-7.29 (m, 5H), 7.25 (d, J=2.4 Hz, 1H), 6.65 (dd, J=5.7, 2.4 Hz, 1H), 3.99-3.86 (m, 2H), 3.86 (s, 3H), 1.71 (hept, J=7.6 Hz, 2H), 0.98-0.83 (m, 3H).

Example 5

1-(cyclopropylmethyl)-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-carboxamide

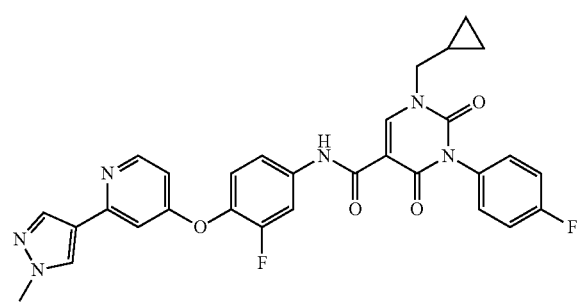 [SMILES: Cn1cc(-c2cc(Oc3ccc(NC(=O)c4cn(CC5CC5)c(=O)n(-c5ccc(F)cc5)c4=O)cc3F)ccn2)cn1]

Step 1: Preparation of ethyl 1-cyclopropylmethyl-3-(4-fluorophenyl)-2,4-dioxo-1,2,3,4-tetrahydropyrimidin-5-formate

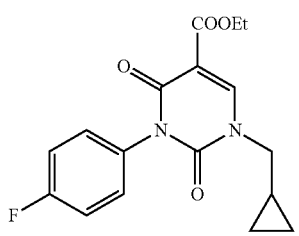 [SMILES: CCOC(=O)c1cn(CC2CC2)c(=O)n(-c2ccc(F)cc2)c1=O]

Methyl iodide was replaced with cyclopropyl methyl bromide, and the remaining required raw materials, reagents and preparation methods were the same as step 3 in Example 1 to obtain a product with a yield of 94%.

¹H NMR (300 MHz, CDCl₃) δ 8.42 (s, 1H), 7.22-7.09 (m, 4H), 4.34 (q, J=7.1 Hz, 2H), 3.74 (d, J=7.3 Hz, 2H), 1.35 (t, J=7.1 Hz, 3H), 1.30-1.16 (m, 1H), 0.75-0.65 (m, 2H), 0.46-0.38 (m, 2H).

Step 2: Preparation of 1-cyclopropylmethyl-3-(4-fluorophenyl)-2,4-dioxo-1,2,3,4-tetrahydropyrimidin-5-carboxylic acid

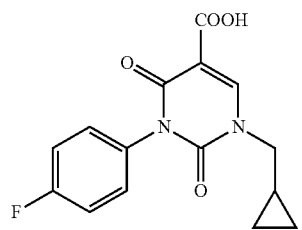 [SMILES: O=C(O)c1cn(CC2CC2)c(=O)n(-c2ccc(F)cc2)c1=O]

Ethyl 3-(4-fluorophenyl)-1-methyl-2,4-dioxo-1,2,3,4-tetrahydropyrimidin-5-formate was replaced with 1-cyclopropylmethyl-3-(4-fluorophenyl)-2,4-dioxo-1,2,3,4-tetrahydropyrimidin-5-ethyl formate, and the remaining required raw materials, reagents and preparation methods were the same as step 4 in Example 1 to obtain a product with a yield of 93%.

¹H NMR (300 MHz, CDCl₃) δ 12.35 (s, 1H), 8.66 (s, 1H), 7.24 (d, J=6.5 Hz, 4H), 3.80 (d, J=7.4 Hz, 2H), 1.25 (ddd, J=12.8, 8.1, 4.9 Hz, 1H), 0.81-0.68 (m, 2H), 0.51-0.39 (m, 2H).

Step 3: Preparation of 1-(cyclopropylmethyl)-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-cyclopropylmethyl-3-(4-fluorophenyl)-2,4-dioxo-1,2,3,4-tetrahydropyrimidin-5-carboxylic acid, and the remaining required raw materials, reagents and preparation methods were the same as step 7 in Example 1 to obtain a product with a yield of 86%.

¹H NMR (400 MHz, DMSO-d₆) δ 11.03 (s, 1H), 8.93 (s, 1H), 8.38 (d, J=5.7 Hz, 1H), 8.28 (s, 1H), 8.03-7.95 (m, 2H), 7.55-7.42 (m, 3H), 7.37 (t, J=8.8 Hz, 3H), 7.25 (d, J=2.4 Hz, 1H), 6.65 (dd, J=5.7, 2.4 Hz, 1H), 3.89-3.84 (m, 5H), 1.30-1.23 (m, 1H), 0.60-0.53 (m, 2H), 0.49-0.41 (m, 2H).

Example 6

1-(cyclopentylmethyl)-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-carboxamide

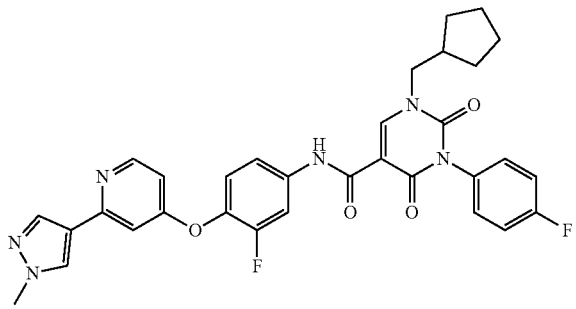 [SMILES: Cn1cc(-c2cc(Oc3ccc(NC(=O)c4cn(CC5CCCC5)c(=O)n(-c5ccc(F)cc5)c4=O)cc3F)ccn2)cn1]

Step 1: Preparation of ethyl 1-(cyclopentylmethyl)-3-(4-fluorophenyl)-2,4-dioxo-1,2,3,4-tetrahydropyrimidin-5-formate

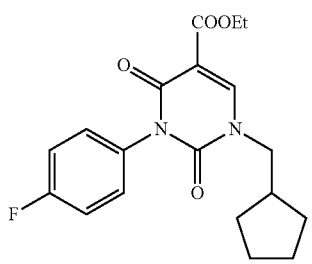 [SMILES: CCOC(=O)c1cn(CC2CCCC2)c(=O)n(-c2ccc(F)cc2)c1=O]

Methyl iodide was replaced with cyclopentyl methyl bromide, and the remaining required raw materials, reagents and preparation methods were the same as step 3 in Example 1 to obtain a product with a yield of 57%.

$^1$H NMR (400 MHz, DMSO-$d_6$) δ 8.65 (s, 1H), 7.34-7.27 (m, 4H), 4.21 (q, J=7.1 Hz, 2H), 3.84 (d, J=7.5 Hz, 2H), 2.25 (p, J=7.7 Hz, 1H), 1.74-1.58 (m, 4H), 1.58-1.45 (m, 2H), 1.29-1.17 (m, 5H).

Step 2: Preparation of 1-(cyclopentylmethyl)-3-(4-fluorophenyl)-2,4-dioxo-1,2,3,4-tetrahydropyrimidin-5-carboxylic acid

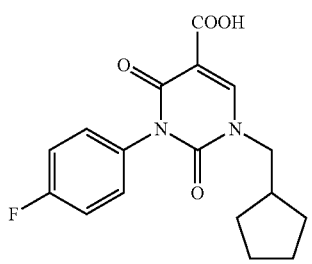 [SMILES: O=C(O)c1cn(CC2CCCC2)c(=O)n(-c2ccc(F)cc2)c1=O]

3-(4-fluorophenyl)-1-methyl-2,4-dioxo-1,2,3,4-tetrahydropyrimidin-5-ethyl formate was replaced with ethyl 1-(cyclopentylmethyl)-3-(4-fluorophenyl)-2,4-dioxo-1,2,3,4-tetrahydropyrimidin-5-formate, and the remaining required raw materials, reagents and preparation methods were the same as step 4 in Example 1 to obtain a product with a yield of 99%.

$^1$H NMR (400 MHz, DMSO-$d_6$) δ 12.65 (s, 1H), 8.79 (s, 1H), 7.41-7.30 (m, 4H), 3.88 (d, J=7.5 Hz, 2H), 2.25 (p, J=7.6 Hz, 1H), 1.76-1.57 (m, 4H), 1.57-1.45 (m, 2H), 1.29-1.17 (m, 2H).

Step 3: Preparation of 1-(cyclopentylmethyl)-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-carbox amide 3-(4-fluorophenyl)-1-methyl-2,4-dioxo-1,2,3,4-tetrahydropyrimidin-5-carboxylic acid was replaced with 1-(cyclopentylmethyl)-3-(4-fluorophenyl)-2,4-dioxo-1,2,3,4-tetrahydropyrimidin-5-carboxyli c acid, and the remaining required raw materials, reagents and preparation methods were the same as step 7 in Example 1 to obtain a product with a yield of 74%.

$^1$H NMR (400 MHz, CDCl$_3$) δ 10.94 (s, 1H), 8.63 (s, 1H), 8.41 (d, J=5.7 Hz, 1H), 7.95-7.81 (m, 3H), 7.30-7.26 (m, 5H), 7.16 (t, J=8.6 Hz, 1H), 7.00 (d, J=2.4 Hz, 1H), 6.64 (dd, J=5.7, 2.4 Hz, 1H), 3.96 (s, 3H), 3.93 (d, J=7.6 Hz, 2H), 2.42 (p, J=7.7 Hz, 1H), 1.90-1.80 (m, 2H), 1.77-1.72 (m, 2H), 1.68-1.60 (m, 2H), 1.38-1.29 (m, 2H).

Example 7

1-allyl-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-carboxamide

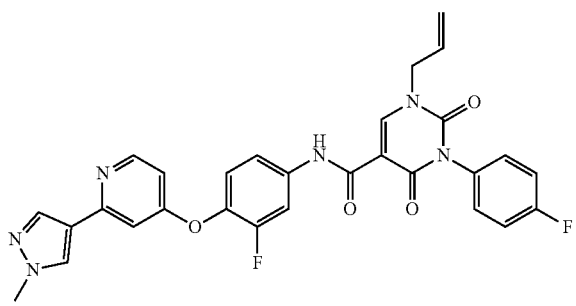 [SMILES: C=CCn1cc(C(=O)Nc2ccc(Oc3ccnc(-c4cnn(C)c4)c3)c(F)c2)c(=O)n(-c2ccc(F)cc2)c1=O]

Step 1: Preparation of ethyl 1-allyl-3-(4-fluorophenyl)-2,4-dioxo-1,2,3,4-tetrahydropyrimidin-5-formate

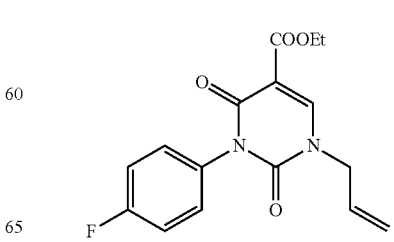

Methyl iodide was replaced with allyl bromide, and the remaining required raw materials, reagents and preparation methods were the same as step 3 in Example 1 to obtain a product with a yield of 75%.

$^1$H NMR (300 MHz, CDCl$_3$) δ 8.29 (s, 1H), 7.17 (d, J=6.9 Hz, 4H), 6.02-5.87 (m, 1H), 5.50-5.34 (m, 2H), 4.49 (d, J=6.0 Hz, 2H), 4.34 (q, J=7.1 Hz, 2H), 1.35 (t, J=7.1 Hz, 3H).

Step 2: Preparation of 1-allyl-3-(4-fluorophenyl)-2, 4-dioxo-1,2,3,4-tetrahydropyrimidin-5-carboxylic acid

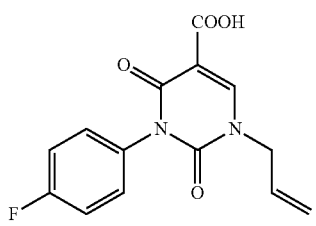 [SMILES: C=CCn1cc(C(=O)O)c(=O)n(-c2ccc(F)cc2)c1=O]

1-allyl-3-(4-fluorophenyl)-2,4-dioxo-1,2,3,4-tetrahydropyrimidin-5-ethyl formate (159 mg, 0.5 mmol) was dissolved in tetrahydrofuran, and 2 mL of 0.5 mol/L sodium hydroxide aqueous solution was added dropwise under stirring, and then the stirring was continued. After 20 minutes, the stirring was stopped, and the reaction mixture was extracted with ethyl acetate-water, the water layer was retained, and the reaction mixture was washed three times with ethyl acetate. The pH value of the water layer was adjusted to be about 2, and then extracted with dichloromethane for three times, combined, dried over anhydrous sodium sulfate, concentrated, and then a product was obtained by column chromatography with a yield of 53%.

$^1$H NMR (300 MHz, CDCl$_3$) δ 12.28 (s, 1H), 8.54 (s, 1H), 7.23 (d, J=6.4 Hz, 4H), 5.94 (ddt, J=16.7, 10.3, 6.3 Hz, 1H), 5.52-5.39 (m, 2H), 4.54 (dt, J=6.4, 1.3 Hz, 2H).

Step 3: Preparation of 1-allyl-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-allyl-3-(4-fluorophenyl)-2,4-dioxo-1,2,3,4-tetrahydropyrimidin-5-carboxylic acid, and the remaining required raw materials, reagents and preparation methods were the same as step 7 in Example 1 to obtain a product with a yield of 91%.

$^1$H NMR (400 MHz, DMSO-d$_6$) δ 11.02 (s, 1H), 8.81 (s, 1H), 8.37 (dd, J=5.7, 0.5 Hz, 1H), 8.27 (s, 1H), 8.02-7.94 (m, 2H), 7.52 (ddd, J=8.8, 2.5, 1.2 Hz, 1H), 7.47-7.41 (m, 2H), 7.41-7.31 (m, 3H), 7.25 (d, J=2.5 Hz, 1H), 6.65 (dd, J=5.8, 2.5 Hz, 1H), 5.99 (ddt, J=17.2, 10.3, 5.5 Hz, 1H), 5.43-5.25 (m, 2H), 4.62 (s, 2H), 3.86 (s, 3H).

Example 8

N-(3-fluoro-4-((2-(1-methyl-1H-pyrazol-4-yl)pyridin-4-yl)oxy)phenyl)-3-(4-fluorophenyl)-2,4-dioxo-1-propargyl-1,2,3,4-tetrahydropyrimidin-5-carboxamide

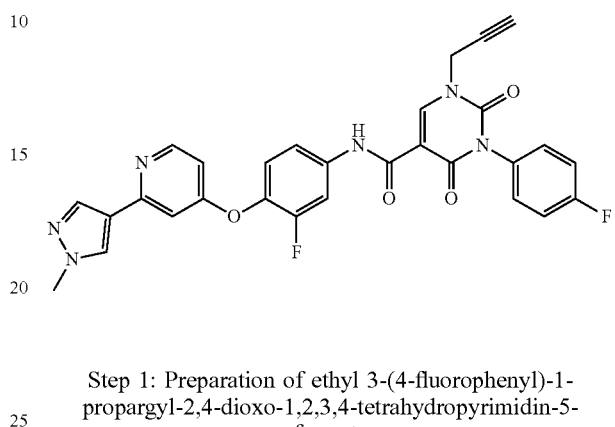

Step 1: Preparation of ethyl 3-(4-fluorophenyl)-1-propargyl-2,4-dioxo-1,2,3,4-tetrahydropyrimidin-5-formate

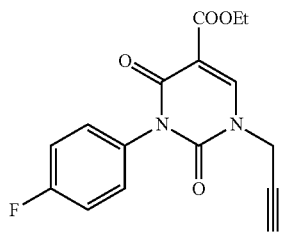 [SMILES: C#CCn1cc(C(=O)OCC)c(=O)n(-c2ccc(F)cc2)c1=O]

Methyl iodide was replaced with propargyl bromide, and the remaining required raw materials, reagents and preparation methods were the same as step 3 in Example 1 to obtain a product with a yield of 77%.

$^1$H NMR (300 MHz, CDCl$_3$) δ 8.61 (s, 1H), 7.17 (d, J=6.4 Hz, 4H), 4.68 (d, J=2.5 Hz, 2H), 4.35 (q, J=7.1 Hz, 2H), 2.63 (t, J=2.6 Hz, 1H), 1.36 (t, J=7.1 Hz, 3H).

Step 2: Preparation of 3-(4-fluorophenyl)-1-propargyl-2,4-dioxo-1,2,3,4-tetrahydropyrimidin-5-carboxylic acid

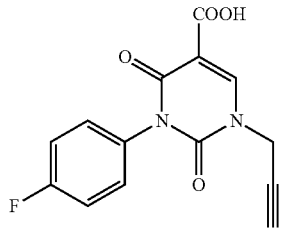 [SMILES: C#CCn1cc(C(=O)O)c(=O)n(-c2ccc(F)cc2)c1=O]

Ethyl 3-(4-fluorophenyl)-1-methyl-2,4-dioxo-1,2,3,4-tetrahydropyrimidin-5-formate was replaced with ethyl 3-(4-fluorophenyl)-1-propargyl-2,4-dioxo-1,2,3,4-tetrahydropyrimidin-5-formate, and the remaining required raw materials, reagents and preparation methods were the same as step 2 in Example 7 to obtain a product with a yield of 28%.

¹H NMR (300 MHz, CDCl₃) δ 8.87 (s, 1H), 7.32-7.17 (m, 4H), 4.74 (d, J=2.5 Hz, 2H), 2.69 (t, J=2.6 Hz, 1H).

Step 3: Preparation of N-(3-fluoro-4-((2-(1-methyl-1H-pyrazol-4-yl)pyridin-4-yl)oxy)phenyl)-3-(4-fluorophenyl)-2,4-dioxo-1-propargyl-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 3-(4-fluorophenyl)-1-propargyl-2,4-dioxo-1,2,3,4-tetrahydropyrimidin-5-carboxylic acid, and the remaining required raw materials, reagents and preparation methods were the same as step 7 in Example 1 to obtain a product with a yield of 810%.

¹H NMR (400 MHz, CDCl₃) δ 10.86 (s, 1H), 8.96 (s, 1H), 8.40 (d, J=5.7 Hz, 1H), 7.88 (dd, J=11.3, 6.3 Hz, 3H), 7.27 (s, 5H), 7.15 (t, J=8.7 Hz, 1H), 6.99 (d, J=2.4 Hz, 1H), 6.64 (dd, J=5.8, 2.4 Hz, 1H), 4.78 (d, J=2.6 Hz, 2H), 3.95 (s, 3H), 2.69 (t, J=2.5 Hz, 1H).

Example 9

N-(3-fluoro-4-((2-(1-methyl-1H-pyrazol-4-yl)pyridin-4-yl)oxy)phenyl)-3-(4-fluorophenyl)-1-(2-hydroxyethyl)-2,4-dioxo-1,2,3,4-tetrahydropyrimidin-5-carboxamide

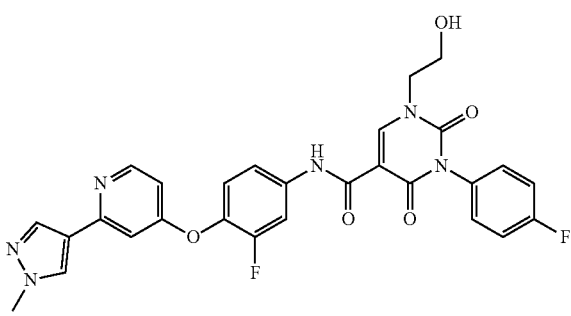 [SMILES: Cn1cc(-c2cc(Oc3ccc(NC(=O)c4cn(CCO)c(=O)n(-c5ccc(F)cc5)c4=O)cc3F)ccn2)cn1]

Step 1: Preparation of ethyl 3-(4-fluorophenyl)-1-(2-hydroxyethyl)-2,4-dioxo-1,2,3,4-tetrahydropyrimidin-5-formate

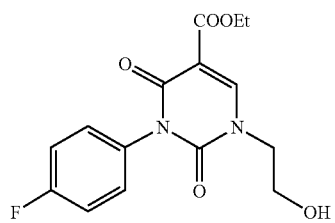 [SMILES: CCOC(=O)c1cn(CCO)c(=O)n(-c2ccc(F)cc2)c1=O]

Methyl iodide was replaced with 2-bromoethanol, and the remaining required raw materials, reagents and preparation methods were the same as step 3 in Example 1 to obtain a product with a yield of 22%.

¹H NMR (300 MHz, CDCl₃) δ 8.40 (s, 1H), 7.16 (d, J=0.8 Hz, 4H), 4.32 (q, J=7.1 Hz, 2H), 4.07-3.98 (m, 2H), 3.98-3.86 (m, 2H), 2.40 (s, 1H), 1.34 (t, J=7.1 Hz, 3H).

Step 2: Preparation of 3-(4-fluorophenyl)-1-(2-hydroxyethyl)-2,4-dioxo-1,2,3,4-tetrahydropyrimidin-5-carboxylic acid

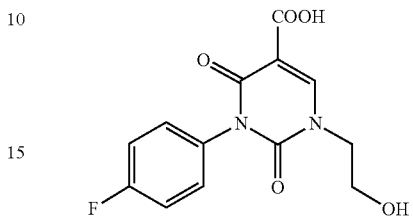

Ethyl 3-(4-fluorophenyl)-1-methyl-2,4-dioxo-1,2,3,4-tetrahydropyrimidin-5-formate was replaced with ethyl 3-(4-fluorophenyl)-1-(2-hydroxyethyl)-2,4-dioxo-1,2,3,4-tetrahydropyrimidin-5-formate, and the remaining required raw materials, reagents and preparation methods were the same as step 4 in Example 1 to obtain a product with a yield of 23%.

¹H NMR (400 MHz, DMSO-d₆) δ 12.61 (s, 1H), 8.66 (s, 1H), 7.41-7.29 (m, 4H), 5.00 (t, J=5.7 Hz, 1H), 3.99 (t, J=5.1 Hz, 2H), 3.64 (q, J=5.3 Hz, 2H).

Step 3: N-(3-fluoro-4-((2-(1-methyl-1H-pyrazol-4-yl)pyridin-4-yl)oxy)phenyl)-3-(4-fluorophenyl)-1-(2-hydroxyethyl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 3-(4-fluorophenyl)-1-(2-hydroxyethyl)-2,4-dioxo-1,2,3,4-tetrahydropyrimidin-5-carboxylic acid, and the remaining required raw materials, reagents and preparation methods were the same as step 7 in Example 1 to obtain a product with a yield of 55%.

¹H NMR (400 MHz, DMSO-d₆) δ 11.01 (s, 1H), 8.76 (s, 1H), 8.38 (d, J=5.7 Hz, 1H), 8.27 (s, 1H), 8.03-7.94 (m, 2H), 7.51 (d, J=9.0 Hz, 1H), 7.47-7.32 (m, 5H), 7.25 (d, J=2.5 Hz, 1H), 6.66 (dd, J=5.8, 2.4 Hz, 1H), 5.04 (t, J=5.7 Hz, 1H), 4.05 (t, J=5.1 Hz, 2H), 3.86 (s, 3H), 3.68 (t, J=5.3 Hz, 2H).

Example 10

N-(3-fluoro-4-((2-(1-methyl-1H-pyrazol-4-yl)pyridin-4-yl)oxy)phenyl)-3-(4-fluorophenyl)-1-(2-methoxyethyl)-2,4-dioxo-1,2,3,4-tetrahydropyrimidin-5-carboxamide

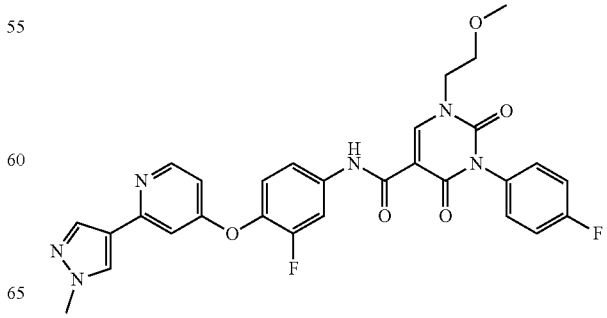

Step 1: Preparation of ethyl 3-(4-fluorophenyl)-1-(2-methoxyethyl)-2,4-dioxo-1,2,3,4-tetrahydropyrimidin-5-formate

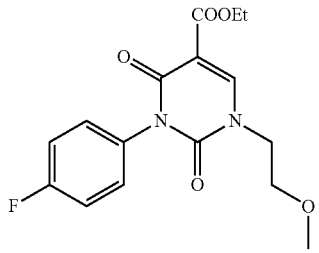 [SMILES: CCOC(=O)c1cn(CCOC)c(=O)n(-c2ccc(F)cc2)c1=O]

Methyl iodide was replaced with 2-bromoethyl methyl ether, and the remaining required raw materials, reagents and preparation methods were the same as step 3 in Example 1 to obtain a product, yield: 98%, and the product was directly used in the next step.

Step 2: Preparation of 3-(4-fluorophenyl)-1-(2-methoxyethyl)-2,4-dioxo-1,2,3,4-tetrahydropyrimidin-5-carboxylic acid

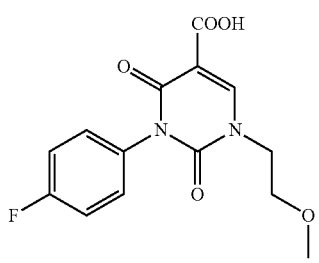 [SMILES: COCCn1cc(C(=O)O)c(=O)n(-c2ccc(F)cc2)c1=O]

Ethyl 3-(4-fluorophenyl)-1-methyl-2,4-dioxo-1,2,3,4-tetrahydropyrimidin-5-formate was replaced with ethyl 3-(4-fluorophenyl)-1-(2-methoxyethyl)-2,4-dioxo-1,2,3,4-tetrahydropyrimidin-5-formate, and the remaining required raw materials, reagents and preparation methods were the same as step 4 in Example 1 to obtain a product with a yield of 82%.

$^1$H NMR (400 MHz, CDCl$_3$) δ 12.32 (s, 1H), 8.59 (s, 1H), 7.24 (d, J=6.4 Hz, 4H), 4.16-4.08 (m, 2H), 3.68-3.62 (m, 2H), 3.39 (s, 3H).

Step 3: Preparation of N-(3-fluoro-4-((2-(1-methyl-1H-pyrazol-4-yl)pyridin-4-yl)oxy)phenyl)-3-(4-fluorophenyl)-1-(2-methoxyethyl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 3-(4-fluorophenyl)-1-(2-methoxyethyl)-2,4-dioxo-1,2,3,4-tetrahydropyrimidin-5-carboxylic acid, and the remaining required raw materials, reagents and preparation methods were the same as step 7 in Example 1 to obtain a product with a yield of 93%.

$^1$H NMR (400 MHz, DMSO-d$_6$) δ 11.00 (s, 1H), 8.75 (s, 1H), 8.38 (d, J=5.7 Hz, 1H), 8.27 (s, 1H), 8.01-7.95 (m, 2H), 7.51 (ddd, J=8.9, 2.5, 1.1 Hz, 1H), 7.48-7.42 (m, 2H), 7.37 (t, J=8.8 Hz, 3H), 7.25 (d, J=2.4 Hz, 1H), 6.65 (dd, J=5.7, 2.5 Hz, 1H), 4.18 (t, J=5.0 Hz, 2H), 3.86 (s, 3H), 3.62 (t, J=5.1 Hz, 2H), 3.32 (s, 3H).

Example 11

1-cyclopentyl-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-carboxamide

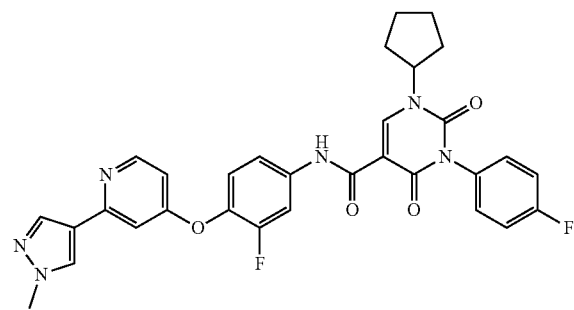 [SMILES: Cn1cc(-c2cc(Oc3ccc(NC(=O)c4cn(C5CCCC5)c(=O)n(-c5ccc(F)cc5)c4=O)cc3F)ccn2)cn1]

Step 1: Preparation of ethyl 1-cyclopentyl-3-(4-fluorophenyl)-2,4-dioxo-1,2,3,4-tetrahydropyrimidin-5-formate

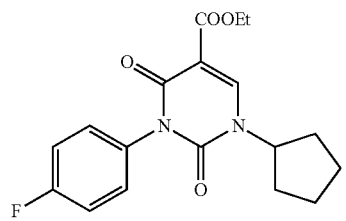 [SMILES: CCOC(=O)c1cn(C2CCCC2)c(=O)n(-c2ccc(F)cc2)c1=O]

Methyl iodide was replaced with cyclopentyl iodide, and the remaining required raw materials, reagents and preparation methods were the same as step 3 in example 1 to obtain a product, yield: 44%, and the product was directly used in the next step.

Step 2: Preparation of 1-cyclopentyl-3-(4-fluorophenyl)-2,4-dioxo-1,2,3,4-tetrahydropyrimidin-5-carboxylic acid

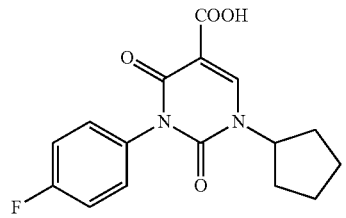

Ethyl 3-(4-fluorophenyl)-1-methyl-2,4-dioxo-1,2,3,4-tetrahydropyrimidin-5-formate was replaced with ethyl 1-cyclopentyl-3-(4-fluorophenyl)-2,4-dioxo-1,2,3,4-tetrahydropyrimidin-5-formate, and the remaining required raw materials, reagents and preparation methods were the same as step 4 in Example 1 to obtain a product with a yield of 73%.

$^1$H NMR (400 MHz, DMSO-d$_6$) δ 12.65 (s, 1H), 8.79 (s, 1H), 7.41-7.30 (m, 4H), 3.88 (d, J=7.5 Hz, 2H), 2.25 (p, J=7.6 Hz, 1H), 1.76-1.57 (m, 4H), 1.57-1.45 (m, 2H), 1.29-1.17 (m, 2H).

Step 3: 1-cyclopentyl-N-(3-fluoro-4-((2-(1-methyl-1H-pyrazol-4-yl)pyridin-4-yl)oxy)phenyl)-3-(4-fluorophenyl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-cyclopentyl-3-(4-fluorophenyl)-2,4-dioxo-1,2,3,4-tetrahydropyrimidin-5-carboxylic acid, and the remaining required raw materials, reagents and preparation methods were the same as step 7 in Example 1 to obtain a product with a yield of 83%.

$^1$H NMR (400 MHz, DMSO-d$_6$) δ 11.02 (s, 1H), 8.63 (s, 1H), 8.38 (d, J=5.7 Hz, 1H), 8.27 (s, 1H), 8.03-7.94 (m, 2H), 7.51 (d, J=9.1 Hz, 1H), 7.43 (ddd, J=8.4, 5.4, 2.7 Hz, 2H), 7.36 (t, J=8.7 Hz, 3H), 7.25 (d, J=2.4 Hz, 1H), 6.65 (dd, J=5.7, 2.5 Hz, 1H), 4.86 (p, J=7.6 Hz, 1H), 3.86 (s, 3H), 2.09 (d, J=8.1 Hz, 2H), 1.93-1.81 (m, 4H), 1.65 (d, J=8.0 Hz, 2H).

Example 12

N-(3-fluoro-4-((2-(1-methyl-1H-pyrazol-4-yl)pyridin-4-yl)oxy)phenyl)-1,3-bis(4-fluorophenyl)-2,4-dioxo-1,2,3,4-tetrahydropyrimidin-5-carboxamide

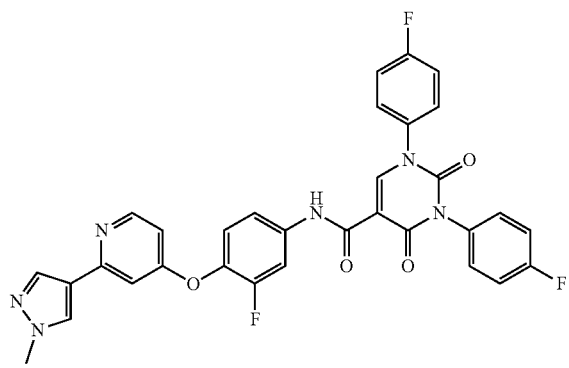 [SMILES: Cn1cc(-c2cc(Oc3ccc(NC(=O)c4cn(-c5ccc(F)cc5)c(=O)n(-c5ccc(F)cc5)c4=O)cc3F)ccn2)cn1]

Step 1: Preparation of ethyl 1,3-bis(4-fluorophenyl)-2,4-dioxo-1,2,3,4-tetrahydropyrimidin-5-formate

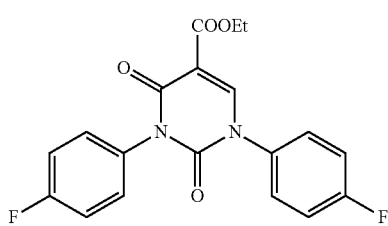 [SMILES: O=C(O)c1cn(-c2ccc(F)cc2)c(=O)n(-c2ccc(F)cc2)c1=O]

Ethyl 3-(4-fluorophenyl)-2,4-dioxo-1,2,3,4-tetrahydropyrimidin-5-formate (84 mg, 0.3 mmol) and p-fluorophenylboronic acid (169 mg, 1.2 mmol), copper acetate (111 mg, 0.9 mmol), pyridine (156 mg, 0.9 mmol) and some activated 4 Å molecular sieve were added to 2.5 mL of dichloromethane, and the mixture was exposed to air and stirred. After 23 hours, the stirring was stopped, dichloromethane and saturated sodium bicarbonate aqueous solution were added to the reaction solution, shaken well, and filtered with diatomite to obtain a filtrate. The obtained filtrate was extracted, the water layer was extracted twice with dichloromethane, the dichloromethane layer was combined, and the dichloromethane layer was washed once with saturated sodium chloride, and then dried over anhydrous sodium sulfate and concentrated, and then purified by column chromatography to obtain a product, yield: 82%.

$^1$H NMR (300 MHz, CD$_3$OD) δ 8.51 (s, 1H), 7.61-7.47 (m, 2H), 7.40-7.15 (m, 6H), 4.29 (q, J=7.1 Hz, 2H), 1.30 (t, J=7.1 Hz, 3H).

Step 2: Preparation of 1,3-bis(4-fluorophenyl)-2,4-dioxo-1,2,3,4-tetrahydropyrimidin-5-carboxylic acid

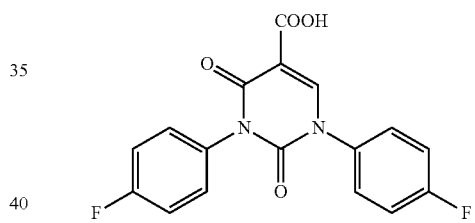

Ethyl 3-(4-fluorophenyl)-1-methyl-2,4-dioxo-1,2,3,4-tetrahydropyrimidin-5-formate was replaced with ethyl 1,3-bis(4-fluorophenyl)-2,4-dioxo-1,2,3,4-tetrahydropyrimidin-5-formate, and the remaining required raw materials, reagents and preparation methods were the same as step 4 in Example 1 to obtain a product with a yield of 78%.

$^1$H NMR (400 MHz, DMSO-d$_6$) δ 12.71 (s, 1H), 8.51 (s, 1H), 7.63-7.57 (m, 2H), 7.43-7.29 (m, 6H).

Step 3: Preparation of N-(3-fluoro-4-((2-(1-methyl-1H-pyrazol-4-yl)pyridin-4-yl)oxy)phenyl)-1,3-bis(4-fluorophen yl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1,3-bis(4-fluorophenyl)-2,4-dioxo-1,2,3,4-tetrahydropyrimidin-5-carboxylic acid, and the remaining required raw materials, reagents and preparation methods were the same as step 7 in Example 1 to obtain a product with a yield of 86%.

$^1$H NMR (400 MHz, DMSO-d$_6$) δ 10.87 (s, 1H), 8.37 (d, J=5.7 Hz, 1H), 8.26 (s, 1H), 7.96 (s, 1H), 7.80 (d, J=8.8 Hz, 2H), 7.69-7.61 (m, 2H), 7.52-7.42 (m, 2H), 7.46-7.34 (m, 3H), 7.27-7.15 (m, 3H), 6.65 (dd, J=5.6, 2.4 Hz, 1H), 3.86 (s, 3H).

Example 13

N-(3-fluoro-4-((2-(1-methyl-1H-pyrazol-4-yl)pyridin-4-yl)oxy)phenyl)-1-isopropyl-2,4-dioxo-3-phenyl-1,2,3,4-tetrahydropyrimidin-5-carboxamide

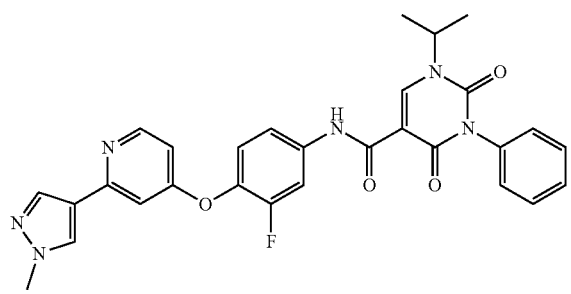 [SMILES: CC(C)n1cc(C(=O)Nc2ccc(Oc3ccnc(-c4cnn(C)c4)c3)c(F)c2)c(=O)n(-c2ccccc2)c1=O]

Step 1: Preparation of 1-isopropyl-2,4-dioxo-3-phenyl-1,2,3,4-tetrahydropyrimidin-5-carboxylic acid

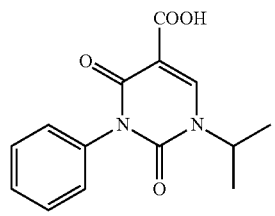 [SMILES: CC(C)n1cc(C(=O)O)c(=O)n(-c2ccccc2)c1=O]

The p-fluorophenyl isocyanate was replaced with phenyl isocyanate, and the methyl iodide was replaced with isopropyl iodide. The remaining required raw materials, reagents and preparation methods were as shown in steps 1 to 4 in Example 1 to obtain a product with a yield of 71%.

$^1$H NMR (400 MHz, DMSO-$d_6$) δ 12.72 (s, 1H), 8.60 (s, 1H), 7.55-7.40 (m, 3H), 7.35-7.28 (m, 2H), 4.74 (p, J=6.8 Hz, 1H), 1.40 (d, J=6.8 Hz, 6H).

Step 2: N-(3-fluoro-4-((2-(1-methyl-1H-pyrazol-4-yl)pyridin-4-yl)oxy)phenyl)-1-isopropyl-2,4-dioxo-3-phenyl-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-isopropyl-2,4-dioxo-3-phenyl-1,2,3,4-tetrahydropyrimidin-5-carboxylic acid, and the remaining required raw materials, reagents and preparation methods were the same as step 7 in Example 1 to obtain a product with a yield of 82%.

$^1$H NMR (400 MHz, DMSO-$d_6$) δ 11.07 (s, 1H), 8.69 (s, 1H), 8.37 (d, J=5.7 Hz, 1H), 8.27 (s, 1H), 8.03-7.95 (m, 2H), 7.58-7.42 (m, 4H), 7.41-7.32 (m, 3H), 7.26 (d, J=2.5 Hz, 1H), 6.65 (dd, J=5.6, 2.5 Hz, 1H), 4.79 (p, J=6.7 Hz, 1H), 3.86 (s, 3H), 1.43 (d, J=6.8 Hz, 6H).

Example 14

3-(4-chlorophenyl)-N-(3-fluoro-4-((2-(1-methyl-1H-pyrazol-4-yl)pyridin-4-yl)oxy)phenyl)-1-isopropyl-2,4-dioxo-1,2,3,4-tetrahydropyrimidin-5-carboxamide

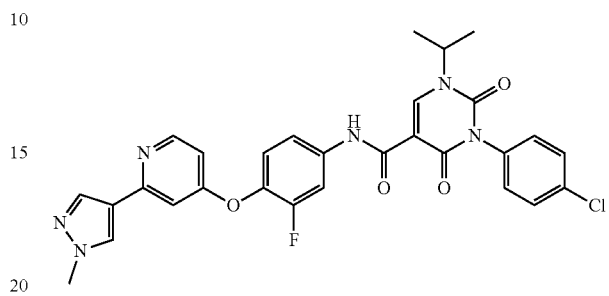

Step 1: Preparation of 3-(4-chlorophenyl)-1-isopropyl-2,4-dioxo-1,2,3,4-tetrahydropyrimidin-5-carboxylic acid

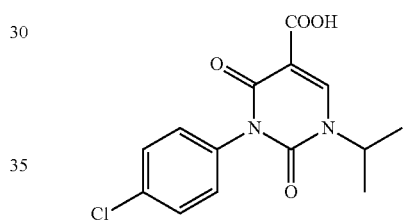

The p-fluorophenyl isocyanate was replaced with p-chlorophenyl isocyanate, and the methyl iodide was replaced with isopropyl iodide. The remaining required raw materials, reagents and preparation methods were as shown in steps 1 to 4 in Example 1 to obtain a product with a yield of 94%.

$^1$H NMR (400 MHz, DMSO-$d_6$) δ 12.68 (s, 1H), 8.59 (s, 1H), 7.62-7.53 (m, 2H), 7.41-7.32 (m, 2H), 4.73 (p, J=6.8 Hz, 1H), 1.39 (d, J=6.8 Hz, 6H).

Step 2: 3-(4-chlorophenyl)-N-(3-fluoro-4-((2-(1-methyl-1H-pyrazol-4-yl)pyridin-4-yl)oxy)phenyl)-1-isopropyl-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 3-(4-chlorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 89%.

$^1$H NMR (400 MHz, DMSO-$d_6$) δ 11.01 (s, 1H), 8.69 (s, 1H), 8.38 (d, J=5.7 Hz, 1H), 8.27 (s, 1H), 8.06-7.94 (m, 1H), 7.98 (s, 1H), 7.65-7.57 (m, 2H), 7.54-7.32 (m, 4H), 7.26 (d, J=2.4 Hz, 1H), 6.65 (dd, J=5.8, 2.4 Hz, 1H), 4.78 (p, J=6.8 Hz, 1H), 3.86 (s, 3H), 1.43 (d, J=6.7 Hz, 6H).

Example 15

N-(3-fluoro-4-((2-(1-methyl-1H-pyrazol-4-yl)pyridin-4-yl)oxy)phenyl)-1-isopropyl-2,4-dioxo-3-p-tolyl-1,2,3,4-tetrahydropyrimidin-5-carboxamide

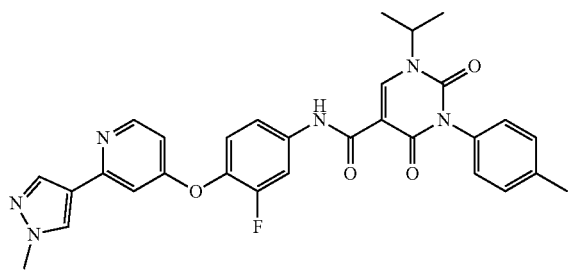 [SMILES: Cc1ccc(-n2c(=O)c(C(=O)Nc3ccc(Oc4ccnc(-c5cnn(C)c5)c4)c(F)c3)cn(C(C)C)c2=O)cc1]

Step 1: Preparation of 1-isopropyl-2,4-dioxo-3-p-tolyl-1,2,3,4-tetrahydropyrimidin-5-carboxylic acid

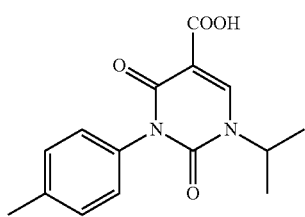 [SMILES: Cc1ccc(-n2c(=O)c(C(=O)O)cn(C(C)C)c2=O)cc1]

The p-fluorophenyl isocyanate was replaced with p-tolyl isocyanate, and the methyl iodide was replaced with isopropyl iodide. The remaining required raw materials, reagents and preparation methods were as shown in steps 1 to 4 in Example 1 to obtain a product with a yield of 87%. $^1$H NMR (400 MHz, DMSO-$d_6$) δ 12.72 (s, 1H), 8.58 (s, 1H), 7.29 (d, J=8.1 Hz, 2H), 7.21-7.13 (m, 2H), 4.73 (p, J=6.8 Hz, 1H), 2.36 (s, 3H), 1.38 (d, J=6.8 Hz, 6H).

Step 2: N-(3-fluoro-4-((2-(1-methyl-1H-pyrazol-4-yl)pyridin-4-yl)oxy)phenyl)-1-isopropyl-2,4-dioxo-3-p-tolyl-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-isopropyl-2,4-dioxo-3-p-tolyl-1,2,3,4-tetrahydropyrimidin-5-carboxylic acid, and the remaining required raw materials, reagents and preparation methods were the same as step 7 in Example 1 to obtain a product with a yield of 92%.

$^1$H NMR (400 MHz, DMSO-$d_6$) δ 11.08 (s, 1H), 8.66 (s, 1H), 8.37 (d, J=5.7 Hz, 1H), 8.26 (s, 1H), 8.02-7.93 (m, 2H), 7.52-7.42 (m, 1H), 7.34 (dd, J=24.1, 8.5 Hz, 3H), 7.27-7.19 (m, 3H), 6.65 (dd, J=5.7, 2.5 Hz, 1H), 4.77 (p, J=6.8 Hz, 1H), 3.86 (s, 3H), 2.38 (s, 3H), 1.42 (d, J=6.8 Hz, 6H).

Example 16

N-(3-fluoro-4-((2-(1-methyl-1H-pyrazol-4-yl)pyridin-4-yl)oxy)phenyl)-1-isopropyl-3-(4-methoxyphenyl)-2,4-dioxo-1,2,3,4-tetrahydropyrimidin-5-carboxamide

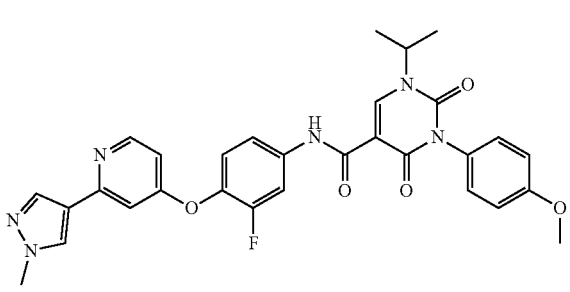 [SMILES: COc1ccc(-n2c(=O)c(C(=O)Nc3ccc(Oc4ccnc(-c5cnn(C)c5)c4)c(F)c3)cn(C(C)C)c2=O)cc1]

Step 1: Preparation of 1-isopropyl-3-(4-methoxyphenyl)-2,4-dioxo-1,2,3,4-tetrahydropyrimidin-5-carboxylic acid

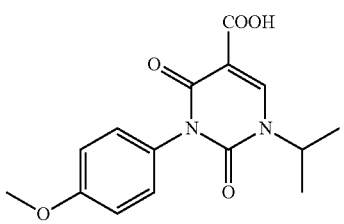 [SMILES: COc1ccc(-n2c(=O)c(C(=O)O)cn(C(C)C)c2=O)cc1]

The p-fluorophenyl isocyanate was replaced with p-methoxyphenyl isocyanate, and the methyl iodide was replaced with isopropyl iodide. The remaining required raw materials, reagents and preparation methods were as shown in steps 1 to 4 in Example 1 to obtain a product with a yield of 66%.

$^1$H NMR (400 MHz, CDCl$_3$) δ 12.54 (s, 1H), 8.59 (s, 1H), 7.23-7.14 (m, 2H), 7.11-7.02 (m, 2H), 4.98 (p, J=6.7 Hz, 1H), 3.88 (s, 3H), 1.50 (d, J=6.8 Hz, 6H).

Step 2: N-(3-fluoro-4-((2-(1-methyl-1H-pyrazol-4-yl)pyridin-4-yl)oxy)phenyl)-1-isopropyl-3-(4-methoxyphenyl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-isopropyl-3-(4-methoxyphenyl)-2,4-dioxo-1,2,3,4-tetrahydropyrimidin-5-carboxylic acid, and the remaining required raw materials, reagents and preparation methods were the same as step 7 in Example 1 to obtain a product with a yield of 75%.

$^1$H NMR (400 MHz, DMSO-$d_6$) δ 11.10 (s, 1H), 8.66 (s, 1H), 8.37 (d, J=5.7 Hz, 1H), 8.27 (s, 1H), 7.98 (dd, J=12.9, 2.4 Hz, 1H), 7.97 (s, 1H), 7.53-7.45 (m, 1H), 7.36 (t, J=8.9 Hz, 1H), 7.31-7.22 (m, 3H), 7.09-7.00 (m, 2H), 6.64 (dd, J=5.7, 2.4 Hz, 1H), 4.77 (p, J=6.8 Hz, 1H), 3.86 (s, 3H), 3.81 (s, 3H), 1.42 (d, J=6.8 Hz, 6H).

Example 17

N-(3-fluoro-4-((2-(1-methyl-1H-pyrazol-4-yl)pyridin-4-yl)oxy)phenyl)-3-(3-fluorophenyl)-1-isopropyl-2,4-dioxo-1,2,3,4-tetrahydropyrimidin-5-carboxamide

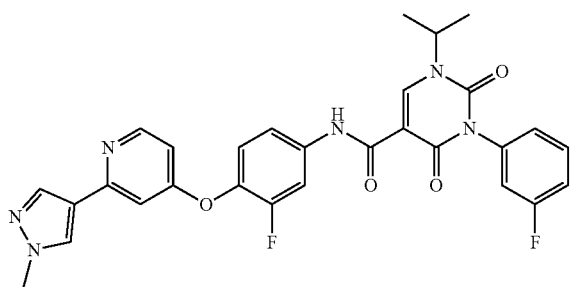 [SMILES: CC(C)n1cc(C(=O)Nc2ccc(Oc3ccnc(-c4cnn(C)c4)c3)c(F)c2)c(=O)n(-c2cccc(F)c2)c1=O]

Step 1: Preparation of 3-(3-fluorophenyl)-1-isopropyl-2,4-dioxo-1,2,3,4-tetrahydropyrimidin-5-carboxylic acid

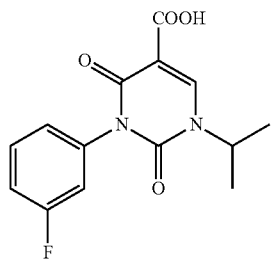 [SMILES: CC(C)n1cc(C(=O)O)c(=O)n(-c2cccc(F)c2)c1=O]

The p-fluorophenyl isocyanate was replaced with 3-fluorophenyl isocyanate, and the methyl iodide was replaced with isopropyl iodide. The remaining required raw materials, reagents and preparation methods were as shown in steps 1 to 4 in Example 1 to obtain a product with a yield of 36%.

$^1$H NMR (400 MHz, DMSO-$d_6$) δ 12.66 (s, 1H), 8.59 (s, 1H), 7.55 (q, J=7.8 Hz, 1H), 7.36-7.24 (m, 2H), 7.23-7.16 (m, 1H), 4.73 (p, J=6.7 Hz, 1H), 1.39 (d, J=6.8 Hz, 6H).

Step 2: N-(3-fluoro-4-((2-(1-methyl-1H-pyrazol-4-yl)pyridin-4-yl)oxy)phenyl)-3-(3-fluorophenyl)-1-isopropyl-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 3-(3-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 75%.

$^1$H NMR (400 MHz, DMSO-$d_6$) δ 11.00 (s, 1H), 8.70 (s, 1H), 8.38 (d, J=5.7 Hz, 1H), 8.27 (s, 1H), 8.04-7.95 (m, 2H), 7.63-7.47 (m, 2H), 7.42-7.30 (m, 3H), 7.26 (td, J=3.5, 1.4 Hz, 2H), 6.65 (dd, J=5.7, 2.5 Hz, 1H), 4.79 (p, J=6.7 Hz, 1H), 3.86 (s, 3H), 1.43 (d, J=6.8 Hz, 6H).

Example 18

N-(3-fluoro-4-((2-(1-methyl-1H-pyrazol-4-yl)pyridin-4-yl)oxy)phenyl)-3-(2-fluorophenyl)-1-isopropyl-2,4-dioxo-1,2,3,4-tetrahydropyrimidin-5-carboxamide

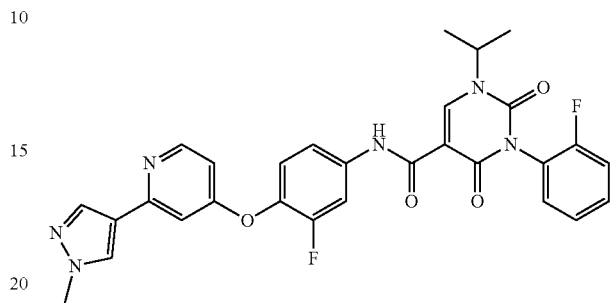

Step 1: Preparation of 1-isopropyl-2,4-dioxo-3-phenyl-1,2,3,4-tetrahydropyrimidin-5-carboxylic acid

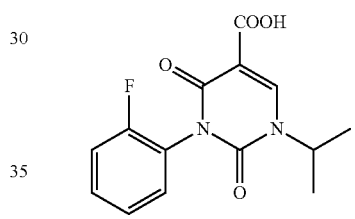

The p-fluorophenyl isocyanate was replaced with 2-fluorophenyl isocyanate, and the methyl iodide was replaced with isopropyl iodide. The remaining required raw materials, reagents and preparation methods were as shown in steps 1 to 4 in Example 1 to obtain a product with a yield of 84%.

$^1$H NMR (400 MHz, DMSO-$d_6$) δ 12.65 (s, 1H), 8.58 (s, 1H), 7.43 (ddt, J=42.8, 24.2, 7.3 Hz, 4H), 4.72 (p, J=6.8 Hz, 1H), 1.40 (d, J=6.8 Hz, 6H).

Step 2: N-(3-fluoro-4-((2-(1-methyl-1H-pyrazol-4-yl)pyridin-4-yl)oxy)phenyl)-1-isopropyl-2,4-dioxo-3-(2-fluorophenyl)-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-isopropyl-2,4-dioxo-3-(2-fluorophenyl)-1,2,3,4-tetrahydropyrimidin-5-carboxylic acid, and the remaining required raw materials, reagents and preparation methods were the same as step 7 in Example 1 to obtain a product with a yield of 75%.

$^1$H NMR (400 MHz, DMSO-$d_6$) δ 10.88 (s, 1H), 8.73 (s, 1H), 8.38 (d, J=5.7 Hz, 1H), 8.27 (s, 1H), 8.04-7.95 (m, 2H), 7.60-7.34 (m, 6H), 7.26 (d, J=2.5 Hz, 1H), 6.65 (dd, J=5.7, 2.5 Hz, 1H), 4.78 (p, J=6.7 Hz, 1H), 3.86 (s, 3H), 1.44 (d, J=6.7 Hz, 6H).

Example 19

3-(3,4-difluorophenyl)-N-(3-fluoro-4-((2-(1-methyl-1H-pyrazol-4-yl)pyridin-4-yl)oxy)phenyl)-1-isopropyl-2,4-dioxo-1,2,3,4-tetrahydropyrimidin-5-carboxamide

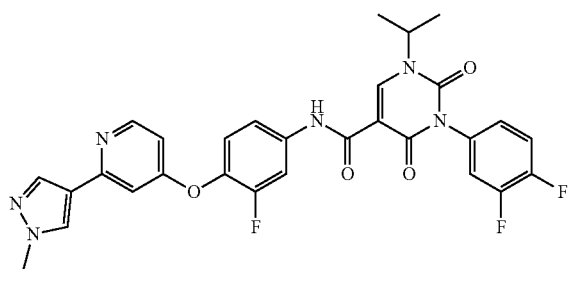 [SMILES: CC(C)n1cc(C(=O)Nc2ccc(Oc3ccnc(-c4cnn(C)c4)c3)c(F)c2)c(=O)n(-c2ccc(F)c(F)c2)c1=O]

Step 1: Preparation of 3-(3,4-difluorophenyl)-1-isopropyl-2,4-dioxo-1,2,3,4-tetrahydropyrimidin-5-carboxylic acid

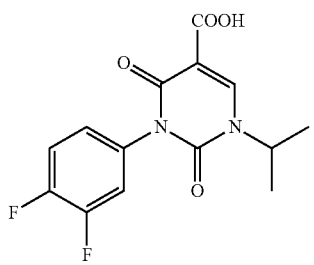 [SMILES: CC(C)n1cc(C(=O)O)c(=O)n(-c2ccc(F)c(F)c2)c1=O]

The p-fluorophenyl isocyanate was replaced with 3,4-difluorophenyl isocyanate, and methyl iodide was replaced with isopropyl iodide. The remaining required raw materials, reagents and preparation methods were as shown in steps 1 to 4 in Example 1 to obtain a product with a yield of 61%.

$^1$H NMR (400 MHz, DMSO-$d_6$) δ 12.65 (s, 1H), 8.58 (s, 1H), 7.64-7.49 (m, 2H), 7.23 (ddt, J=8.5, 4.1, 2.0 Hz, 1H), 4.71 (h, J=6.8 Hz, 1H), 1.38 (d, J=6.8 Hz, 6H).

Step 2: 3-(3,4-difluorophenyl)-N-(3-fluoro-4-((2-(1-methyl-1H-pyrazol-4-yl)pyridin-4-yl)oxy)phenyl)-1-isopropyl-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 3-(3,4-difluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 74%.

$^1$H NMR (400 MHz, DMSO-$d_6$) δ 10.97 (s, 1H), 8.70 (s, 1H), 8.38 (d, J=5.7 Hz, 1H), 8.28 (s, 1H), 8.08-7.95 (m, 1H), 7.98 (s, 1H), 7.62 (ddd, J=11.7, 7.7, 2.7 Hz, 2H), 7.56-7.48 (m, 1H), 7.42-7.27 (m, 2H), 7.27 (s, 1H), 6.65 (dd, J=5.7, 2.5 Hz, 1H), 4.79 (p, J=6.8 Hz, 1H), 3.87 (s, 3H), 1.43 (d, J=6.7 Hz, 6H).

Example 20

N-(3-fluoro-4-((2-(1-methyl-1H-pyrazol-4-yl)pyridin-4-yl)oxy)phenyl)-1-isopropyl-2,4-dioxo-3-(pyridin-4-yl)-1,2,3,4-tetrahydropyrimidin-5-carboxamide

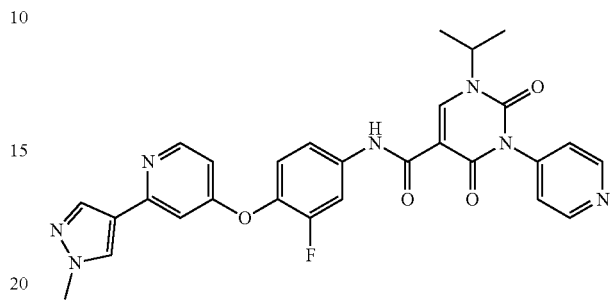

Step 1: Preparation of 1-isopropyl-2,4-dioxo-3-(pyridin-4-yl)-1,2,3,4-tetrahydropyrimidin-5-carboxylic acid

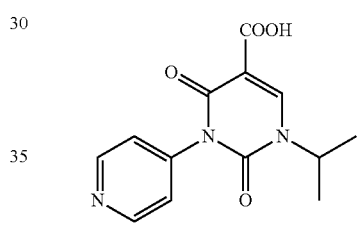

The p-fluorophenyl isocyanate was replaced with 4-pyridine isocyanate, and the methyl iodide was replaced with isopropyl iodide. The remaining required raw materials, reagents and preparation methods were as shown in steps 1 to 4 in Example 1 to obtain a product with a yield of 97%.

$^1$H NMR (400 MHz, CDCl$_3$) δ 12.19 (s, 1H), 8.89-8.83 (m, 2H), 8.62 (s, 1H), 7.30-7.21 (m, 2H), 4.97 (hept, J=6.8 Hz, 1H), 1.51 (d, J=6.8 Hz, 6H).

Step 2: N-(3-fluoro-4-((2-(1-methyl-1H-pyrazol-4-yl)pyridin-4-yl)oxy)phenyl)-1-isopropyl-2,4-dioxo-3-(pyridin-4-yl)-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-isopropyl-2,4-dioxo-3-(pyridin-4-yl)-1,2,3,4-tetrahydropyrimidin-5-carboxylic acid, and the remaining required raw materials, reagents and preparation methods were the same as step 7 in Example 1 to obtain a product with a yield of 81%.

$^1$H NMR (400 MHz, DMSO-$d_6$) δ 10.91 (s, 1H), 8.80-8.73 (m, 2H), 8.70 (s, 1H), 8.37 (d, J=5.7 Hz, 1H), 8.27 (s, 1H), 8.03-7.94 (m, 2H), 7.55-7.45 (m, 3H), 7.36 (t, J=9.0 Hz, 1H), 7.25 (d, J=2.5 Hz, 1H), 6.65 (dd, J=5.7, 2.5 Hz, 1H), 4.78 (p, J=6.8 Hz, 1H), 3.86 (s, 3H), 1.43 (d, J=6.8 Hz, 6H).

Example 21

N-(3-fluoro-4-((2-(1-methyl-1H-pyrazol-4-yl)pyridin-4-yl)oxy)phenyl)-1-isopropyl-3-(1-methyl-1H-pyrazol-4-yl)-2,4-dioxo-1,2,3,4-tetrahydropyrimidin-5-carboxamide

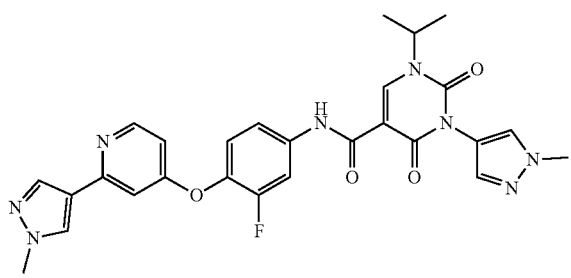 [SMILES: CC(C)n1cc(C(=O)Nc2ccc(Oc3ccnc(-c4cnn(C)c4)c3)c(F)c2)c(=O)n(-c2cnn(C)c2)c1=O]

Step 1: Preparation of 1-isopropyl-3-(1-methyl-1H-pyrazol-4-yl)-2,4-dioxo-1,2,3,4-tetrahydropyrimidin-5-carboxylic acid

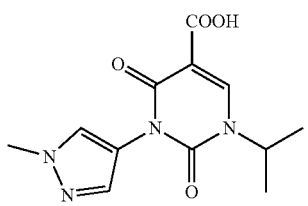 [SMILES: CC(C)n1cc(C(=O)O)c(=O)n(-c2cnn(C)c2)c1=O]

The p-fluorophenyl isocyanate was replaced with 4-isocyanate-1-methyl-1H-pyrazole, and the methyl iodide was replaced with isopropyl iodide. The remaining required raw materials, reagents and preparation methods were as shown in steps 1 to 4 in Example 1 to obtain a product with a yield of 100%.

¹H NMR (400 MHz, DMSO-d$_6$) δ 12.72 (s, 1H), 8.53 (s, 1H), 7.86-7.80 (m, 1H), 7.44 (d, J=0.9 Hz, 1H), 4.72 (p, J=6.8 Hz, 1H), 3.87 (s, 3H), 1.37 (d, J=6.8 Hz, 6H).

Step 2: N-(3-fluoro-4-((2-(1-methyl-1H-pyrazol-4-yl)pyridin-4-yl)oxy)phenyl)-1-isopropyl-3-(1-methyl-1H-pyrazol-4-yl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-isopropyl-3-(1-methyl-1H-pyrazol-4-yl)-2,4-dioxo-1,2,3,4-tetrahydropyrimidin-5-carboxyli c acid, and the remaining required raw materials, reagents and preparation methods were the same as step 7 in Example 1 to obtain a product with a yield of 99%.

¹H NMR (400 MHz, DMSO-d$_6$) δ 11.08 (s, 1H), 8.63 (s, 1H), 8.37 (d, J=5.7 Hz, 1H), 8.27 (s, 1H), 8.04-7.94 (m, 2H), 7.87 (s, 1H), 7.53-7.44 (m, 2H), 7.37 (t, J=9.0 Hz, 1H), 7.25 (d, J=2.5 Hz, 1H), 6.65 (dd, J=5.7, 2.5 Hz, 1H), 4.77 (p, J=6.8 Hz, 1H), 3.89 (s, 3H), 3.86 (s, 3H), 1.41 (d, J=6.8 Hz, 6H).

Example 22

N-(3-fluoro-4-((2-(1-methyl-1H-pyrazol-4-yl)pyridin-4-yl)oxy)phenyl)-1-isopropyl-3-((1R,4R)-4-methylcyclohexyl)-2,4-dioxo-1,2,3,4-tetrahydropyrimidin-5-carboxamide

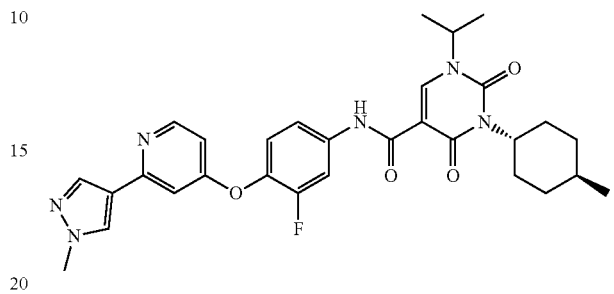

Step 1: Preparation of 1-isopropyl-3-((1R,4R)-4-methylcyclohexyl)-2,4-dioxo-1,2,3,4-tetrahydropyrimidin-5-carboxylic acid

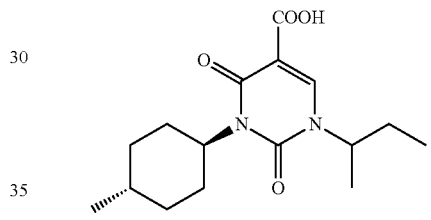

The p-fluorophenyl isocyanate was replaced with trans-4-methylcyclohexyl isocyanate, and the methyl iodide was replaced with isopropyl iodide. The remaining required raw materials, reagents and preparation methods were as shown in steps 1 to 4 in Example 1 to obtain a product with a yield of 910%.

¹H NMR (400 MHz, DMSO-d$_6$) δ 12.91 (s, 1H), 8.47 (s, 1H), 4.83-4.57 (m, 2H), 2.40-2.27 (m, 2H), 1.75 (d, J=12.9 Hz, 2H), 1.59 (d, J=12.1 Hz, 2H), 1.49-1.28 (m, 7H), 1.09-0.95 (m, 2H), 0.89 (d, J=6.5 Hz, 3H).

Step 2: N-(3-fluoro-4-((2-(1-methyl-1H-pyrazol-4-yl)pyridin-4-yl)oxy)phenyl)-1-isopropyl-3-((1R,4R)-4-methylcyclohexyl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 1-isopropyl-3-((1R,4R)-4-methylcyclohexyl)-2,4-dioxo-1,2,3,4-tetrahydropyrimidin-5-carboxylic acid, and the remaining required raw materials, reagents and preparation methods were the same as step 7 in Example 1 to obtain a product with a yield of 83%.

¹H NMR (400 MHz, DMSO-d$_6$) δ 11.19 (s, 1H), 8.53 (s, 1H), 8.38 (d, J=5.7 Hz, 1H), 8.27 (s, 1H), 8.01 (d, J=2.5 Hz, 1H), 7.98 (s, 1H), 7.58-7.48 (m, 1H), 7.38 (t, J=8.9 Hz, 1H), 7.26 (d, J=2.5 Hz, 1H), 6.66 (dd, J=5.7, 2.5 Hz, 1H), 4.82-4.69 (m, 2H), 3.86 (s, 3H), 2.41 (q, 2H), 1.77 (d, J=12.7 Hz, 2H), 1.61 (d, J=11.9 Hz, 2H), 1.45-1.33 (m, 7H), 1.03 (q, J=12.6 Hz, 2H), 0.90 (d, J=6.4 Hz, 3H).

Example 23

4-(4-fluorophenyl)-2-isopropyl-N-(4-((2-(1-methyl-1H-pyrazol-4-yl)pyridin-4-yl)oxy)phenyl)-3,5-dioxo-2,3,4,5-tetrahydro-1,2,4-triazin-6-carboxamide

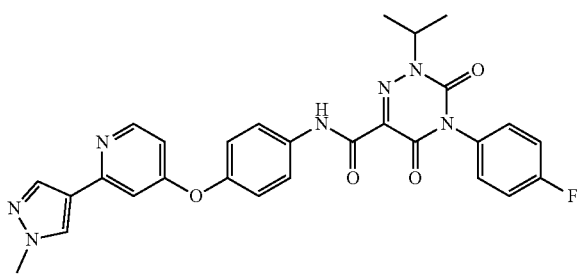 [SMILES: CC(C)n1nc(C(=O)Nc2ccc(Oc3ccnc(-c4cnn(C)c4)c3)cc2)c(=O)n(-c2ccc(F)cc2)c1=O]

Step 1: Preparation of 4-p-fluorophenyl thiosemicarbazide

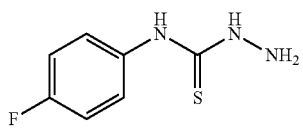

85% hydrazine hydrate solution (2.06 mL, 36 mmol) was dissolved in isopropanol, 4-fluorophenyl isothiocyanate (4.5 g, 30 mmol) was added, and stirred at room temperature. After 1 hour, the stirring was stopped, the solid was obtained by filtering and washed with isopropanol to obtain 5.2 g of product, yield: 93%.

$^1$H NMR (300 MHz, DMSO-d$_6$) δ 9.13 (s, 1H), 7.66-7.54 (m, 2H), 7.20-7.04 (m, 2H).

Step 2: ethyl 4-(4-fluorophenyl)-5-oxo-3-thio-2,3,4,5-tetrahydro-1,2,4-triazine-6-formate

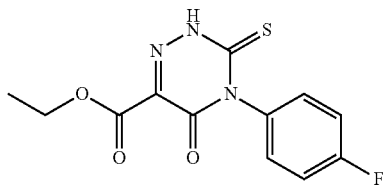 [SMILES: CCOC(=O)c1n[nH]c(=S)n(-c2ccc(F)cc2)c1=O]

4-p-fluorophenyl thiosemicarbazide (2 g, 11 mmol) and diethyl ketomalonate (1.9 g, 11 mmol) were added to 40 mL of ethanol, stirred at 90° C. for 16 hours, and heated to 140° C. and stirred for 4 hours. The heating was stopped, and the temperature was cooled to room temperature, then the mixture was cooled under ice bath, filtered to obtain a solid which was washed with ethanol to obtain 1 g of product, yield: 34%.

$^1$H NMR (300 MHz, DMSO-d$_6$) δ 7.39-7.30 (m, 4H), 4.30 (q, J=7.1 Hz, 2H), 1.28 (t, J=7.1 Hz, 3H).

Step 3: Preparation of ethyl 4-(4-fluorophenyl)-3,5-dioxo-2,3,4,5-tetrahydro-1,2,4-triazin-6-formate

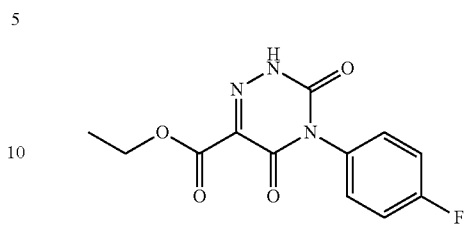

Acetic acid (2.16 mL, 38 mmol) and 5 mL of N,N-dimethylformamide were mixed, and ethyl 4-(4-fluorophenyl)-5-oxo-3-thio-2,3,4,5-tetrahydro-1,2,4-triazine-6-formate (550 mg, 2 mmol) was added under stirring, then 1.8 mL of 30% hydrogen peroxide solution was added under stirring, and the mixture was finally stirred at room temperature. After 72 hours, the stirring was stopped, the reaction solution was poured into water, extracted twice with ethyl acetate, the ethyl acetate layers were combined, washed for 5 times with saturated sodium chloride, the organic phase was concentrated, 0.5 mL methyl tert-butyl ether and 1 mL petroleum ether were added, and the solution was left standing. After 4 hours, yellow solid appeared, and the solid was slurried with methyl tert-butyl ether to obtain light green 167 mg of solid as the product. Yield: 30%.

$^1$H NMR (300 MHz, DMSO-d$_6$) δ 13.13 (s, 1H), 7.45-7.27 (m, 4H), 4.29 (q, J=7.1 Hz, 2H), 1.27 (t, J=7.1 Hz, 3H).

Step 4: Preparation of ethyl 4-(4-fluorophenyl)-2-isopropyl-3,5-dioxo-2,3,4,5-tetrahydro-1,2,4-triazine-6-formate

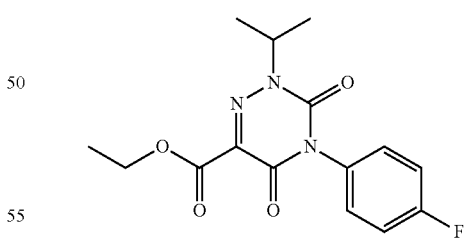

Methyl iodide was replaced with isopropyl iodide, ethyl 3-(4-fluorophenyl)-2,4-dioxo-1,2,3,4-tetrahydropyrimidin-5-formate was replaced with ethyl 4-(4-fluorophenyl)-3,5-dioxo-2,3,4,5-tetrahydro-1,2,4-triazine-6-formate, and the remaining required raw materials, reagents and preparation methods were the same as step 3 in Example 1 to obtain a product with a yield of 93%.

$^1$H NMR (300 MHz, CDCl$_3$) δ 7.25-7.14 (m, 4H), 5.00 (p, J=6.6 Hz, 1H), 4.42 (q, J=7.2 Hz, 2H), 1.53-1.34 (m, 9H).

Step 5: Preparation of 4-(4-fluorophenyl)-2-isopropyl-3,5-dioxo-2,3,4,5-tetrahydro-1,2,4-triazine-6-carboxylic acid

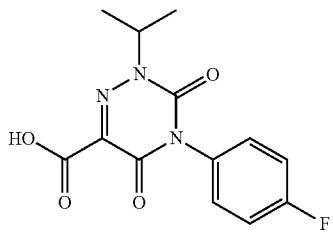 [SMILES: CC(C)n1nc(C(=O)O)c(=O)n(-c2ccc(F)cc2)c1=O]

Ethyl 3-(4-fluorophenyl)-1-methyl-2,4-dioxo-1,2,3,4-tetrahydropyrimidin-5-formate was replaced with ethyl 4-(4-fluorophenyl)-2-isopropyl-3,5-dioxo-2,3,4,5-tetrahydro-1,2,4-triazine-6-formate, and the remaining required raw materials, reagents and preparation methods were the same as step 4 in Example 1 to obtain a product with a yield of 98%.

$^1$H NMR (400 MHz, DMSO-$d_6$) δ 13.64 (s, 1H), 7.45-7.31 (m, 4H), 4.89-4.77 (m, 1H), 1.31 (d, J=6.5 Hz, 6H).

Step 6: Preparation of 4-((2-(1-methyl-1H-pyrazol-4-yl)pyridin-4-yl)oxy) aniline

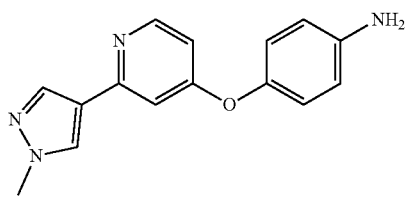 [SMILES: Cn1cc(-c2cc(Oc3ccc(N)cc3)ccn2)cn1]

4-amino-2-fluorophenol was replaced with p-aminophenol, and the remaining required raw materials, reagents and preparation methods were as shown in steps 5 to 6 in Example 1 to obtain a product with a yield of 89%.

$^1$H NMR (300 MHz, DMSO-$d_6$) δ 8.30 (d, J=5.7 Hz, 1H), 8.21 (s, 1H), 7.92 (s, 1H), 7.12 (d, J=2.4 Hz, 1H), 6.85 (d, J=8.7 Hz, 2H), 6.63 (d, J=8.7 Hz, 2H), 6.53 (dd, J=5.7, 2.4 Hz, 1H), 3.86 (s, 3H).

Step 7: Preparation of 4-(4-fluorophenyl)-2-isopropyl-N-(4-((2-(1-methyl-1H-pyrazol-4-yl)pyridin-4-yl)oxy)phenyl)-3,5-dioxo-2,3,4,5-tetrahydro-1,2,4-triazine-6-carboxamide 3-fluoro-4-((2-(1-methyl-1H-pyrazol-4-yl)pyridin-4-yl)oxy) aniline was replaced with 4-((2-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 4-(4-fluorophenyl)-2-isopropyl-3,5-dioxo-2,3,4,5-tetrahydro-1,2,4-triazine-6-carboxylic acid, and the remaining required raw materials, reagents and preparation methods were the same as step 7 in Example 1 to obtain a product with a yield of 61%.

$^1$H NMR (400 MHz, DMSO-$d_6$) δ 10.72 (s, 1H), 8.37 (d, J=5.7 Hz, 1H), 8.25 (s, 1H), 7.96 (s, 1H), 7.79 (d, J=8.9 Hz, 2H), 7.47-7.35 (m, 4H), 7.25-7.19 (m, 3H), 6.66 (dd, J=5.7, 2.4 Hz, 1H), 4.89 (p, J=6.6 Hz, 1H), 3.86 (s, 3H), 1.37 (d, J=6.7 Hz, 6H).

Example 24

N-(3-fluoro-4-((2-(1-methyl-1H-pyrazol-4-yl)pyridin-4-yl)oxy)phenyl)-4-(4-fluorophenyl)-2-isopropyl-3,5-dioxo-2,3,4,5-tetrahydro-1,2,4-triazine-6-carboxamide

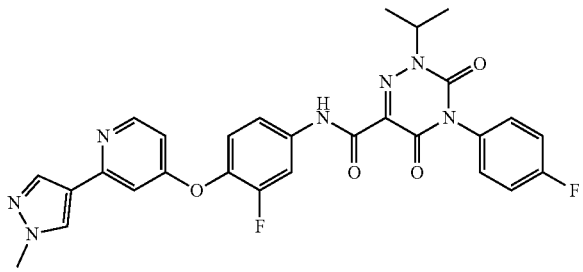 [SMILES: CC(C)n1nc(C(=O)Nc2ccc(Oc3ccnc(-c4cnn(C)c4)c3)c(F)c2)c(=O)n(-c2ccc(F)cc2)c1=O]

3-(4-fluorophenyl)-1-methyl-2,4-dioxo-1,2,3,4-tetrahydropyrimidin-5-carboxylic acid was replaced with 4-(4-fluorophenyl)-2-isopropyl-3,5-dioxo-2,3,4,5-tetrahydro-1,2,4-triazine-6-carboxylic acid, and the remaining required raw materials, reagents and preparation methods were the same as step 7 in Example 1 to obtain a product with a yield of 48%.

$^1$H NMR (400 MHz, DMSO-$d_6$) δ 10.87 (s, 1H), 8.39 (d, J=5.7 Hz, 1H), 8.28 (s, 1H), 7.99 (d, J=0.8 Hz, 1H), 7.95 (dd, J=12.7, 2.5 Hz, 1H), 7.58-7.51 (m, 1H), 7.48-7.36 (m, 5H), 7.26 (d, J=2.4 Hz, 1H), 6.69 (dd, J=5.8, 2.5 Hz, 1H), 4.91 (p, J=6.6 Hz, 1H), 3.87 (s, 3H), 1.38 (d, J=6.6 Hz, 6H).

Example 25

3-(4-fluorophenyl)-1-isopropyl-N-(4-((2-(1-methyl-1H-pyrazol-4-yl)pyridin-4-yl)oxy)phenyl)-2,4-dioxo-1,2,3,4-tetrahydropyrimidin-5-carboxamide

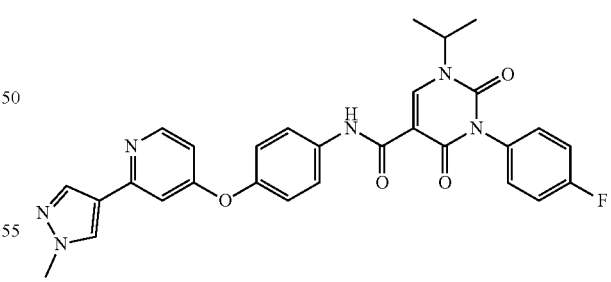

3-fluoro-4-((2-(1-methyl-1H-pyrazol-4-yl)pyridin-4-yl)oxy) aniline was replaced with 4-((2-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 87%.

¹H NMR (300 MHz, DMSO-d₆) δ 10.92 (s, 1H), 8.66 (s, 1H), 8.36 (d, J=5.7 Hz, 1H), 8.25 (s, 1H), 7.96 (d, J=0.8 Hz, 1H), 7.77 (d, J=9.0 Hz, 2H), 7.47-7.31 (m, 4H), 7.23 (d, J=2.3 Hz, 1H), 7.18 (d, J=9.0 Hz, 2H), 6.63 (dd, J=5.7, 2.4 Hz, 1H), 4.77 (p, J=6.9 Hz, 1H), 3.85 (s, 3H), 1.42 (d, J=6.8 Hz, 6H).

Example 26

N-(2-fluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide

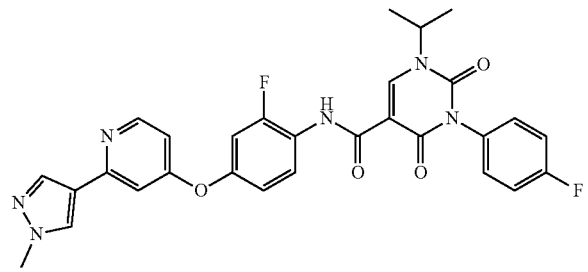 [SMILES: CC(C)n1cc(C(=O)Nc2ccc(Oc3ccnc(-c4cnn(C)c4)c3)cc2F)c(=O)n(-c2ccc(F)cc2)c1=O]

Step 1: Preparation of 2-fluoro-4-((2-(1-methyl-1H-pyrazol-4-yl)pyridine-4-yl)oxy)aniline

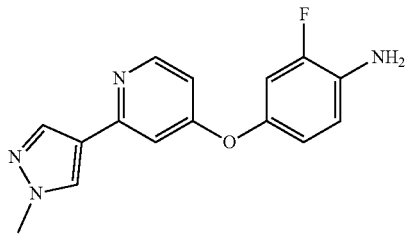 [SMILES: Cn1cc(-c2cc(Oc3ccc(N)c(F)c3)ccn2)cn1]

4-amino-2-fluorophenol was replaced with 4-amino-3-fluorophenol, and the remaining required raw materials, reagents and preparation methods were the same as those in steps 5 to 6 in Example 1 to obtain a product with a yield of 94%.

¹H NMR (400 MHz, DMSO-d₆) δ 8.32 (d, J=5.7 Hz, 1H), 8.23 (s, 1H), 7.94 (s, 1H), 7.14 (d, J=2.4 Hz, 1H), 6.97 (dd, J=11.9, 2.6 Hz, 1H), 6.88-6.73 (m, 2H), 6.58 (dd, J=5.8, 2.5 Hz, 1H), 5.17 (s, 2H), 3.86 (s, 3H).

Step 2: Preparation of N-(2-fluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 2-fluoro-4-((2-(1-methyl-1H-pyrazol-4-yl)pyridin-4-pyridine)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 76%.

¹H NMR (400 MHz, DMSO-d₆) δ 11.16 (s, 1H), 8.69 (s, 1H), 8.49-8.34 (m, 2H), 8.27 (s, 1H), 7.97 (s, 1H), 7.49-7.23 (m, 6H), 7.08 (d, J=8.9 Hz, 1H), 6.71 (s, 1H), 4.85-4.70 (m, 1H), 3.86 (s, 3H), 1.43 (d, J=6.7 Hz, 6H).

Example 27

N-(2,3-difluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide

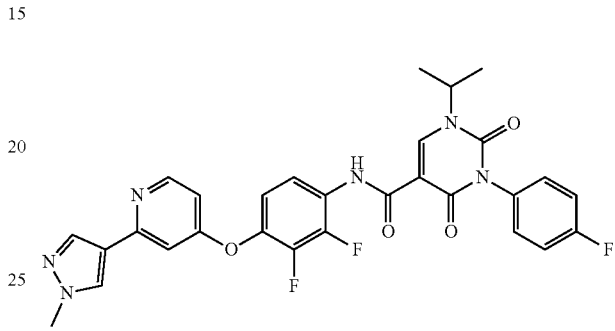

Step 1: Preparation of 2,3-difluoro-4-((2-(1-methyl-1H-pyrazol-4-yl)pyridin-4-yl)oxy)aniline

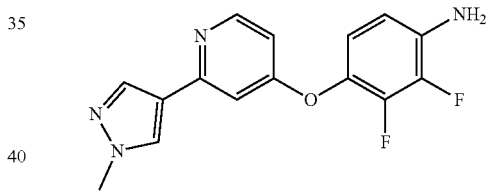

4-amino-2-fluorophenol was replaced with 4-amino-2,3-difluorophenol, and the remaining required raw materials, reagents and preparation methods were the same as those in steps 5 to 6 in Example 1 to obtain a product with a yield of 80%.

¹H NMR (400 MHz, DMSO-d₆) δ 8.35 (d, J=5.7 Hz, 1H), 8.27 (s, 1H), 7.97 (s, 1H), 7.20 (d, J=2.4 Hz, 1H), 6.95-6.86 (m, 1H), 6.64 (d, J=7.5 Hz, 2H), 5.56 (s, 2H), 3.86 (s, 3H).

Step 2: Preparation of N-(2,3-difluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl) oxy) aniline was replaced with 2,3-difluoro-4-((2-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 52%.

¹H NMR (400 MHz, DMSO-d₆) δ 11.27 (s, 1H), 8.71 (d, J=1.4 Hz, 1H), 8.40 (d, J=5.7 Hz, 1H), 8.26 (d, J=16.5 Hz, 2H), 7.99 (s, 1H), 7.48-7.32 (m, 4H), 7.32-7.22 (m, 2H), 6.77 (dd, J=5.9, 2.4 Hz, 1H), 4.78 (p, J=6.9 Hz, 1H), 3.86 (s, 3H), 1.43 (d, J=6.7 Hz, 6H).

Example 28

N-(3,5-difluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide

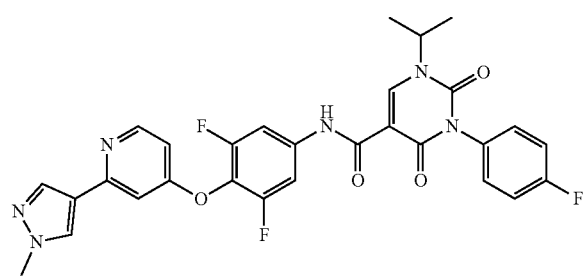 [SMILES: CC(C)n1cc(C(=O)Nc2cc(F)c(Oc3ccnc(-c4cnn(C)c4)c3)c(F)c2)c(=O)n(-c2ccc(F)cc2)c1=O]

Step 1: Preparation of 3,5-difluoro-4-((2-(1-methyl-1H-pyrazol-4-yl)pyridin-4-yl)oxy)aniline

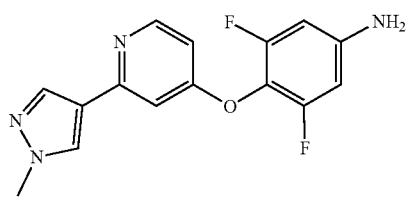 [SMILES: Cn1cc(-c2cc(Oc3c(F)cc(N)cc3F)ccn2)cn1]

4-amino-2-fluorophenol was replaced with 4-amino-3,5-difluorophenol, and the remaining required raw materials, reagents and preparation methods were the same as in steps 5 to 6 in Example 1 to obtain a product with a yield of 94%.

¹H NMR (400 MHz, DMSO-d₆) δ 8.34 (d, J=5.8 Hz, 1H), 8.26 (s, 1H), 7.96 (d, J=0.7 Hz, 1H), 7.22 (d, J=2.5 Hz, 1H), 6.63 (dd, J=5.7, 2.5 Hz, 1H), 6.41-6.30 (m, 2H), 5.78 (s, 2H), 3.85 (s, 3H).

Step 2: Preparation of N-(3,5-difluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 3,5-difluoro-4-((2-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 62%.

¹H NMR (400 MHz, DMSO-d₆) δ 11.11 (s, 1H), 8.69 (s, 1H), 8.39 (d, J=5.7 Hz, 1H), 8.29 (s, 1H), 8.00 (d, J=0.7 Hz, 1H), 7.79 (d, J=10.2 Hz, 2H), 7.48-7.36 (m, 2H), 7.40-7.28 (m, 2H), 6.74 (dd, J=5.8, 2.4 Hz, 1H), 4.78 (p, J=6.8 Hz, 1H), 3.86 (s, 3H), 1.43 (d, J=6.8 Hz, 6H).

Example 29

N-(2,5-difluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide

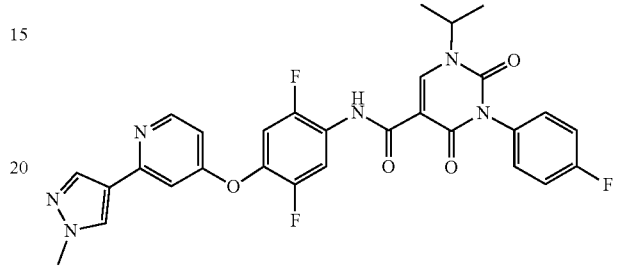

Step 1: Preparation of 2,5-difluoro-4-((2-(1-methyl-1H-pyrazol-4-yl)pyridin-4-yl)oxy)aniline

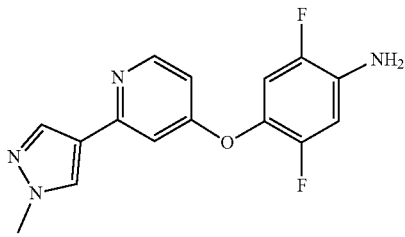 [SMILES: Cn1cc(-c2cc(Oc3cc(F)c(N)cc3F)ccn2)cn1]

4-amino-2-fluorophenol was replaced with 4-amino-2,5-difluorophenol, and the remaining required raw materials, reagents and preparation methods were the same as in steps 5 to 6 in Example 1 to obtain a product with a yield of 84%.

¹H NMR (400 MHz, DMSO-d₆) δ 8.35 (d, J=5.7 Hz, 1H), 8.27 (s, 1H), 7.97 (d, J=0.8 Hz, 1H), 7.25-7.16 (m, 2H), 6.74 (dd, J=12.3, 8.3 Hz, 1H), 6.62 (dd, J=5.8, 2.4 Hz, 1H), 5.52 (s, 2H), 3.87 (s, 3H).

Step 2: Preparation of N-(2,5-difluoro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 2,5-difluoro-4-((2-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 56%.

¹H NMR (400 MHz, DMSO-d₆) δ 11.35 (s, 1H), 8.73 (s, 1H), 8.49 (dd, J=12.4, 7.2 Hz, 1H), 8.39 (d, J=5.7 Hz, 1H), 8.29 (s, 1H), 8.00 (s, 1H), 7.67-7.54 (m, 1H), 7.48-7.32 (m, 4H), 7.28 (d, J=2.5 Hz, 1H), 6.74 (dd, J=5.7, 2.5 Hz, 1H), 4.79 (p, J=6.7 Hz, 1H), 3.87 (s, 3H), 1.44 (d, J=6.7 Hz, 6H).

Example 30

3-(4-fluorophenyl)-1-isopropyl-N-(3-methyl-4-((2-(1-methyl-1H-pyrazol-4-yl)pyridin-4-yl)oxy)phenyl)-2,4-dioxo-1,2,3,4-tetrahydropyrimidin-5-carboxamide

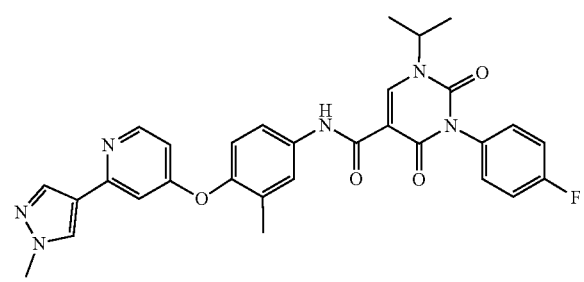 [SMILES: Cc1cc(NC(=O)c2cn(C(C)C)c(=O)n(-c3ccc(F)cc3)c2=O)ccc1Oc1ccnc(-c2cnn(C)c2)c1]

Step 1: Preparation of 3-methyl-4-((2-(1-methyl-1H-pyrazol-4-yl)pyridin-4-yl)oxy)aniline

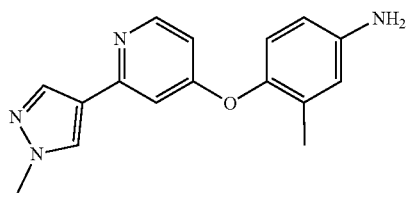 [SMILES: Cc1cc(N)ccc1Oc1ccnc(-c2cnn(C)c2)c1]

4-amino-2-fluorophenol was replaced with 4-amino-2-methylphenol, and the remaining required raw materials, reagents and preparation methods were the same as steps 5 to 6 in Example 1 to obtain a product with a yield of 71%.
$^1$H NMR (400 MHz, DMSO-$d_6$) δ 8.29 (d, J=5.7 Hz, 1H), 8.21 (s, 1H), 7.92 (d, J=0.7 Hz, 1H), 7.10 (d, J=2.3 Hz, 1H), 6.76 (d, J=8.5 Hz, 1H), 6.53-6.42 (m, 3H), 5.06 (s, 2H), 3.86 (s, 3H), 1.96 (s, 3H).

Step 2: Preparation of 3-(4-fluorophenyl)-1-isopropyl-N-(3-methyl-4-((2-(1-methyl-1H-pyrazol-4-yl)pyridin-4-yl)oxy)phenyl)-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 3-methyl-4-((2-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 70%.
$^1$H NMR (400 MHz, DMSO-$d_6$) δ 10.91 (s, 1H), 8.66 (s, 1H), 8.33 (d, J=5.8 Hz, 1H), 8.24 (s, 1H), 7.95 (s, 1H), 7.67 (d, J=8.3 Hz, 2H), 7.43 (ddt, J=8.2, 5.4, 2.7 Hz, 2H), 7.36 (dd, J=9.9, 7.7 Hz, 2H), 7.18 (d, J=2.5 Hz, 1H), 7.09 (d, J=8.4 Hz, 1H), 6.51 (dd, J=5.7, 2.4 Hz, 1H), 4.78 (p, J=6.8 Hz, 1H), 3.85 (s, 3H), 2.10 (s, 3H), 1.42 (d, J=6.8 Hz, 6H).

Example 31

N-(4-((2-(1H-pyrazol-4-yl)pyridin-4-yl)oxy)-3-fluorophenyl)-3-(4-fluorophenyl)-1-isopropyl-2,4-dioxo-1,2,3,4-tetrahydropyrimidin-5-carboxamide

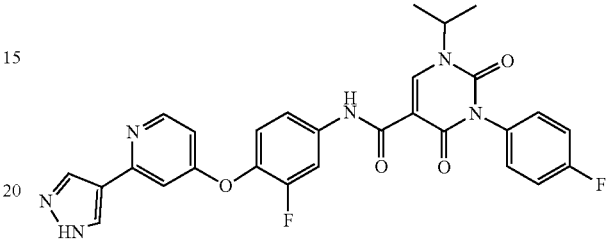

Step 1: Preparation of 4-((2-(1H-pyrazol-4-yl)pyridin-4-yl)oxy)-3-fluoro aniline

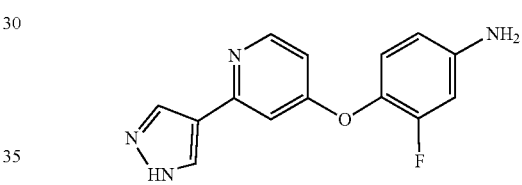

1-methylpyrazol-4-boronic acid pinacol ester was replaced with 4-pyrazol boronic acid pinacol ester, and the remaining required raw materials, reagents and preparation methods were the same as step 6 in Example 1 to obtain a product with a yield of 44%.
$^1$H NMR (400 MHz, DMSO-$d_6$) δ 13.06 (s, 1H), 8.36-8.28 (m, 2H), 8.01 (s, 1H), 7.26 (d, J=2.4 Hz, 1H), 7.00 (t, J=9.0 Hz, 1H), 6.56-6.47 (m, 2H), 6.46-6.39 (m, 1H), 5.46 (s, 2H).

Step 2: Preparation of N-(4-((2-(1H-pyrazol-4-yl)pyridin-4-yl)oxy)-3-fluorophenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 4-((2-(1H-pyrazol-4-yl)pyridin-4-yl)oxy)-3-fluoro aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 26%.
$^1$H NMR (400 MHz, DMSO-$d_6$) δ 13.04 (s, 1H), 11.01 (s, 1H), 8.66 (s, 1H), 8.39-8.16 (m, 2H), 8.15-7.92 (m, 2H), 7.53-7.26 (m, 7H), 6.60 (dd, J=5.8, 2.4 Hz, 1H), 4.76 (p, J=6.9 Hz, 1H), 1.41 (d, J=6.8 Hz, 6H).

Example 32

N-(3-fluoro-4-((2-(1-(2-hydroxy-2-methylpropyl)-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide

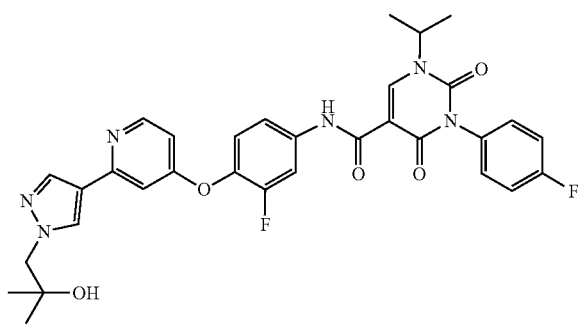 [SMILES: CC(C)n1cc(C(=O)Nc2ccc(Oc3ccnc(-c4cnn(CC(C)(C)O)c4)c3)c(F)c2)c(=O)n(-c2ccc(F)cc2)c1=O]

Step 1: Preparation of 2-methyl-1-(4-(4,4,5,5-tetramethyl-1,3,2-dioxaboroloan-2-yl)-1H-pyrazol-1-yl)propan-2-ol

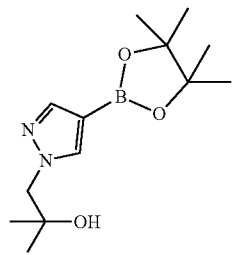 [SMILES: CC(C)(O)Cn1cc(B2OC(C)(C)C(C)(C)O2)cn1]

4-pyrazole boronic acid pinacol ester (250 mg, 1.3 mmol) was dissolved in 1.5 mL of methyl propylene oxide, cesium carbonate (65 mg, 0.2 mmol) was added, argon gas was charged for protection, and then the mixture was reacted under microwave at 120° C. for 0.5 hours. The temperature was cooled to room temperature, the reaction mixture was filtered by suction and washed with dichloromethane, and the filtrate was retained. The filtrate was concentrated and purified by column chromatography to obtain 259 mg of product, yield: 75%. $^1$H NMR (400 MHz, CDCl$_3$) δ 7.81 (s, 1H), 7.69 (s, 1H), 4.06 (s, 1H), 4.06 (s, 2H), 1.23 (s, 6H), 1.14 (s, 12H).

Step 2: Preparation of 1-(4-(4-(4-amino-2-fluorophenoxy)pyridin-2-yl)-1H-pyrazol-1-yl)-2-methylpropan-2-ol

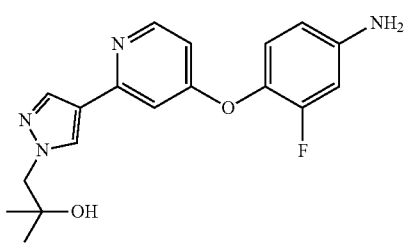 [SMILES: CC(C)(O)Cn1cc(-c2cc(Oc3ccc(N)cc3F)ccn2)cn1]

1-methylpyrazol-4-boronic acid pinacol ester was replaced with 2-methyl-1-(4-(4,4,5,5-tetramethyl-1,3,2-dioxaboroloan-2-yl)-1H-pyrazol-1-yl)propan-2-ol, and the remaining required raw materials, reagents and preparation methods were the same as step 6 in Example 1 to obtain a product with a yield of 51%.

$^1$H NMR (400 MHz, DMSO-d$_6$) δ 8.33 (d, J=5.7 Hz, 1H), 8.18 (s, 1H), 7.96 (s, 1H), 7.17 (d, J=2.5 Hz, 1H), 7.00 (t, J=9.0 Hz, 1H), 6.61-6.48 (m, 2H), 6.43 (dd, J=8.8, 2.5 Hz, 1H), 5.46 (s, 2H), 4.73 (s, 1H), 4.04 (s, 2H), 1.07 (s, 6H).

Step 3: Preparation of N-(3-fluoro-4-((2-(1-(2-hydroxy-2-methylpropyl)-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 1-(4-(4-(4-amino-2-fluorophenoxy)pyridin-2-yl)-1H-pyrazol-1-yl)-2-methylpropan-2-ol, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 89%.

$^1$H NMR (400 MHz, DMSO-d$_6$) δ 11.03 (s, 1H), 8.68 (s, 1H), 8.37 (d, J=5.7 Hz, 1H), 8.22 (s, 1H), 8.05-7.92 (m, 2H), 7.59-7.20 (m, 7H), 6.65 (dd, J=5.8, 2.4 Hz, 1H), 4.78 (p, J=6.6 Hz, 1H), 4.72 (s, 1H), 4.03 (s, 2H), 1.42 (d, J=6.7 Hz, 6H), 1.07 (s, 6H).

Example 33

N-(4-((2-(1-cyclopropyl-1H-pyrazol-4-yl)pyridin-4-yl)oxy)-3-fluorophenyl)-3-(4-fluorophenyl)-1-isopropyl-2,4-dioxo-1,2,3,4-tetrahydropyrimidin-5-carboxamide

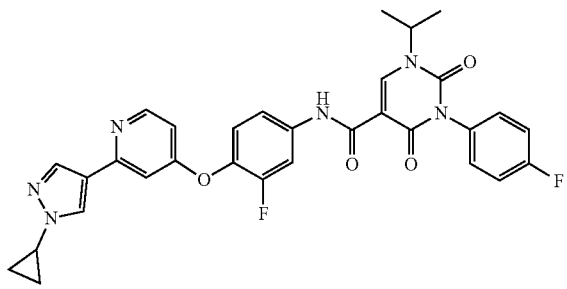 [SMILES: CC(C)n1cc(C(=O)Nc2ccc(Oc3ccnc(-c4cnn(C5CC5)c4)c3)c(F)c2)c(=O)n(-c2ccc(F)cc2)c1=O]

Step 1: Preparation of 4-bromo-1-cyclopropyl-1H-pyrazole

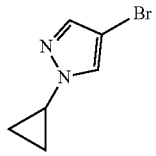

4-bromo-1H-pyrazole (176 mg, 1.2 mmol), cyclopropyl bromide (290 μL, 3.6 mmol) and cesium carbonate (780 mg, 2.4 mmol) were added to 1.5 mL of N,N-dimethylformamide, and then the mixture was reacted at 160° C. After 18 hours, the heating was stopped and the temperature was cooled to room temperature. The reaction mixture was filtered with diatomite and washed with N,N-dimethylformamide. The filtrate was concentrated and purified by column chromatography to obtain 153 mg of product, yield: 68%.

$^1$H NMR (400 MHz, CDCl$_3$) δ 7.46 (s, 1H), 7.41 (s, 1H), 3.56 (tt, J=7.3, 3.8 Hz, 1H), 1.15-1.06 (m, 2H), 1.06-0.96 (m, 2H).

Step 2: Preparation of 1-cyclopropyl-4-(4,4,5,5-tetramethyl-1,3,2-dioxaboroaran-2-yl)-1H-pyrazole

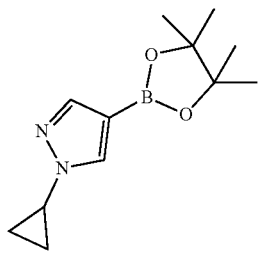 [SMILES: CC1(C)OB(c2cnn(C3CC3)c2)OC1(C)C]

4-bromo-1-cyclopropyl-1H-pyrazole (51 mg, 0.27 mmol), biboronic acid pinacol ester (75 mg, 0.29 mmol), potassium acetate (53 mg, 0.53 mmol) and 1,1-bis(di-phenylphosphoryl) ferrocene palladium chloride (20 mg, 0.03 mmol) were added to 1.5 mL dioxane, and the mixture was reacted at 95° C. under argon protection. After 18 hours, the heating was stopped and the temperature was cooled to room temperature. The reaction solution was extracted with ethyl acetate-saturated sodium carbonate aqueous solution, the organic layer was concentrated, and then purified by column chromatography to obtain 32 mg of product, yield: 52%.

$^1$H NMR (400 MHz, CDCl$_3$) δ 7.77-7.70 (m, 2H), 3.63-3.52 (m, 1H), 1.30 (s, 12H), 1.09 (ddt, J=3.7, 2.4, 1.4 Hz, 2H), 1.03-0.97 (m, 2H).

Step 3: Preparation of 4-((2-(1-cyclopropyl 1-1H-pyrazol-4-yl)pyridin-4-yl)oxy)-3-fluoro aniline

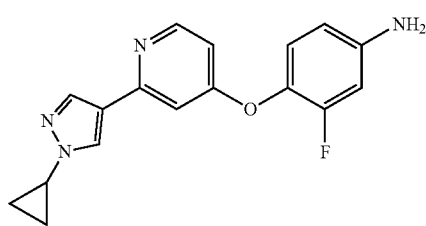 [SMILES: Nc1ccc(Oc2ccnc(-c3cnn(C4CC4)c3)c2)c(F)c1]

1-methyl pyrazole-4-boronic acid pinacol ester was replaced with 1-cyclopropyl-4-(4,4,5,5-tetramethyl-1,3,2-dioxaboroaran-2-yl)-1H-pyrazole, and the remaining required raw materials, reagents and preparation methods were the same as step 6 in Example 1 to obtain a product with a yield of 89%.

$^1$H NMR (400 MHz, CDCl$_3$) δ 8.34 (d, J=5.8 Hz, 1H), 7.95 (s, 1H), 7.83 (d, J=0.8 Hz, 1H), 7.01-6.89 (m, 2H), 6.59 (dd, J=5.7, 2.4 Hz, 1H), 6.51 (dd, J=11.9, 2.7 Hz, 1H), 6.44 (ddd, J=8.6, 2.7, 1.2 Hz, 1H), 3.85 (s, 2H), 3.61 (tt, J=7.4, 3.8 Hz, 1H), 1.13 (pd, J=4.6, 4.1, 2.6 Hz, 2H), 1.05-0.98 (m, 2H).

Step 4: Preparation of N-(4-((2-(1-cyclopropyl-1H-pyrazol-4-yl)pyridin-4-yl)oxy)-3-fluorophenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl) oxy) aniline was replaced with 4-((2-(1-cyclopropyl 1-1H-pyrazol-4-yl)pyridin-4-yl)oxy)-3-fluoro aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 73%.

$^1$H NMR (400 MHz, CDCl$_3$) δ 10.94 (s, 1H), 8.69 (s, 1H), 8.38 (d, J=5.7 Hz, 1H), 7.97 (s, 1H), 7.89-7.81 (m, 2H), 7.24 (s, 5H), 7.13 (t, J=8.7 Hz, 1H), 6.97 (d, J=2.4 Hz, 1H), 6.62 (dd, J=6.0, 2.3 Hz, 1H), 4.97 (p, J=6.8 Hz, 1H), 3.63 (tt, J=7.4, 3.9 Hz, 1H), 1.50 (d, J=6.8 Hz, 6H), 1.19-1.12 (m, 2H), 1.07-1.00 (m, 2H).

Example 34

N-(3-fluoro-4-((2-(1-(2-(4-methylpiperazin-1-yl) ethyl)-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide

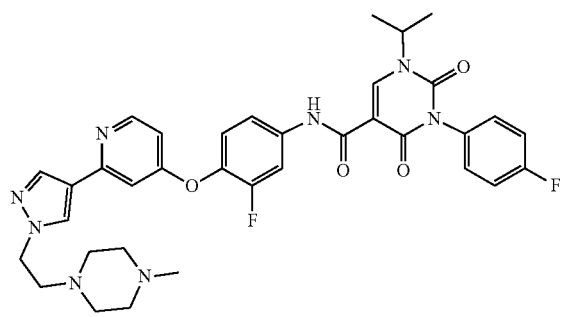 [SMILES: CC(C)n1cc(C(=O)Nc2ccc(Oc3ccnc(-c4cnn(CCN5CCN(C)CC5)c4)c3)c(F)c2)c(=O)n(-c2ccc(F)cc2)c1=O]

Step 1: Preparation of 2-(4-(4,4,5,5-tetramethyl-1,3,2-dioxaboroaran-2-yl)-1H-pyrazol-1-yl)ethan-1-ol

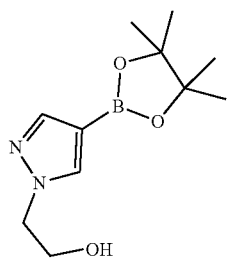 [SMILES: CC1(C)OB(c2cnn(CCO)c2)OC1(C)C]

4-pyrazole boronic acid pinacol ester (1 g, 5.2 mmol), vinyl carbonate (0.9 g, 10.3 mmol) and cesium carbonate (3.3 g, 10.3 mmol) were added to 20 mL of N,N-dimethylformamide, and the mixture was reacted at 140° C. After 0.5 hours, the heating was stopped and the temperature was reduced to room temperature. The reaction mixture was filtered with diatomite and washed with N,N-dimethylformamide. The filtrate was concentrated and purified by column chromatography to obtain 0.9 g of product, yield: 74%.

$^1$H NMR (400 MHz, DMSO-$d_6$) δ 7.88 (s, 1H), 7.57 (s, 1H), 4.86 (s, 1H), 4.15 (t, J=5.6 Hz, 2H), 3.71 (t, J=5.6 Hz, 2H), 1.24 (s, 12H).

Step 2: Preparation of 2-(4-(4,4,5,5-tetramethyl-1,3,2-dioxabororan-2-yl)-1H-pyrazol-1-yl)ethyl methanesulfonate

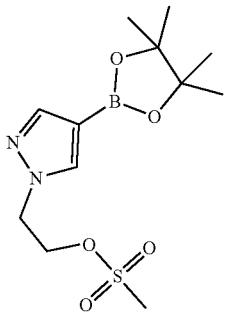 [SMILES: CC1(C)OB(c2cnn(CCOS(C)(=O)=O)c2)OC1(C)C]

2-(4-(4,4,5,5-tetramethyl-1,3,2-dioxabororan-2-yl)-1H-pyrazol-1-yl)ethan-1-ol (733 mg, 3.1 mmol) and triethylamine (640 μL) were successively added to 24.4 mL of N,N-dimethylformamide, the mixture was cooled downunder ice bath, and then methanesulfonyl chloride (262 μL, 3.4 mmol) was added dropwise under stirring, and then the reaction was continued under ice bath conditions. After 0.5 hours, the reaction solution was concentrated and purified by column chromatography to obtain 312 mg of product, yield: 32%.

$^1$H NMR (400 MHz, DMSO-$d_6$) δ 7.99 (d, J=0.7 Hz, 1H), 7.63 (d, J=0.7 Hz, 1H), 4.55 (dd, J=5.5, 4.3 Hz, 2H), 4.47 (dd, J=5.7, 4.5 Hz, 2H), 3.08 (s, 3H), 1.25 (s, 12H).

Step 3: Preparation of 1-methyl-4-(2-(4-(4,4,5,5-tetramethyl-1,3,2-dioxabororan-2-yl)-1H-pyrazol-1-yl)ethyl)piperazine

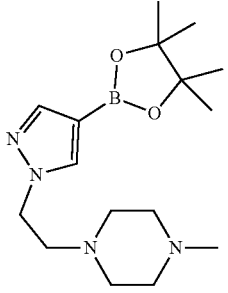 [SMILES: CN1CCN(CCn2cc(B3OC(C)(C)C(C)(C)O3)cn2)CC1]

2-(4-(4,4,5,5-tetramethyl-1,3,2-dioxabororan-2-yl)-1H-pyrazol-1-yl)ethyl methanesulfonate (250 mg, 0.79 mmol) and N-methylpiperazine (875 μL, 7.9 mmol) were added to 1.5 mL of N,N-dimethylformamide, and the mixture was reacted at 50° C. The heating was stopped, after 2.5 hours, and the temperature was cooled to room temperature.

The product obtained was directly used in the next step without purification.

Step 4: Preparation of 3-fluoro-4-((2-(1-(2-(4-methylpiperazin-1-yl)ethyl)-1H-pyrazol-4-yl)pyridin-4-yl)oxy)aniline

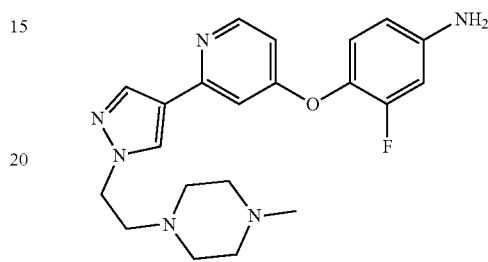

1-methylpyrazol-4-boronic acid pinacol ester was replaced with 1-methyl-4-(2-(4-(4,4,5,5-tetramethyl-1,3,2-dioxabororan-2-yl)-1H-pyrazol-1-yl)ethyl)pipera zine, and the remaining required raw materials, reagents and preparation methods were the same as step 6 in Example 1 to obtain a product with a yield of 56%.

$^1$H NMR (400 MHz, CDCl$_3$) δ 8.35 (d, J=5.7 Hz, 1H), 7.96 (s, 1H), 7.86 (s, 1H), 7.00-6.91 (m, 2H), 6.64-6.44 (m, 3H), 4.25 (t, J=6.7 Hz, 2H), 3.82 (s, 2H), 2.86 (t, J=6.7 Hz, 2H), 2.66-2.40 (m, 8H), 2.31 (s, 3H).

Step 5: Preparation of N-(3-fluoro-4-((2-(1-(2-(4-methylpiperazin-1-yl)ethyl)-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl) oxy) aniline was replaced with 3-fluoro-4-((2-(1-(2-(4-methylpiperazin-1-yl)ethyl)-1H-pyrazol-4-yl)pyridin-4-yl) oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 75%.

$^1$H NMR (400 MHz, CD$_3$OD) δ 8.73 (s, 1H), 8.35 (d, J=5.8 Hz, 1H), 8.20 (s, 1H), 7.98 (s, 1H), 7.94 (dd, J=12.6, 2.5 Hz, 1H), 7.36 (ddd, J=9.0, 4.3, 2.2 Hz, 3H), 7.27 (td, J=8.8, 2.3 Hz, 3H), 7.21 (d, J=2.5 Hz, 1H), 6.73 (dd, J=5.9, 2.5 Hz, 1H), 4.95-4.90 (m, 1H), 4.31 (t, J=6.0 Hz, 2H), 3.09-2.86 (m, 6H), 2.79-2.50 (m, 7H), 1.49 (d, J=6.8 Hz, 6H).

Example 35

N-(4-((2-(1,3-dimethyl-1H-pyrazol-4-yl)pyridin-4-yl)oxy)-3-fluorophenyl)-3-(4-fluorophenyl)-1-isopropyl-2,4-dioxo-1,2,3,4-tetrahydropyrimidin-5-carboxamide

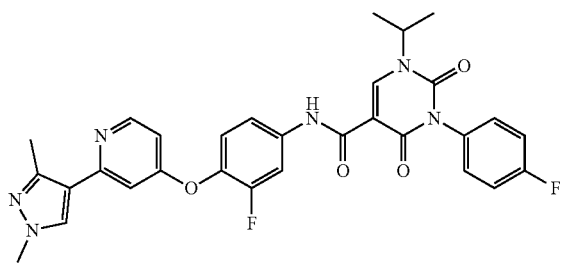 [SMILES: Cc1nn(C)cc1-c1cc(Oc2ccc(NC(=O)c3cn(C(C)C)c(=O)n(-c4ccc(F)cc4)c3=O)cc2F)ccn1]

Step 1: Preparation of 4-((2-(1,3-dimethyl-1H-pyrazol-4-yl)pyridin-4-yl)oxy)-3-fluoroaniline

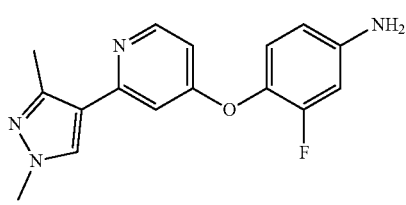 [SMILES: Cc1nn(C)cc1-c1cc(Oc2ccc(N)cc2F)ccn1]

The 1-methylpyrazol-4-boronic acid pinacol ester was replaced with 1,3-dimethylpyrazol-4-boronic acid pinacol ester, and the remaining required raw materials, reagents and preparation methods were the same as in step 6 in Example 1 to obtain a product with a yield of 72%. $^1$H NMR (400 MHz, DMSO-d$_6$) δ 8.37 (d, J=5.7 Hz, 1H), 8.10 (s, 1H), 7.14-6.86 (m, 2H), 6.68-6.33 (m, 3H), 5.47 (s, 2H), 3.77 (s, 3H), 2.35 (s, 3H).

Step 2: Preparation of N-(4-((2-(1,3-dimethyl-1H-pyrazol-4-yl)pyridin-4-yl)oxy)-3-fluorophenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 4-((2-(1,3-dimethyl-1H-pyrazol-4-yl)pyridin-4-yl)oxy)-3-fluoro aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 100%.

$^1$H NMR (400 MHz, DMSO-d$_6$) δ 11.03 (s, 1H), 8.68 (s, 1H), 8.41 (d, J=5.7 Hz, 1H), 8.14 (s, 1H), 7.99 (dd, J=12.9, 2.4 Hz, 1H), 7.54-7.31 (m, 6H), 7.05 (d, J=2.4 Hz, 1H), 6.68 (dd, J=5.7, 2.5 Hz, 1H), 4.78 (p, J=6.8 Hz, 1H), 3.76 (s, 3H), 2.36 (s, 3H), 1.42 (d, J=6.8 Hz, 6H).

Example 36

3-(4-fluorophenyl)-1-isopropyl-N-(4-((3-(1-methyl-1H-pyrazol-4-yl)pyridin-4-yl)oxy)phenyl)-2,4-dioxo-1,2,3,4-tetrahydropyrimidin-5-carboxamide

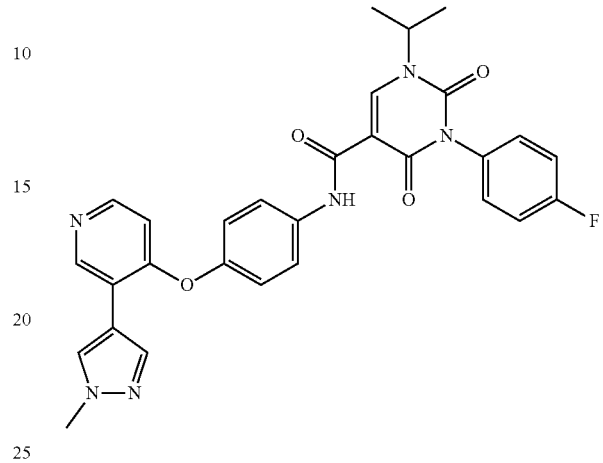

Step 1: Preparation of 4-((3-bromopyridin-4-yl)oxy) aniline

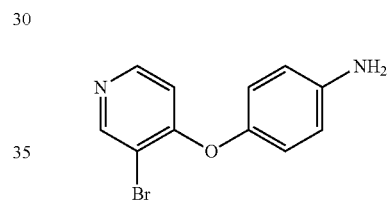

2,4-dichloropyridine was replaced with 3-bromo-4-chloropyridine, 4-amino-2-fluorophenol was replaced with p-aminophenol, and the remaining required raw materials, reagents and preparation methods were as shown in step 5 in Example 1 to obtain a product with a yield of 100%.

$^1$H NMR (300 MHz, DMSO-d$_6$) δ 8.65 (s, 1H), 8.31 (d, J=5.6 Hz, 1H), 6.86 (d, J=8.7 Hz, 2H), 6.74-6.51 (m, 3H), 5.21 (s, 2H).

Step 2: Preparation of 4-((3-(1-methyl-1H-pyrazol-4-yl)pyridin-4-yl)oxy) aniline

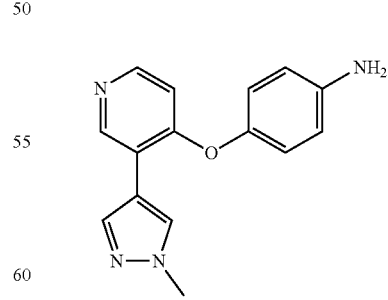

4-((2-chloropyridin-4-yl)oxy)-3-fluoro aniline was replaced with 4-((3-bromopyridin-4-yl)oxy) aniline, and the remaining required raw materials, reagents and preparation methods were as shown in step 6 in Example 1 to obtain a product with a yield of 100%.

$^1$H NMR (300 MHz, DMSO-d$_6$) δ 8.79 (s, 1H), 8.23 (s, 1H), 8.18 (d, J=5.9 Hz, 1H), 8.02 (d, J=0.8 Hz, 1H), 6.86 (d, J=8.6 Hz, 2H), 6.64 (d, J=8.7 Hz, 2H), 6.56 (d, J=5.6 Hz, 1H), 5.15 (s, 2H), 3.89 (s, 3H).

Step 3: Preparation of 3-(4-fluorophenyl)-1-isopropyl-N-(4-((3-(1-methyl-1H-pyrazol-4-yl)pyridin-4-yl)oxy)phenyl)-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 4-((3-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 75%.

$^1$H NMR (300 MHz, DMSO-d$_6$) δ 10.92 (s, 1H), 8.86 (s, 1H), 8.66 (s, 1H), 8.28-8.22 (m, 2H), 8.02 (d, J=0.8 Hz, 1H), 7.81-7.74 (m, 2H), 7.47-7.31 (m, 4H), 7.22-7.14 (m, 2H), 6.71 (d, J=5.6 Hz, 1H), 4.83-4.72 (m, 1H), 3.88 (s, 3H), 1.42 (d, J=6.8 Hz, 6H).

Example 37

N-(4-(2-amino-5-(3,4-dimethoxyphenyl)pyridin-3-yl)-3-fluorophenyl)-3-(4-fluorophenyl)-1-isopropyl-2,4-dioxo-1,2,3,4-tetrahydropyrimidin-5-carboxamide

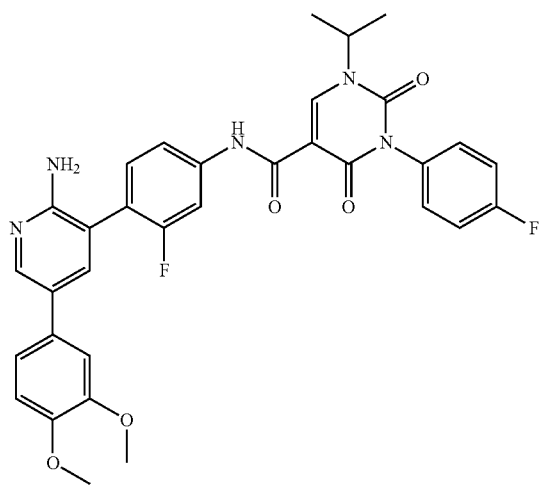 [SMILES: COc1ccc(-c2cnc(N)c(-c3ccc(NC(=O)c4cn(C(C)C)c(=O)n(-c5ccc(F)cc5)c4=O)cc3F)c2)cc1OC]

Step 1: Preparation of 3-(4-amino-2-fluorophenyl)-5-bromopyridin-2-ylamine

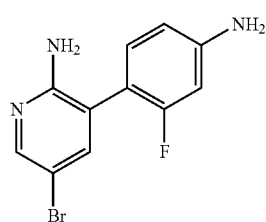

5-bromo 3-iodopyridin-2-ylamine (300 mg, 1 mmol), 4-amino-2-fluorobenzene boronic acid pinacol ester (238 mg, 1 mmol), potassium carbonate (416 mg, 3 mmol) and palladium tetra triphenylphosphorus (58 mg, 0.05 mmol) were added to a mixed solution of 5 mL dioxane and 0.5 mL water, and the mixture was reacted at 85° C. under argon protection. After 16 hours, the temperature was cooled to room temperature, the reaction solution was concentrated and then purified by column chromatography to obtain 219 mg of product, yield: 78%.

$^1$H NMR (400 MHz, CDCl$_3$) δ 8.09 (d, J=2.4 Hz, 1H), 7.45 (d, J=2.4 Hz, 1H), 7.09 (t, J=8.3 Hz, 1H), 6.55-6.45 (m, 2H), 4.49 (s, 2H), 3.91 (s, 2H).

Step 2: Preparation of 3-(4-amino-2-fluorophenyl)-5-(3,4-dimethoxyphenyl)pyridin-2-ylamine

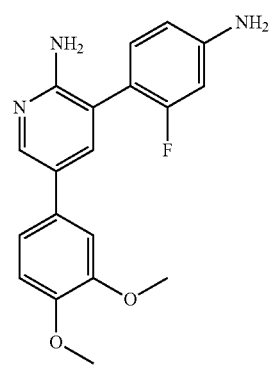 [SMILES: COc1ccc(-c2cnc(N)c(-c3ccc(N)cc3F)c2)cc1OC]

3-(4-amino-2-fluorophenyl)-5-bromopyridin-2-ylamine (200 mg, 0.71 mmol), 3,4-dimethoxyphenylboronic acid (142 mg, 0.78 mmol), potassium carbonate (294 mg, 2.13 mmol) and [1,1-bis(diphenylphosphino)ferrocene] palladium dichloride dichloromethane complex (29 mg, 0.04 mmol) were added to a mixed solution of 2 mL dioxane and 0.4 mL water, and the mixture was reacted at 100° C. under argon protection. After 4 hours, the temperature was cooled to room temperature, and the reaction solution was extracted with ethyl acetate-saturated sodium carbonate aqueous solution. The organic layer was dried over anhydrous sodium sulfate, concentrated, and then purified by column chromatography to obtain 142 mg of product, yield: 42%.

$^1$H NMR (400 MHz, DMSO-d$_6$) δ 8.21 (d, J=2.4 Hz, 1H), 7.48 (d, J=2.5 Hz, 1H), 7.15-6.99 (m, 3H), 6.96 (d, J=8.4 Hz, 1H), 6.50-6.37 (m, 2H), 5.56-5.50 (m, 2H), 5.45 (s, 2H), 3.80 (s, 3H), 3.75 (s, 3H).

Step 3: Preparation of N-(4-(2-amino-5-(3,4-dimethoxyphenyl)pyridin-3-yl)-3-fluorophenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 3-(4-amino-2-fluorophenyl)-5-(3,4-dimethoxyphenyl)pyridin-2-ylamine, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 69%.

¹H NMR (400 MHz, DMSO-d₆) δ 11.04 (s, 1H), 8.68 (s, 1H), 8.28 (d, J=2.5 Hz, 1H), 7.85 (dd, J=12.4, 2.0 Hz, 1H), 7.59 (d, J=2.5 Hz, 1H), 7.49-7.30 (m, 6H), 7.17-7.07 (m, 2H), 6.96 (d, J=8.4 Hz, 1H), 5.69 (s, 2H), 4.77 (p, J=6.8 Hz, 1H), 3.79 (s, 3H), 3.74 (s, 3H), 1.41 (d, J=6.7 Hz, 6H).

Example 38

N-(4-(2-amino-5-(1-methyl-1H-pyrazol-4-yl)pyridin-3-yl)-3-fluorophenyl)-3-(4-fluorophenyl)-1-isopropyl-2,4-dioxo-1,2,3,4-tetrahydropyrimidin-5-carboxamide

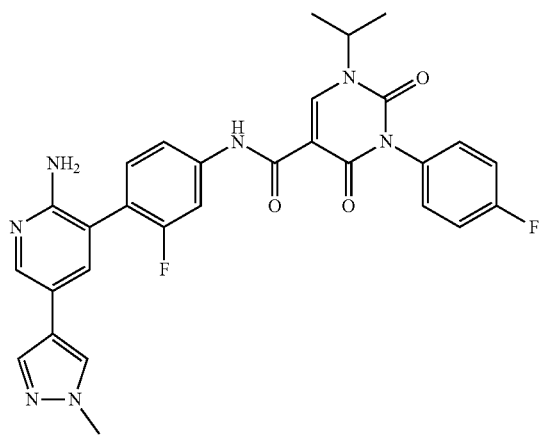 [SMILES: CC(C)n1cc(C(=O)Nc2ccc(-c3cc(-c4cnn(C)c4)cnc3N)c(F)c2)c(=O)n(-c2ccc(F)cc2)c1=O]

Step 1: Preparation of 3-(4-amino-2-fluorophenyl)-5-(1-methyl-1H-pyrazol-4-yl)pyridin-2-ylamine

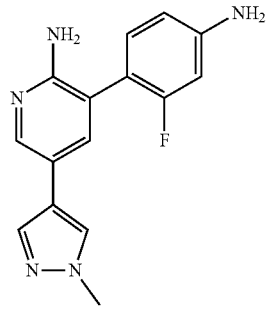 [SMILES: Cn1cc(-c2cnc(N)c(-c3ccc(N)cc3F)c2)cn1]

3,4-dimethoxyphenylboronic acid was replaced with 1-methylpyrazol-4-boronic acid pinacol ester, and the remaining required raw materials, reagents and preparation methods were the same as step 2 in Example 37 to obtain a product with a yield of 66%.

¹H NMR (400 MHz, DMSO-d₆) δ 8.16 (d, J=2.4 Hz, 1H), 8.01 (s, 1H), 7.75 (d, J=0.8 Hz, 1H), 7.41 (d, J=2.3 Hz, 1H), 7.00 (t, J=8.5 Hz, 1H), 6.50-6.37 (m, 2H), 5.54 (s, 2H), 5.35 (s, 2H), 3.82 (s, 3H).

Step 2: Preparation of N-(4-(2-amino-5-(1-methyl-1H-pyrazol-4-yl)pyridin-3-yl)-3-fluorophenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 3-(4-amino-2-fluorophenyl)-5-(1-methyl-1H-pyrazol-4-yl)pyridin-2-ylamine, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 57%.

¹H NMR (400 MHz, DMSO-d₆) δ 11.06 (s, 1H), 8.69 (s, 1H), 8.22 (d, J=2.3 Hz, 1H), 8.03 (s, 1H), 7.87 (dd, J=12.4, 2.1 Hz, 1H), 7.77 (d, J=0.8 Hz, 1H), 7.53-7.31 (m, 7H), 5.58 (s, 2H), 4.78 (p, J=6.7 Hz, 1H), 3.82 (s, 3H), 1.43 (d, J=6.7 Hz, 6H).

Example 39

(R)—N-(4-(5-(4-((1,4-dioxan-2-yl)methoxy)-3-methoxyphenyl)-2-aminopyridin-3-yl)-3-fluorophenyl)-3-(4-fluorophenyl)-1-isopropyl-2,4-dioxo-1,2,3,4-tetrahydropyrimidin-5-carboxamide

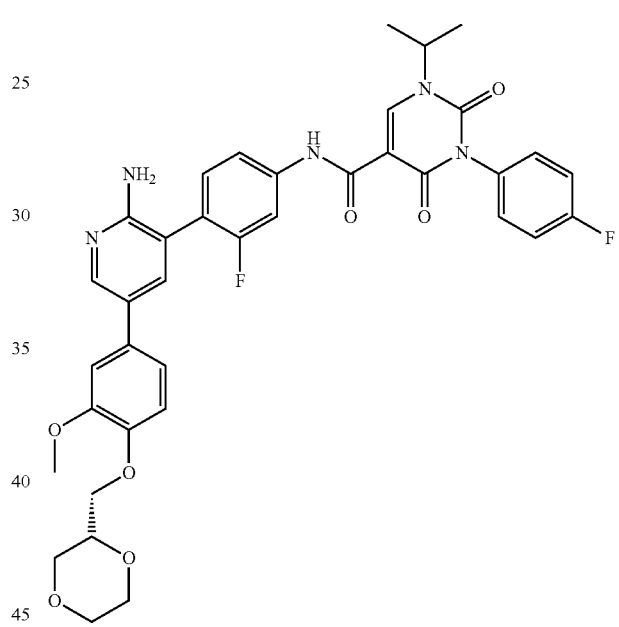

Step 1: Preparation of (R)-2-(4-((1,4-dioxan-2-yl)methoxy)-3-methoxyphenyl)-4,4,5,5-tetramethyl-1,3,2-dioxaborolane

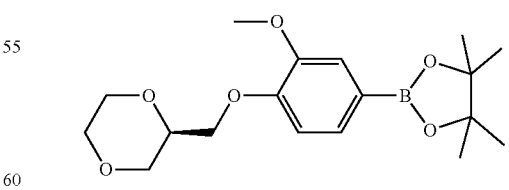

4-Hydroxy-3-methoxy boronic acid pinacol ester (167 mg, 0.67 mmol), (R)-(1,4-dioxane-2-yl)methyl methanesulfonate (131 mg, 0.67 mmol)(prepared according to the method described in the patent US2014057927A1) and potassium carbonate (185 mg, 1.34 mmol) were added to 3.3 mL of N,N-dimethylformamide, and the mixture was reacted at 90° C. under argon protection. After 16 hours, the temperature was cooled to room temperature, the reaction solution was poured into water, extracted 3 times with ethyl acetate. The ethyl acetate layers were combined, washed with saturated sodium chloride aqueous solution for five times, and then the organic layer was dried over anhydrous sodium sulfate, concentrated, purified by silica gel column chromatography to obtain the product which was directly used in the next step.

Step 2: Preparation of (R)-5-(4-((1,4-dioxan-2-yl)methoxy)-3-methoxyphenyl)-3-(4-amino-2-fluorophenyl)pyridin-2-ylamine

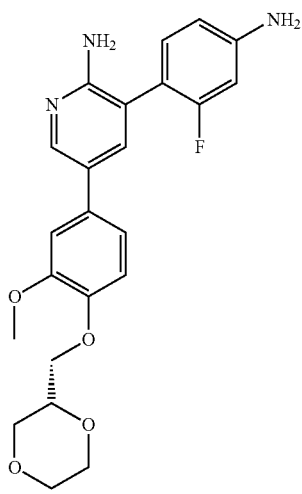

3,4-dimethoxyphenylboronic acid was replaced with (R)-2-(4-((1,4-dioxan-2-yl)methoxy)-3-methoxyphenyl)-4,4,5,5-tetramethyl-1,3,2-dioxabororane, and the remaining required raw materials, reagents and preparation methods were the same as step 2 in Example 37 to obtain a product with a yield of 50%.

$^1$H NMR (400 MHz, CDCl$_3$) δ 8.25 (d, J=2.4 Hz, 1H), 7.54 (d, J=2.4 Hz, 1H), 7.15 (t, J=8.3 Hz, 1H), 7.07-6.91 (m, 3H), 6.57-6.42 (m, 2H), 4.62 (s, 2H), 4.18-3.29 (m, 14H).

Step 3: Preparation of (R)—N-(4-(5-(4-((1,4-dioxan-2-yl)methoxy)-3-methoxyphenyl)-2-aminopyridin-3-yl)-3-fluoro phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with (R)-5-(4-((1,4-dioxan-2-yl)methoxy)-3-methoxyphenyl)-3-(4-amino-2-fluorophenyl)pyridin-2-ylamine, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid. The remaining required raw materials, reagents and preparation methods were the same as step 7 in Example 1 to obtain a product with a yield of 45%.

$^1$H NMR (400 MHz, DMSO-d$_6$) δ 11.06 (s, 1H), 8.69 (s, 1H), 8.29 (d, J=2.5 Hz, 1H), 7.87 (dd, J=12.3, 2.0 Hz, 1H), 7.61 (d, J=2.4 Hz, 1H), 7.50-7.28 (m, 6H), 7.17 (d, J=2.2 Hz, 1H), 7.10 (dd, J=8.3, 2.1 Hz, 1H), 6.98 (d, J=8.4 Hz, 1H), 5.72 (s, 2H), 4.78 (p, J=6.7 Hz, 1H), 3.97-3.36 (m, 12H), 1.43 (d, J=6.7 Hz, 6H).

Example 40

N-(4-(2-amino-5-(1H-pyrazol-4-yl)pyridin-3-yl)-3-fluorophenyl)-3-(4-fluorophenyl)-1-isopropyl-2,4-dioxo-1,2,3,4-tetrahydropyrimidin-5-carboxamide

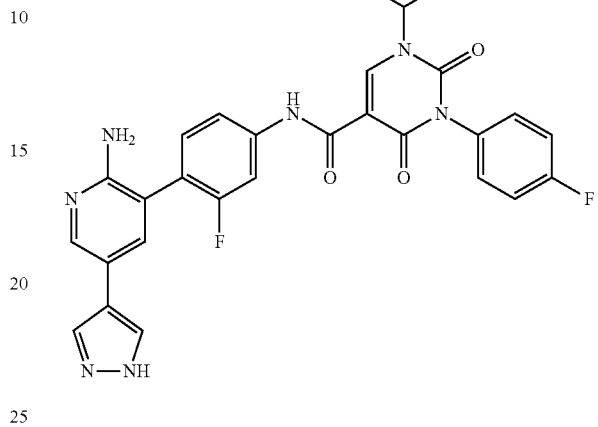

Step 1: Preparation of 3-(4-amino-2-fluorophenyl)-5-(1H-pyrazol-4-yl)pyridin-2-ylamine

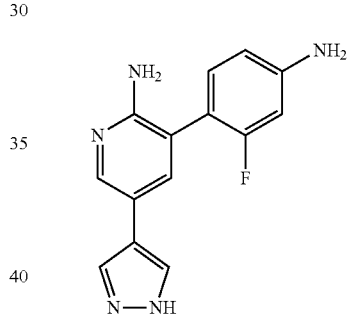

3,4-dimethoxyphenylboronic acid was replaced with 4-pyrazole boronic acid pinacol ester, and the remaining required raw materials, reagents and preparation methods were the same as step 2 in Example 37 to obtain a product with a yield of 36%.

$^1$H NMR (400 MHz, DMSO-d$_6$) δ 12.81 (s, 1H), 8.20 (d, J=2.4 Hz, 1H), 8.07 (s, 1H), 7.82 (s, 1H), 7.46 (d, J=2.4 Hz, 1H), 7.01 (t, J=8.5 Hz, 1H), 6.51-6.39 (m, 2H), 5.53 (s, 2H), 5.31 (s, 2H).

Step 2: Preparation of N-(4-(2-amino-5-(1H-pyrazol-4-yl)pyridin-3-yl)-3-fluorophenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 3-(4-amino-2-fluorophenyl)-5-(1H-pyrazol-4-yl)pyridin-2-ylamine, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 7%.

$^1$H NMR (400 MHz, CDCl$_3$) δ 10.99 (s, 1H), 8.71 (s, 1H), 8.28 (d, J=2.2 Hz, 1H), 7.84-7.76 (m, 3H), 7.52 (d, J=2.2 Hz, 1H), 7.39-7.30 (m, 2H), 7.27 (d, J=3.0 Hz, 4H), 4.98 (p, J=6.7 Hz, 1H), 4.60 (s, 2H), 1.51 (d, J=6.8 Hz, 6H).

Example 41

N-(4-((1H-pyrrolo[2,3-b]pyridin-4-yl)oxy)-3-fluorophenyl)-3-(4-fluorophenyl)-1-isopropyl-2,4-dioxo-1,2,3,4-tetrahydropyrimidin-5-carboxamide

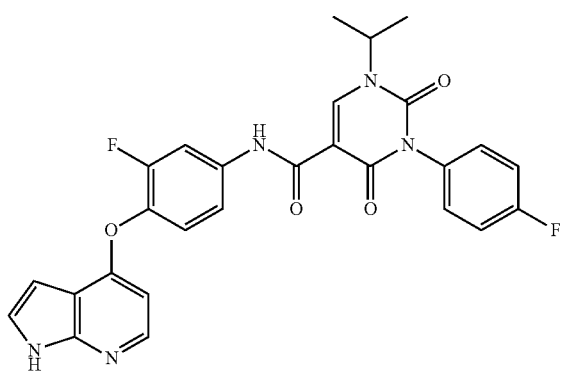 [SMILES: CC(C)n1cc(C(=O)Nc2ccc(Oc3ccnc4[nH]ccc34)c(F)c2)c(=O)n(-c2ccc(F)cc2)c1=O]

Step 1: Preparation: 4-(2-fluoro-4-nitrophenoxy)-1H-pyrrolo[2,3-b]pyridine

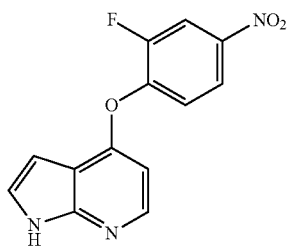 [SMILES: O=[N+]([O-])c1ccc(Oc2ccnc3[nH]ccc23)c(F)c1]

4-chloro-1H-pyrrolo[2,3-b]pyridine (1 g, 6.6 mmol) and 2-fluoro-4-nitrophenol (1.5 g, 9.8 mmol) were added to 5 mL of diphenyl ether, and the mixture was reacted at 190° C. under argon protection. After 1 hour, the temperature was cooled to room temperature, the reaction solution was poured into cold ethyl acetate, standing, and then the solid was filtered out. The solid was purified by column chromatography to obtain 246 mg of product, yield: 14%.

Step 2: Preparation of 4-((1H-pyrrolo[2,3-b]pyridin-4-yl)oxy)-3-fluorophenylamine

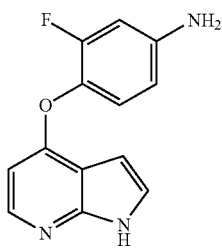 [SMILES: Nc1ccc(Oc2ccnc3[nH]ccc23)c(F)c1]

4-(2-fluoro-4-nitrophenoxy)-1H-pyrrolo[2,3-b]pyridine (100 mg, 0.37 mmol), zinc powder (120 mg, 1.8 mmol) and ammonium chloride (99 mg, 1.8 mmol) were added to a mixed solution of 1.7 mL tetrahydrofuran and 3.4 mL methanol, and the mixture was stirred at room temperature under argon protection. After 20 hours, the stirring was stopped, and the reaction solution was filtered with diatomite. The filter cake was washed with methanol. The filtrate was concentrated, and then purified by column chromatography to obtain 20 mg of product, yield: 22%.

$^1$H NMR (400 MHz, DMSO-d$_6$) δ 11.69 (s, 1H), 8.02 (d, J=5.5 Hz, 1H), 7.33 (dd, J=3.5, 2.4 Hz, 1H), 7.02 (t, J=9.0 Hz, 1H), 6.51 (dd, J=13.2, 2.6 Hz, 1H), 6.43 (ddd, J=8.6, 2.5, 1.0 Hz, 1H), 6.26 (ddd, J=15.9, 4.5, 1.4 Hz, 2H), 5.44 (s, 2H).

Step 3: Preparation of N-(4-((1H-pyrrolo[2,3-b]pyridin-4-yl)oxy)-3-fluorophenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 4-((1H-pyrrolo[2,3-b]pyridin-4-yl)oxy)-3-fluorophenamine, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 68%.

$^1$H NMR (400 MHz, DMSO-d$_6$) δ 11.78 (s, 1H), 11.01 (s, 1H), 8.67 (s, 1H), 8.05 (d, J=5.4 Hz, 1H), 7.96 (dd, J=13.0, 2.5 Hz, 1H), 7.51-7.31 (m, 7H), 6.36 (d, J=5.5 Hz, 1H), 6.24 (dd, J=3.5, 1.9 Hz, 1H), 4.76 (p, J=6.8 Hz, 1H), 1.41 (d, J=6.8 Hz, 6H).

Example 42

N-(4-((3-bromo-1H-pyrazolo[2,3-b]pyridin-4-yl)oxy)-3-fluorophenyl)-3-(4-fluorophenyl)-1-isopropyl-2,4-dioxo-1,2,3,4-tetrahydropyrimidin-5-carboxamide

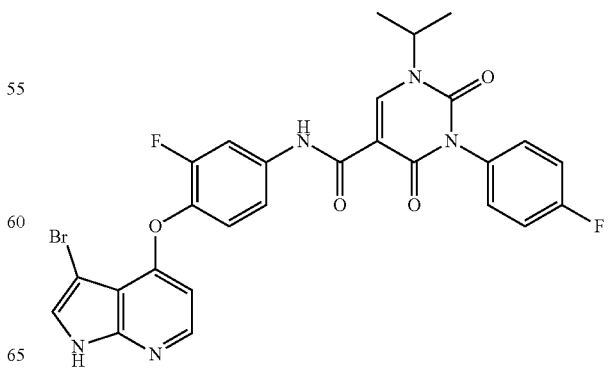

Step 1: Preparation of 3-bromo-4-(2-fluoro-4-nitro-phenoxy)-1H-pyrrolo[2,3-b]pyridine

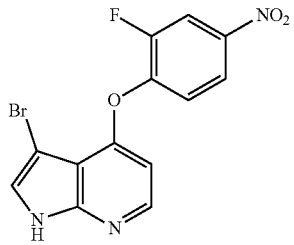 [SMILES: O=[N+]([O-])c1ccc(Oc2ccnc3[nH]cc(Br)c23)c(F)c1]

4-(2-fluoro-4-nitrophenoxy)-1H-pyrrolo[2,3-b]pyridine (273 mg, 1 mmol) was dissolved in 8 ml of N,N-dimethylformamide, the temperature was cooled to 0° C., then N-bromosuccinimide (196 mg, 1.1 mmol) was added, and then the temperature was raised to room temperature, and the reaction solution was continued to be stirred overnight. The reaction solution was poured into water, extracted with ethyl acetate for 3 times. The ethyl acetate layers were combined, washed with saturated sodium chloride aqueous solution once and then concentrated, and then purified by column chromatography to obtain 348 mg of product, yield: 99%.

$^1$H NMR (400 MHz, DMSO-$d_6$) δ 12.40 (s, 1H), 8.41 (dd, J=10.7, 2.7 Hz, 1H), 8.28 (d, J=5.3 Hz, 1H), 8.11 (ddd, J=9.2, 2.8, 1.4 Hz, 1H), 7.73 (d, J=2.7 Hz, 1H), 7.26 (t, J=8.7 Hz, 1H), 6.80 (d, J=5.3 Hz, 1H).

Step 2: Preparation of 4-((3-bromo-1H-pyrrolo[2,3-b]pyridin-4-yl)oxy)-3-fluoro aniline

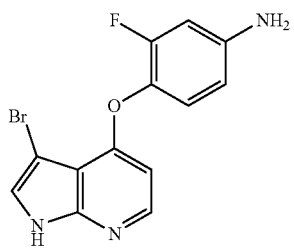 [SMILES: Nc1ccc(Oc2ccnc3[nH]cc(Br)c23)c(F)c1]

3-bromo-4-(2-fluoro-4-nitrophenoxy)-1H-pyrrolo[2,3-b]pyridine (50 mg, 0.14 mmol), reduced iron powder (18 mg, 0.32 mmol) and ammonium chloride (43 mg, 0.81 mmol) were added to a mixed solution of 3 mL ethanol and 1 mL water, and the mixture was reacted at 90° C. under argon protection. After 2.5 hours, the temperature was cooled to room temperature, and the reaction solution was filtered with diatomite. The filter cake was washed with ethanol. The filtrate was extracted with ethyl acetate and water. The ethyl acetate layer was dried over anhydrous sodium sulfate and concentrated to obtain 43 mg of product, yield: 94%.

Step 3: Preparation of N-(4-((3-bromo-1H-pyrazolo[2,3-b]pyridin-4-yl)oxy)-3-fluorophenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 4-((3-bromo-1H-pyrrolo[2,3-b]pyridin-4-yl)oxy)-3-fluoro aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 43%.

$^1$H NMR (400 MHz, DMSO-$d_6$) δ 12.18 (s, 1H), 11.02 (s, 1H), 8.68 (s, 1H), 8.10 (d, J=5.4 Hz, 1H), 7.99 (dd, J=13.0, 2.5 Hz, 1H), 7.63 (d, J=2.6 Hz, 1H), 7.54-7.30 (m, 6H), 6.32 (d, J=5.9 Hz, 1H), 4.78 (p, J=7.3, 6.8 Hz, 1H), 1.42 (d, J=6.7 Hz, 6H).

Example 43

N-(3-fluoro-4-((5-phenyl-7-((2-(trimethylsilyl)ethoxy)methyl)-7H-pyrrolo[2,3-d]pyrimidin-4-yl)oxy)phenyl)-3-(4-fluorophenyl)-1-isopropyl-2,4-dioxo-1,2,3,4-tetrahydropyrimidin-5-carboxamide

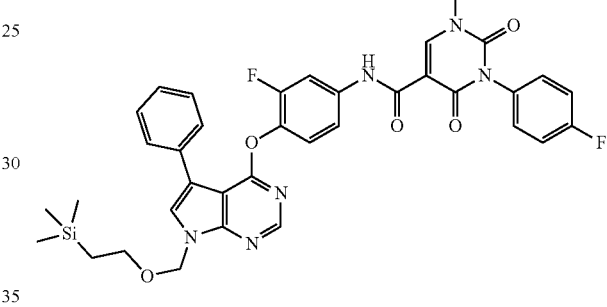

Step 1: Preparation of 4-chloro-5-iodo-7-((2-(trimethylsilyl)ethoxy)methyl)-7H-pyrrolo[2,3-d]pyrimidine

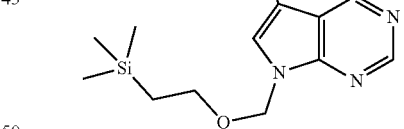

Sodium hydrogen (0.43 g, 11 mmol) was dissolved in 10 ml of N,N-dimethylformamide, the mixture was stirred for 10 minutes and then the temperature was cooled to 0° C. 4-chloro-5-iodine-7H-pyrrolo[2,3-d]pyrimidine (2 g, 7.2 mmol) was dissolved in 10 ml of N,N-dimethylformamide, and the mixture was added into the reaction solution dropwise, and the reaction solution was continued to be stirred at 0° C. for 0.5 hours. 2-(trimethylsilyl)ethoxymethyl chloride (1.52 ml, 8.6 mmol) was dissolved in 10 ml of N,N-dimethylformamide, and the mixture was added into the reaction solution dropwise, and then the reaction solution was continued to be stirred at 0° C. for 0.5 hours, and the temperature was finally raised to room temperature, and the mixture was stirred overnight. The reaction solution was poured into water, extracted with ethyl acetate for 3 times, the ethyl acetate layers were combined, and washed with saturated sodium chloride aqueous solution for 5 times, then concentrated, and then purified by column chromatography. The production was 2.4 g, and the yield was 81%.

$^1$H NMR (400 MHz, DMSO-$d_6$) δ 8.70 (s, 1H), 8.14 (s, 1H), 5.60 (s, 2H), 3.51 (t, J=8.1 Hz, 2H), 0.82 (t, J=8.0 Hz, 2H), −0.10 (s, 9H).

Step 2: Preparation of 4-chloro-5-phenyl-7-((2-(trimethylsilyl)ethoxy)methyl)-7H-pyrrolo[2,3-d]pyrimidine

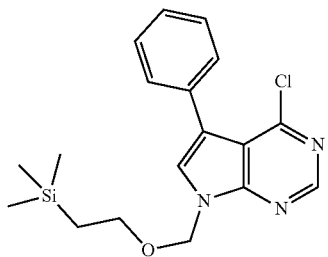 [SMILES: C[Si](C)(C)CCOCn1cc(-c2ccccc2)c2c(Cl)ncnc21]

4-chloro-5-iodine-7-((2-(trimethylsilyl)ethoxy)methyl)-7H-pyrrolo[2,3-d]pyrimidine (1 g, 2.4 mmol), phenyl boronic acid pinacol (1.2 g, 0.6 mmol), potassium phosphate trihydrate (0.78 g, 2.9 mmol) and 1,1-bis(di-phenylphospho)ferrocene palladium chloride (179 mg, 0.24 mmol) were added to 30 mL of tetrahydrofuran and 3 ml of water, then 1.9 ml of triethylamine was added, and the mixture was finally reacted at 85° C. under argon protection. After 24 hours, the heating was stopped and the temperature was cooled to room temperature. The reaction solution was extracted with ethyl acetate-water, and the organic layer was concentrated, and then purified by column chromatography to obtain 432 mg of product, yield: 49%.

$^1$H NMR (400 MHz, DMSO-$d_6$) δ 8.72 (s, 1H), 7.98 (s, 1H), 7.56-7.50 (m, 2H), 7.46 (ddd, J=7.7, 6.4, 1.4 Hz, 2H), 7.39 (tt, J=9.5, 3.1 Hz, 1H), 5.69 (s, 2H), 3.59 (t, J=8.0 Hz, 2H), 0.85 (dd, J=8.5, 7.5 Hz, 2H), −0.09 (s, 9H).

Step 3: Preparation of 3-fluoro-4-((5-phenyl-7-((2-(trimethylsilyl)ethoxy)methyl)-7H-pyrrolo[2,3-d]pyrimidin-4-yl)oxy)aniline

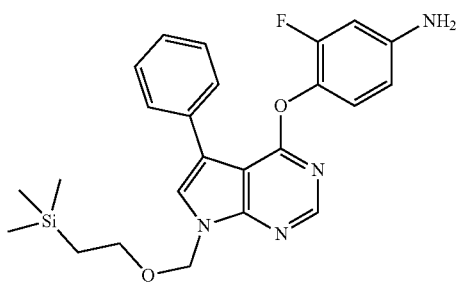 [SMILES: C[Si](C)(C)CCOCn1cc(-c2ccccc2)c2c(Oc3ccc(N)cc3F)ncnc21]

3-fluoro-4-hydroxyaniline (216 mg, 1.7 mmol) was dissolved in 20 ml of N,N-dimethylformamide, and the temperature was cooled to 0° C., followed by the addition of sodium hydrogen (116 mg, 2.9 mmol). The temperature was raised to room temperature, and the mixture was stirred for 15 minutes, then 4-chloro-5-phenyl-7-((2-(trimethylsilyl)ethoxy)methyl)-7H-pyrrolo[2,3-d]pyrimidine (360 mg, 1 mmol) was added, and the mixture was finally stirred overnight at room temperature. The reaction solution was extracted with ethyl acetate-saturated ammonium chloride aqueous solution. The organic layer was dried over anhydrous sodium sulfate, concentrated, and then purified by column chromatography to obtain 348 mg of product, yield: 77%.

$^1$H NMR (400 MHz, CDCl$_3$) δ 8.47 (s, 1H), 7.82-7.72 (m, 2H), 7.47-7.28 (m, 4H), 7.02 (t, J=8.6 Hz, 1H), 6.58-6.41 (m, 2H), 5.69 (s, 2H), 3.75 (s, 2H), 3.65-3.57 (m, 2H), 1.00-0.90 (m, 2H), −0.03 (s, 9H).

Step 4: Preparation of N-(3-fluoro-4-((5-phenyl-7-((2-(trimethylsilyl)ethoxy)methyl)-7H-pyrrolo[2,3-d]pyrimidin-4-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 3-fluoro-4-((5-phenyl-7-((2-(trimethylsilyl)ethoxy)methyl)-7H-pyrrolo[2,3-d]pyrimidin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 94%.

$^1$H NMR (400 MHz, DMSO-$d_6$) δ 11.03 (s, 1H), 8.69 (s, 1H), 8.42 (s, 1H), 8.01-7.91 (m, 2H), 7.76 (d, J=7.6 Hz, 2H), 7.52-7.27 (m, 9H), 5.68 (s, 2H), 4.78 (p, J=6.7 Hz, 1H), 3.60 (t, J=8.0 Hz, 2H), 1.43 (d, J=6.8 Hz, 6H), 0.87 (t, J=8.0 Hz, 2H), −0.07 (s, 9H).

Example 44

N-(3-fluoro-4-((5-phenyl-7H-pyrrolo[2,3-d]pyrimidin-4-yl)oxy)phenyl)-3-(4-fluorophenyl)-1-isopropyl-2,4-dioxo-1,2,3,4-tetrahydropyrimidin-5-carboxamide

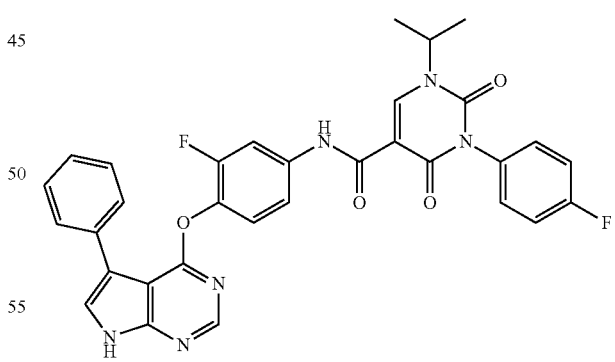

N-(3-fluoro-4-((5-phenyl-7-((2-(trimethylsilyl)ethoxy)methyl)-7H-pyrrolo[2,3-d]pyrimidin-4-yl)oxy)phenyl)-3-(4-fluorophenyl)-1-isopropyl-2,4-dioxo-1,2,3,4-tetrahydropyrimidin-5-carboxamide (100 mg, 0.15 mmol) was added to 2 ml of trifluoroacetic acid, and the mixture was stirred overnight. 4 ml of acetonitrile and 4 ml of ammonia water were added to the reaction solution, and the mixture was stirred for 40 minutes, then 20 ml of ethyl acetate was added. The organic layer was washed twice with saturated sodium chloride aqueous solution, dried over anhydrous sodium sulfate, concentrated, and purified by column chromatography to obtain 63 mg of product, yield: 69%.

$^1$H NMR (400 MHz, DMSO-d$_6$) δ 12.56 (s, 1H), 11.03 (s, 1H), 8.69 (d, J=1.0 Hz, 1H), 8.33 (d, J=1.1 Hz, 1H), 7.99-7.89 (m, 1H), 7.77 (dd, J=5.2, 2.8 Hz, 3H), 7.53-7.33 (m, 8H), 7.31-7.23 (m, 1H), 4.78 (p, J=6.8 Hz, 1H), 1.43 (d, J=6.7 Hz, 6H).

Example 45

N-(3-fluoro-4-((2-oxo-2,3-dihydro-1H-pyrrolo[2,3-b]pyridin-4-yl)oxy)phenyl)-3-(4-fluorophenyl)-1-isopropyl-2,4-dioxo-1,2,3,4-tetrahydropyrimidin-5-carboxamide

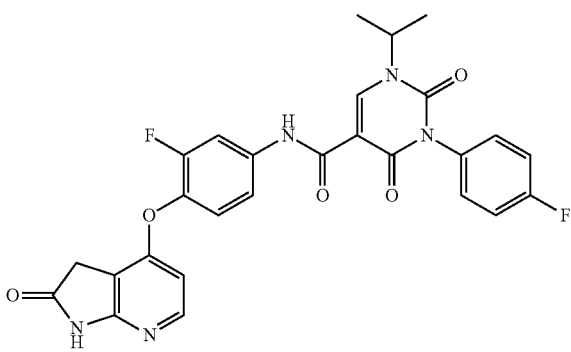 [SMILES: CC(C)n1cc(C(=O)Nc2ccc(Oc3ccnc4c3CC(=O)N4)c(F)c2)c(=O)n(-c2ccc(F)cc2)c1=O]

Step 1: Preparation of 3,3-dibromo-4-(2-fluoro-4-nitrophenoxy)-1,3-dihydro-2H-pyrrolo[2,3-b]pyridin-2-one

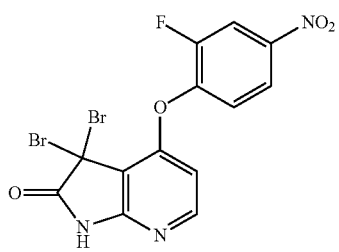 [SMILES: O=C1Nc2nccc(Oc3ccc([N+](=O)[O-])cc3F)c2C1(Br)Br]

4-(2-fluoro-4-nitrophenoxy)-1H-pyrrolo[2,3-b]pyridine (100 mg, 0.37 mmol) was dissolved in 6.5 ml of tert-butanol, tribromide pyridine (410 mg, 1.28 mmol) was added in batches under stirring, and then the mixture was stirred overnight at room temperature. The reaction solution was concentrated, and the residue was extracted with ethyl acetate-water. The organic layer was washed with saturated sodium chloride aqueous solution, dried over anhydrous sodium sulfate, concentrated, and then slurried with dichloromethane:methanol=10:1 to obtain 98 mg of product, yield: 60%.

$^1$H NMR (400 MHz, DMSO-d$_6$) δ 12.21 (s, 1H), 8.50 (dd, J=10.2, 2.7 Hz, 1H), 8.26-8.21 (m, 1H), 8.19 (d, J=6.0 Hz, 1H), 7.72 (t, J=8.5 Hz, 1H), 6.71 (d, J=6.1 Hz, 1H).

Step 2: Preparation of 4-(4-amino-2-fluorophenoxy)-1,3-dihydro-2H-pyrrolo[2,3-b]pyridin-2-one

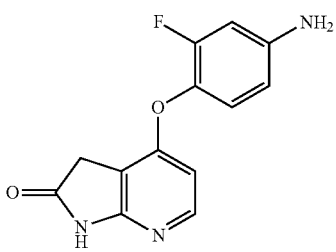 [SMILES: Nc1ccc(Oc2ccnc3c2CC(=O)N3)c(F)c1]

3,3-dibromo-4-(2-fluoro-4-nitrophenoxy)-1,3-dihydro-2H-pyrrolo[2,3-b]pyridin-2-one (68 mg, 0.15 mmol) was added to 5 ml of methanol, 60 mg of palladium on carbon was added, and the mixture was reacted under hydrogen atmosphere for 7 hours. The reaction solution was filtered by suction with diatomite and the filter cake was washed with methanol. The filtrate was concentrated to obtain 22 mg of product, yield: 56%.

$^1$H NMR (400 MHz, CD$_3$OD) δ 7.92 (d, J=6.2 Hz, 1H), 6.97 (t, J=8.8 Hz, 1H), 6.61-6.47 (m, 2H), 6.40 (d, J=6.2 Hz, 1H), 3.43 (s, 2H).

Step 3: Preparation of N-(3-fluoro-4-((2-oxo-2,3-dihydro-1H-pyrrolo[2,3-b]pyridin-4-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 4-(4-amino-2-fluorophenoxy)-1,3-dihydro-2H-pyrrolo[2,3-b]pyridin-2-one, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 29%.

$^1$H NMR (400 MHz, DMSO-d$_6$) δ 11.07 (s, 1H), 11.02 (s, 1H), 8.67 (s, 1H), 8.02-7.92 (m, 2H), 7.54-7.27 (m, 6H), 6.37 (d, J=6.1 Hz, 1H), 4.77 (p, J=6.8 Hz, 1H), 3.41 (s, 2H), 1.42 (d, J=6.8 Hz, 6H).

Example 46

N-(3-fluoro-4-((3-oxo-3,4-dihydropyridino[2,3-b]pyrazin-8-yl)oxy)phenyl)-3-(4-fluorophenyl)-1-isopropyl-2,4-dioxo-1,2,3,4-tetrahydropyrimidin-5-carboxamide

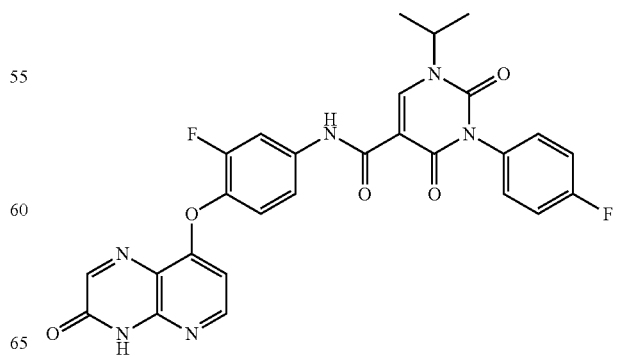

Step 1: Preparation of tert-butyl (3-fluoro-4-hydroxyphenyl) carbamate

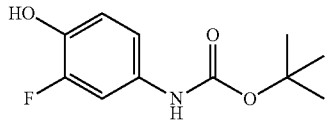 [SMILES: CC(C)(C)OC(=O)Nc1ccc(O)c(F)c1]

4-amino-2-fluorophenol (2 g, 15.7 mmol) and triethylamine (4.4 ml, 31.5 mmol) were successively added to 50 ml of tetrahydrofuran, then ditert-butyl dicarbonate (4.3 ml, 18.9 mmol) was added, and the mixture was finally stirred overnight at room temperature. The reaction solution was concentrated and purified by column chromatography to obtain 685 mg of product, yield: 19%.

$^1$H NMR (400 MHz, CDCl$_3$) δ 7.36 (d, J=12.4 Hz, 1H), 6.94-6.77 (m, 2H), 6.37 (s, 1H), 5.11 (s, 1H), 1.50 (s, 9H).

Step 2: Preparation of tert-butyl (4-((2-amino-3-nitropyridin-4-yl)oxy)-3-fluorophenyl)carbamate

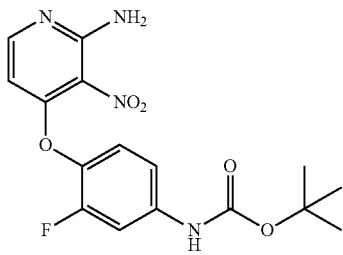

Tert-butyl (3-fluoro-4-hydroxyphenyl) carbamate (400 mg, 1.8 mmol) was dissolved in 8 ml of N,N-dimethylformamide, potassium tert-butoxide (217 mg, 1.9 mmol) was added, and the mixture was stirred at room temperature for 1 hour. Then a solution of 2-amino-3-nitro-4-chloropyridine (306 mg, 1.8 mmol) in 8 ml of N,N-dimethylformamide was added dropwise, and the mixture was finally reacted overnight at 70° C. The reaction solution was extracted with ethyl acetate-saturated sodium bicarbonate aqueous solution, and the organic layer was dried over anhydrous sodium sulfate and concentrated to obtain 632 mg of product, yield: 99%.

$^1$H NMR (400 MHz, DMSO-d$_6$) δ 9.74 (s, 1H), 7.99 (d, J=5.7 Hz, 1H), 7.65-7.55 (m, 1H), 7.36-7.24 (m, 2H), 7.21 (s, 2H), 5.94 (dd, J=5.7, 1.0 Hz, 1H), 1.48 (s, 9H).

Step 3: Preparation of tert-butyl (4-((2,3-diaminopyridin-4-yl)oxy)-3-fluorophenyl) carbamate

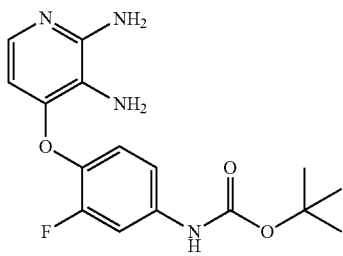 [SMILES: CC(C)(C)OC(=O)Nc1ccc(Oc2ccnc(N)c2[N+](=O)[O-])c(F)c1]

Tert-butyl (4-((2-amino-3-nitropyridin-4-yl)oxy)-3-fluorophenyl) carbamate (632 mg, 1.7 mmol) was added to a mixed solution of 10 ml ethyl acetate and 18 ml ethanol, 150 mg palladium on carbon was added, and the mixture was finally reacted for 7 hours under hydrogen atmosphere. The reaction solution was filtered by suction with diatomite, and the filtrate was concentrated to obtain a product.

$^1$H NMR (400 MHz, DMSO-d$_6$) δ 9.60 (s, 1H), 7.52 (dd, J=13.3, 2.4 Hz, 1H), 7.20 (dd, J=9.7, 6.8 Hz, 2H), 7.08 (t, J=9.1 Hz, 1H), 5.82 (d, J=5.6 Hz, 1H), 5.55 (s, 2H), 4.47 (s, 2H), 1.48 (s, 9H).

Step 4: Preparation of tert-butyl (3-fluoro-4-((3-oxo-3,4-dihydropyridino[2,3-b]pyrazin-8-yl)oxy)phenyl) carbamate

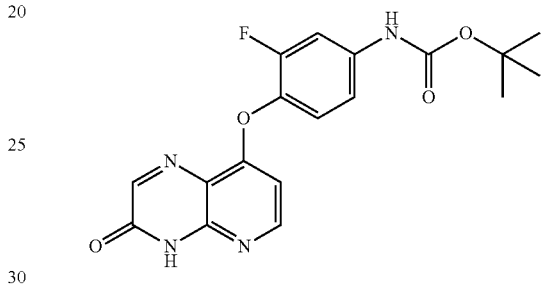

Tert-butyl (4-((2,3-diaminopyridin-4-yl)oxy)-3-fluorophenyl) carbamate (588 mg, 1.8 mmol) was dissolved in 12 ml of anhydrous ethanol, and some activated molecular sieves were added. Ethyl glyoxylate (50% dissolved in toluene, 610 μl, 3 mmol) was added dropwise under stirring, and then the mixture was stirred overnight at room temperature. The reaction solution was filtered by suction with diatomite, and the filtrate was concentrated and purified by column chromatography to obtain 118 mg of product, yield: 18%.

$^1$H NMR (400 MHz, DMSO-d$_6$) δ 12.94 (s, 1H), 9.75 (s, 1H), 8.34 (d, J=5.7 Hz, 1H), 8.19 (d, J=2.0 Hz, 1H), 7.64 (d, J=13.2 Hz, 1H), 7.45-7.23 (m, 2H), 6.53 (dd, J=5.7, 1.1 Hz, 1H), 1.49 (s, 9H).

325 mg of tert-butyl (3-fluoro-4-((2-oxo-1,2-dihydropyridino[2,3-b]pyrazin-8-yl)oxy)phenyl)carbamate with a yield of 50% was simultaneously obtained in this reaction. The structural formula and hydrogen spectrum information were as follows,

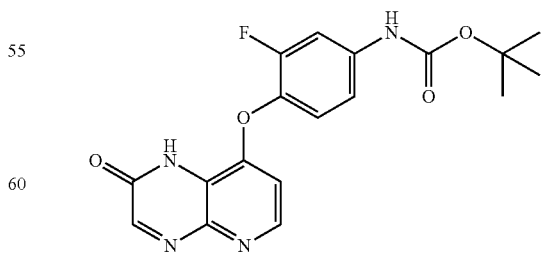

$^1$H NMR (400 MHz, DMSO-d$_6$) δ 12.64 (s, 1H), 9.76 (s, 1H), 8.41 (s, 1H), 8.32 (d, J=5.4 Hz, 1H), 7.64 (d, J=13.0 Hz, 1H), 7.42-7.28 (m, 2H), 6.80 (d, J=5.4 Hz, 1H), 1.49 (s, 9H).

Step 5: Preparation of 8-(4-amino-2-fluorophenoxy)pyridino[2,3-b]pyrazin-3(4H)-one

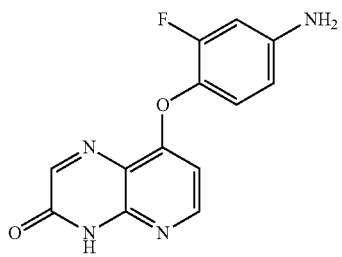 [SMILES: Nc1ccc(Oc2ccnc3[nH]c(=O)cnc23)c(F)c1]

Tert-butyl (3-fluoro-4-((3-oxo-3,4-dihydropyridino[2,3-b]pyrazin-8-yl)oxy)phenyl) carbamate (100 mg, 0.27 mmol) and 3 ml of tetrabutylammonium fluoride (1 M dissolved in tetrahydrofuran) were reacted overnight at 75° C. The reaction solution was concentrated, 30 ml of water was added, and the mixture was stirred for 1 hour, and filtered by suction to obtain a solid. The solid was soaked and stirred with toluene, and the upper liquid was poured away to obtain a 54 mg of solid as the product, yield: 74%.

$^1$H NMR (400 MHz, DMSO-$d_6$) δ 12.89 (s, 1H), 8.32 (d, J=5.7 Hz, 1H), 8.17 (s, 1H), 7.05 (t, J=9.0 Hz, 1H), 6.54 (dd, J=13.2, 2.6 Hz, 1H), 6.52-6.41 (m, 2H), 5.53 (s, 2H).

Step 6: Preparation of N-(3-fluoro-4-((3-oxo-3,4-dihydropyridino[2,3-b]pyrazin-8-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 8-(4-amino-2-fluorophenoxy)pyridino[2,3-b]pyrazin-3(4H)-one, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 16%.

$^1$H NMR (400 MHz, DMSO-$d_6$) δ 12.95 (s, 1H), 11.05 (s, 1H), 8.68 (s, 1H), 8.36 (d, J=5.7 Hz, 1H), 8.19 (s, 1H), 8.02 (dd, J=13.0, 2.4 Hz, 1H), 7.53 (d, J=8.5 Hz, 1H), 7.50-7.32 (m, 5H), 6.62-6.57 (m, 1H), 4.78 (p, J=6.9 Hz, 1H), 1.43 (d, J=6.8 Hz, 6H).

Example 47 tert-butyl 8-(4-(3-(4-fluorophenyl)-1-isopropyl-2,4-dioxo-1,2,3,4-tetrahydropyrimidin-5-formamido)phenoxy)-2,3-dihydro-4H-pyridino[3,2-b][1,4]oxazin-4-formate

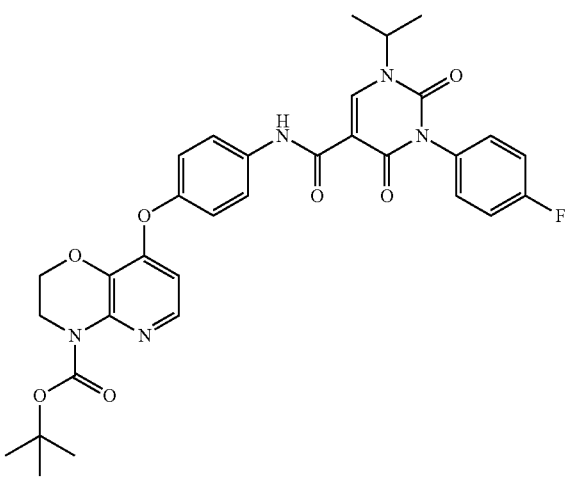 [SMILES: CC(C)n1cc(C(=O)Nc2ccc(Oc3ccnc4c3OCCN4C(=O)OC(C)(C)C)cc2)c(=O)n(-c2ccc(F)cc2)c1=O]

Step 1: Preparation of 2-amino-3-hydroxy-4-bromopyridine hydrogen bromide

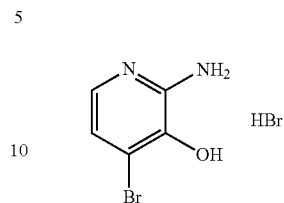

2-amino-3-hydroxypyridine (20 g, 182 mmol) was dissolved in 100 ml of ethanol, the temperature was cooled to 0° C., liquid bromine (18.6 ml, 363 mmol) was added slowly dropwise. After the addition, the temperature was raised to room temperature and the mixture was stirred overnight. The reaction solution was poured into 800 ml of ethyl acetate, stirred evenly, filtered by suction to obtain 24 g of solid which was washed with ethyl acetate. The solid was the product, yield: 50%.

$^1$H NMR (400 MHz, DMSO-$d_6$) δ 8.06 (s, 2H), 7.41 (d, J=6.9 Hz, 1H), 7.03 (d, J=6.9 Hz, 1H).

Step 2: Preparation of 8-bromo-3,4-dihydro-2H-pyridino[3,2-b][1,4]oxazine

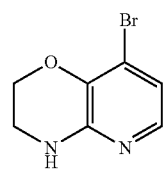 [SMILES: Brc1ccnc2c1OCCN2]

2-amino-3-hydroxy-4-bromopyridine hydrogen bromide (10 g, 37 mmol), 1,2-dibromoethane (4.8 ml, 56 mmol) and cesium carbonate (36 mg, 111 mmol) were added to 100 ml of acetonitrile, and the mixture was reacted at 85° C. for 48 hours. The reaction solution was filtered by suction, and the filtrate was concentrated and purified by column chromatography to obtain 1.17 g of product, yield: 14.7%.

$^1$H NMR (400 MHz, DMSO-$d_6$) δ 7.40 (d, J=5.4 Hz, 1H), 7.03 (s, 1H), 6.70 (d, J=5.4 Hz, 1H), 4.18 (t, J=4.4 Hz, 2H), 3.47-3.39 (m, 2H).

Step 3: Preparation of tert-butyl 8-bromo-2,3-dihydro-4H-pyridino[3,2-b][1,4]oxazin-4-formate

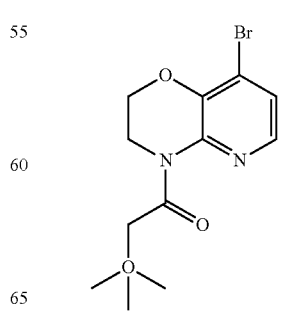

8-bromo-3,4-dihydro-2H-pyridino[3,2-b][1,4]oxazine was dissolved in 10 ml of tetrahydrofuran, and the temperature was cooled to 0° C. Ditrimethylsilylamine lithium (1 M dissolved in tetrahydrofuran, 3.7 ml, 3.7 mmol) was added dropwise. Di-tert-butyl dicarbonate (1 ml, 4.6 mmol) was added dropwise. The reaction was continued at 0° C. for 1.5 hours. The reaction solution was extracted with ethyl acetate-saturated ammonium chloride aqueous solution, and the organic layer was concentrated and purified by column chromatography to obtain 1.2 g of product, yield: 100%.

$^1$H NMR (400 MHz, CDCl$_3$) δ 7.88 (dd, J=5.2, 0.8 Hz, 1H), 7.22 (dd, J=5.1, 0.8 Hz, 1H), 4.43-4.31 (m, 2H), 4.02-3.89 (m, 2H), 1.54 (s, 9H).

Step 4: Preparation of tert-butyl 8-(4-(((benzoxy)formyl)amino)phenoxy)-2,3-dihydro-4H-pyridino[3,2-b][1,4]oxazin-4-formate

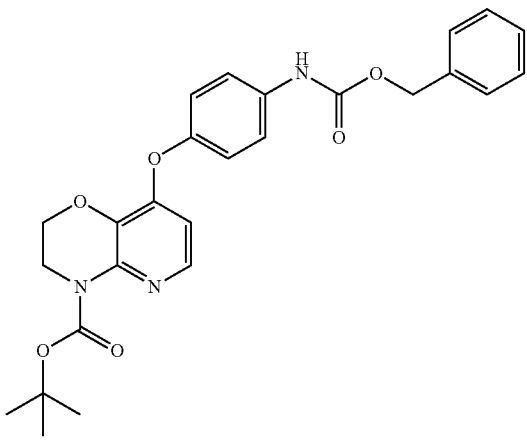 [SMILES: CC(C)(C)OC(=O)N1CCOc2c(Oc3ccc(NC(=O)OCc4ccccc4)cc3)ccnc21]

Tert-butyl 8-bromo-2,3-dihydro-4H-pyridino[3,2-b][1,4]oxazin-4-formate (756 mg, 2.4 mmol), benzyl (4-hydroxyphenyl) carbamate (700 mg, 2.9 mmol), potassium phosphate (1.8 g, 8.6 mmol), palladium acetate (108 mg, 0.48 mmol) and 2-di-tert-butylphosphino-2',4',6'-triisopropylbiphenyl (244 mg, 0.58 mmol) were added to 20 ml of toluene, and the mixture was reacted at 120° C. for 16 hours under argon protection. The reaction solution was diluted with dichloromethane:methanol=10:1, then filtered by suction with diatomite, and the filtrate was concentrated, and purified by column chromatography to obtain 64 mg of product, yield: 4.6%.

$^1$H NMR (400 MHz, CDCl$_3$) δ 7.91 (d, J=5.5 Hz, 1H), 7.38 (dddd, J=14.5, 6.8, 5.7, 3.8 Hz, 7H), 7.07-7.00 (m, 2H), 6.42 (d, J=5.5 Hz, 1H), 5.21 (s, 2H), 4.34 (dd, J=5.3, 3.9 Hz, 2H), 3.97 (dd, J=5.2, 3.8 Hz, 2H), 1.55 (s, 9H).

Step 5: Preparation of tert-butyl 8-(4-aminophenoxy)-2,3-dihydro-4H-pyridino[3,2-b][1,4]oxazin-4-formate

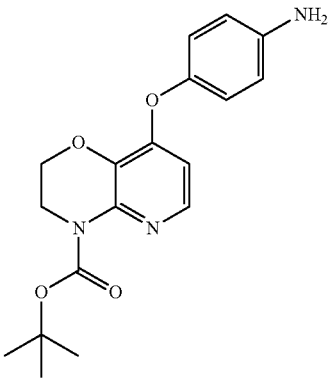 [SMILES: CC(C)(C)OC(=O)N1CCOc2c(Oc3ccc(N)cc3)ccnc21]

Tert-butyl 8-(4-(((benzoxy)formyl)amino)phenoxy)-2,3-dihydro-4H-pyridino[3,2-b][1,4]oxazin-4-formate (64 mg, 0.134 mmol) was dissolved in 3 ml methanol, 20 mg palladium on carbon was added, and the mixture was stirred for 7 hours under hydrogen atmosphere. The reaction solution was filtered by suction with diatomite, and the filtrate was concentrated to obtain 45.5 mg of product, yield: 99%.

$^1$H NMR (400 MHz, CDCl$_3$) δ 7.87 (d, J=5.5 Hz, 1H), 6.90 (d, J=8.8 Hz, 2H), 6.69 (d, J=8.8 Hz, 2H), 6.38 (d, J=5.5 Hz, 1H), 4.36 (t, J=4.5 Hz, 2H), 3.97 (t, J=4.5 Hz, 2H), 1.54 (s, 9H).

Step 6: Preparation of ter-butyl 8-(4-(3-(4-fluorophenyl)-1-isopropyl-2,4-dioxo-1,2,3,4-tetrahydropyrimidin-5-formamido)phenoxy)-2,3-dihydro-4H-pyridino[3,2-b][1,4]oxazin-4-formate 3-fluoro-4-((2-(1-methyl-1H-pyrazol-4-yl)pyridin-4-yl)oxy) aniline was replaced with tert-butyl 8-(4-aminophenoxy)-2,3-dihydro-4H-pyridino[3,2-b][1,4]oxazin-4-formate, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 48%.

$^1$H NMR (400 MHz, CDCl$_3$) δ 10.80 (s, 1H), 8.68 (s, 1H), 7.92 (d, J=5.5 Hz, 1H), 7.65 (d, J=8.9 Hz, 2H), 7.24 (s, 4H), 7.05 (d, J=8.9 Hz, 2H), 6.46 (d, J=5.5 Hz, 1H), 4.96 (p, J=6.9 Hz, 1H), 4.38-4.30 (m, 2H), 3.97 (t, J=4.5 Hz, 2H), 1.55 (s, 9H), 1.49 (d, J=6.8 Hz, 6H).

Example 48

N-(4-((3,4-dihydro-2H-pyridino[3,2-b][1,4]oxazin-8-yl)oxy)phenyl)-3-(4-fluorophen yl)-1-isopropyl-2,4-dioxo-1,2,3,4-tetrahydropyrimidin-5-carboxamide

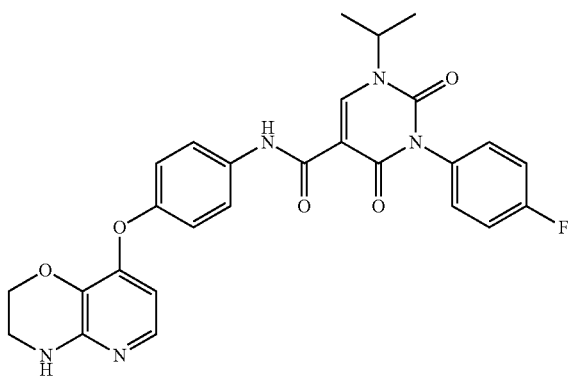 [SMILES: CC(C)n1cc(C(=O)Nc2ccc(Oc3ccnc4c3OCCN4)cc2)c(=O)n(-c2ccc(F)cc2)c1=O]

Tert-butyl 8-(4-(3-(4-fluorophenyl)-1-isopropyl-2,4-dioxo-1,2,3,4-tetrahydropyrimidin-5-formamido)phenoxy)-2,3-dihydro-4H-pyridino[3,2-b][1,4]oxazin-4-formate was dissolved in 5 ml of acetonitrile, p-toluenesulfonic acid monohydrate (102 mg, 0.53 ml) was added, 5 drops of methanol were added dropwise, and then the mixture was reacted at room temperature for 24 hours. 102 mg p-toluenesulfonic acid monohydrate and 5 drops of methanol were further added, and the mixture was continued to be stirred at room temperature. After 18 hours, the reaction solution was extracted with ethyl acetate-saturated sodium bicarbonate aqueous solution, and the organic layer was concentrated and purified by column chromatography to obtain 16 mg of product, yield: 59%.

$^1$H NMR (400 MHz, DMSO-$d_6$) δ 10.80 (s, 1H), 8.63 (s, 1H), 7.69-7.61 (m, 2H), 7.50-7.29 (m, 5H), 7.02-6.93 (m, 2H), 6.80 (s, 1H), 6.06 (d, J=5.6 Hz, 1H), 4.75 (p, J=6.8 Hz, 1H), 4.07 (t, J=4.4 Hz, 2H), 3.39 (q, J=3.7 Hz, 2H), 1.40 (d, J=6.8 Hz, 6H).

Example 49 tert-butyl 4-(5-(2-fluoro-4-(3-(4-fluorophenyl)-1-isopropyl-2,4-dioxo-1,2,3,4-tetrahydropyrimidin-5-formylamino)phenoxy)-1-methyl-1H-indazol-6-yl)-1H-pyrazol-1-formate

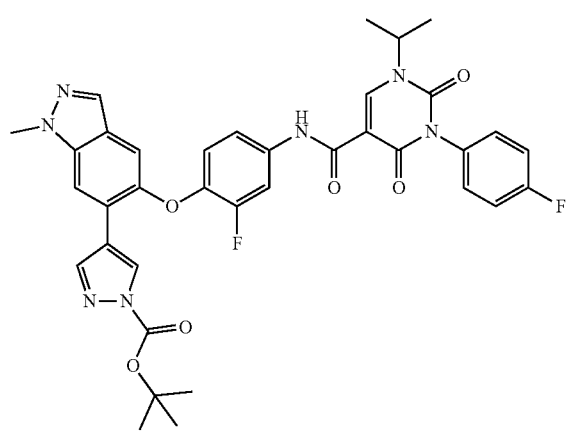 [SMILES: CC(C)n1cc(C(=O)Nc2ccc(Oc3cc4cnn(C)c4cc3-c3cnn(C(=O)OC(C)(C)C)c3)c(F)c2)c(=O)n(-c2ccc(F)cc2)c1=O]

Step 1: Preparation of 4-bromo-2-fluoro-5-nitrobenzaldehyde

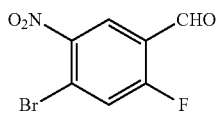 [SMILES: O=Cc1cc([N+](=O)[O-])c(Br)cc1F]

4-bromo-2-fluoro-benzaldehyde (1 g, 4.9 mmol) was dissolved in 5 mL of concentrated sulfuric acid, and the reaction solution was cooled to 0° C. in an ice bath under argon protection. Potassium nitrate (553 mg, 5.5 mmol) was added in batches. After the addition, the mixture was continued to be reacted at 0° C. After 2 hours, the reaction solution was poured into crushed ice, stirred evenly, and filtered to obtain 1.2 g of solid, which was the product, yield: 95%.

$^1$H NMR (400 MHz, DMSO-$d_6$) δ 10.13 (s, 1H), 8.49 (d, J=6.5 Hz, 1H), 8.22 (d, J=9.8 Hz, 1H).

Step 2: Preparation of 6-bromo-5-nitro-1H-indazole

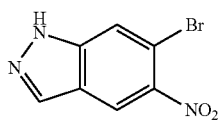 [SMILES: O=[N+]([O-])c1cc2cn[nH]c2cc1Br]

4-bromo-2-fluoro-5-nitrobenzaldehyde (2.5 g, 10 mmol) was dissolved in 40 mL of N,N-dimethylformamide, 0.53 mL of 85% hydrazine hydrate aqueous solution was added at room temperature, and then the mixture was reacted at 150° C. under argon protection. After 1.5 hours, the reaction solution was concentrated and diluted with ethyl acetate. The ethyl acetate layer was washed with saturated sodium chloride aqueous solution for 5 times, then dried over anhydrous sodium sulfate, concentrated, and purified by column chromatography to obtain 2.1 g of product, yield: 88%.

$^1$H NMR (400 MHz, DMSO-$d_6$) δ 13.74 (s, 1H), 8.63 (s, 1H), 8.35 (s, 1H), 8.07 (d, J=1.1 Hz, 1H).

Step 3: Preparation of 6-bromo-1-methyl-5-nitro-1H-indazole

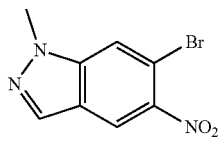

Sodium hydrogen (0.7 g, 17.4 mmol) was dissolved in 25 mL of redistilled tetrahydrofuran, and the temperature of the mixture was cooled to 0° C. in an ice bath under argon protection. 6-bromo-5-nitro-1H-indazole (2 g, 8.3 mmol) was added, and the reaction was continued at 0° C. for 0.5 hours. Then methyl iodide (2.1 mL, 33.9 mmol) was slowly added dropwise. After the addition, the temperature was raised to room temperature, and the mixture was continued to be stirred. After 2 hours, the reaction solution was poured into ice water, extracted twice with ethyl acetate. The ethyl acetate layers were combined, washed once with the saturated sodium chloride aqueous solution, then concentrated, and then purified by column chromatography to obtain 0.72 g of product, yield: 34%.

$^1$H NMR (400 MHz, CDCl$_3$) δ 8.37 (s, 1H), 8.13 (s, 1H), 7.77 (s, 1H), 4.11 (s, 3H).

Step 4: Preparation of
6-bromo-1-methyl-1H-indazol-5-ylamine

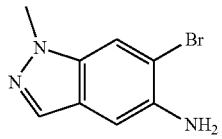

6-bromo-1-methyl-5-nitro-1H-indazole (94 mg, 0.37 mmol), reduced iron powder (205 mg, 3.7 mmol) and ammonium chloride (10 mg, 0.18 mmol) were added to a mixed solution of 3.7 mL ethanol and 0.7 mL water, and the mixture was reacted at 100° C. under argon protection. After 3 hours, the temperature was cooled to room temperature, and the reaction solution was filtered with diatomite and the filter cake was washed with ethanol. The filtrate was concentrated to obtain 89 mg of product, yield: 100%.

$^1$H NMR (400 MHz, DMSO-d$_6$) δ 7.87-7.82 (m, 1H), 7.76 (d, J=1.1 Hz, 1H), 7.04 (s, 1H), 5.00 (s, 2H), 3.93 (s, 3H).

Step 5: Preparation of
6-bromo-1-methyl-1H-indazol-5-ol

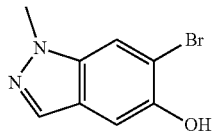

6-bromo-1-methyl-1H-indazol-5-ylamine (1 g, 4 mmol), 8 mL phosphoric acid and 3 mL water were mixed, and then the mixture was reacted at 200° C. under argon protection. After 2 hours, the temperature was cooled to room temperature, the reaction solution was poured into crushed ice, stirred evenly. After all the ice was melted, the mixture was extracted twice with ethyl acetate. The ethyl acetate layers were combined, and washed once with the saturated sodium chloride aqueous solution, dried over anhydrous sodium sulfate and concentrated to obtain 0.86 g of product, yield: 93%.

$^1$H NMR (400 MHz, DMSO-d$_6$) δ 9.94 (s, 1H), 7.93 (s, 1H), 7.86 (s, 1H), 7.17 (s, 1H), 3.97 (s, 3H).

Step 6: Preparation of 6-bromo-5-(2-fluoro-4-nitro-phenoxy)-1-methyl-1H-indazole

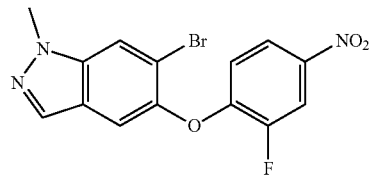 [SMILES: Cn1ncc2cc(Oc3ccc([N+](=O)[O-])cc3F)c(Br)cc21]

6-bromo-1-methyl-1H-indazol-5-ol (0.8 g, 3.5 mmol), 3,4-difluoronitrobenzene (0.4 mL, 3.6 mmol) and potassium carbonate (0.7 g, 5.3 mmol) were added to 7.6 mL of tetrahydrofuran, and the mixture was reacted at 55° C. under argon protection. After 14 hours, the temperature was cooled to room temperature, and the reaction solution was concentrated and purified by column chromatography to obtain 1.06 g of product, yield: 83%.

$^1$H NMR (400 MHz, DMSO-d$_6$) δ 8.36 (dd, J=10.8, 2.7 Hz, 1H), 8.29 (d, J=1.1 Hz, 1H), 8.09 (s, 1H), 8.00 (ddd, J=9.1, 2.8, 1.4 Hz, 1H), 7.85 (s, 1H), 6.86 (t, J=8.8 Hz, 1H), 4.08 (s, 3H).

Step 7: Preparation of tert-butyl 4-(5-(2-fluoro-4-nitrophenoxy)-1-methyl-1H-indazol-6-yl)-1H-pyrazol-1-formate

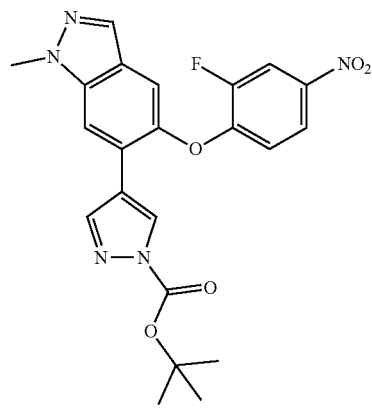 [SMILES: Cn1ncc2cc(Oc3ccc([N+](=O)[O-])cc3F)c(-c3cnn(C(=O)OC(C)(C)C)c3)cc21]

6-bromo-5-(2-fluoro-4-nitrophenoxy)-1-methyl-1H-indazole (0.90 g, 2.5 mmol), 4-pyrazole boronic acid pinacol ester (0.87 g, 3.0 mmol), potassium phosphate (1.02 g, 4.8 mmol), 1,1-di(tert-butyl phosphorus)ferrocene palladium chloride (32 mg, 0.05 mmol) and ditert-butyl dicarbonate (0.15 mL, 0.64 mmol) were added to a mixed solution of 10.7 mL tetrahydrofuran and 2.3 mL water, and the mixture was reacted at 40° C. under argon protection. After 4 hours, the temperature was cooled to room temperature, and the reaction solution was concentrated and purified by column chromatography to obtain 1.16 g of product, yield: 100%.

$^1$H NMR (400 MHz, DMSO-d$_6$) δ 8.55 (s, 1H), 8.40-8.27 (m, 3H), 8.08 (d, J=1.0 Hz, 1H), 7.95 (ddd, J=9.2, 2.8, 1.3 Hz, 1H), 7.75 (s, 1H), 6.87 (t, J=8.8 Hz, 1H), 4.14 (s, 3H), 1.57 (s, 9H).

119

Step 8: Preparation of tert-butyl 4-(5-(4-amino-2-fluorophenoxy)-1-methyl-1H-indazol-6-yl)-1H-pyrazol-1-formate

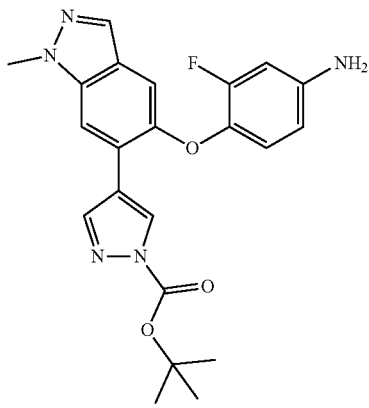

Tert-butyl 4-(5-(2-fluoro-4-nitrophenoxy)-1-methyl-1H-indazol-6-yl)-1H-pyrazol-1-formate (150 mg, 0.33 mmol), 40 mg palladium on carbon, 15 mg ammonium metavanadate were added to 2 mL tetrahydrofuran, and the mixture was reacted at 40° C. under hydrogen atmosphere. After 6.5 hours, the temperature was cooled to room temperature, and the reaction solution was filtered with diatomite and the filter cake was washed with tetrahydrofuran. The filtrate was concentrated and purified by column chromatography to obtain 115 mg of product, yield: 82%.

$^1$H NMR (400 MHz, DMSO-$d_6$) δ 8.67 (s, 1H), 8.44 (s, 1H), 8.13 (s, 1H), 7.90 (d, J=1.1 Hz, 1H), 7.02 (s, 1H), 6.89 (t, J=9.1 Hz, 1H), 6.52 (dd, J=13.3, 2.5 Hz, 1H), 6.39 (dd, J=8.5, 2.4 Hz, 1H), 5.37 (s, 2H), 4.08 (s, 3H), 1.60 (s, 9H).

Step 9: Preparation of tert-butyl 4-(5-(2-fluoro-4-(3-(4-fluorophenyl)-1-isopropyl-2,4-dioxo-1,2,3,4-tetrahydropyrimidin-5-formylamino)phenoxy)-1-methyl-1H-indazol-6-yl)-1H-pyrazol-1-formate 3-fluoro-4-((2-(1-methyl-1H-pyrazol-4-yl)pyridin-4-yl)oxy) aniline was replaced with tert-butyl 4-(5-(4-amino-2-fluorophenoxy)-1-methyl-1H-indazol-6-yl)-1H-pyrazol-1-formate, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 86%.

$^1$H NMR (400 MHz, DMSO-$d_6$) δ 10.92 (s, 1H), 8.65 (s, 1H), 8.63 (s, 1H), 8.40 (s, 1H), 8.21 (s, 1H), 7.95 (dd, J=13.2, 1.5 Hz, 2H), 7.49-7.24 (m, 6H), 6.91 (t, J=9.2 Hz, 1H), 4.92-4.63 (m, 1H), 4.10 (s, 3H), 1.58 (s, 9H), 1.41 (d, J=6.8 Hz, 6H).

120

Example 50

N-(3-fluoro-4-((1-methyl-6-(1H-pyrazol-4-yl)-1H-indazol-5-yl)oxy)phenyl)-3-(4-fluorophenyl)-1-isopropyl-2,4-dioxo-1,2,3,4-tetrahydropyrimidin-5-carboxamide

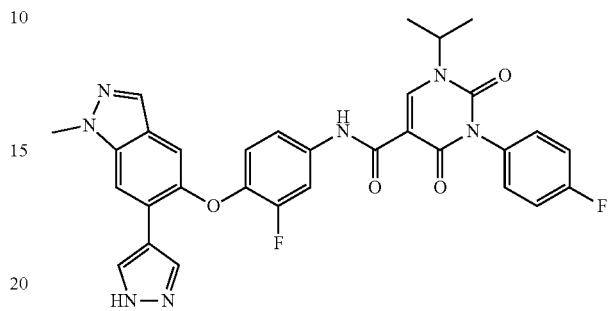

Tert-butyl 4-(5-(2-fluoro-4-(3-(4-fluorophenyl)-1-isopropyl-2,4-dioxo-1,2,3,4-tetrahydropyrimidin-5-formylamino)phenoxy)-1-methyl-1H-indazol-6-yl)-1H-pyrazol-1-formate (25 mg, 0.036 mmol) was dispersed in 1 mL dichloromethane, 23 µL triethylsilane and 213 µL trifluoroacetic acid were added, and then the mixture was stirred at room temperature. After 1.5 hours, the reaction solution was carefully poured into the saturated sodium bicarbonate aqueous solution, extracted twice with ethyl acetate. The ethyl acetate layers were combined, and washed once with the saturated sodium chloride aqueous solution. The ethyl acetate layer was concentrated and then purified by column chromatography to obtain 10.8 mg of product, yield: 50%.

$^1$H NMR (400 MHz, CDCl$_3$) δ 10.80 (s, 1H), 8.67 (s, 1H), 8.07 (s, 2H), 7.84 (d, J=0.8 Hz, 1H), 7.79 (dd, J=12.6, 2.5 Hz, 1H), 7.57 (s, 1H), 7.25-7.20 (m, 5H), 7.06 (dt, J=9.0, 1.9 Hz, 1H), 6.81 (t, J=8.9 Hz, 1H), 4.95 (p, J=6.8 Hz, 1H), 4.10 (s, 3H), 1.48 (d, J=6.8 Hz, 6H).

Example 51

N-(4-((2,3-dihydro-1H-pyrrolo[2,3-b]pyridin-4-yl)oxy)-3-fluorophenyl)-3-(4-fluorophenyl)-1-isopropyl-2,4-dioxo-1,2,3,4-tetrahydropyrimidin-5-carboxamide

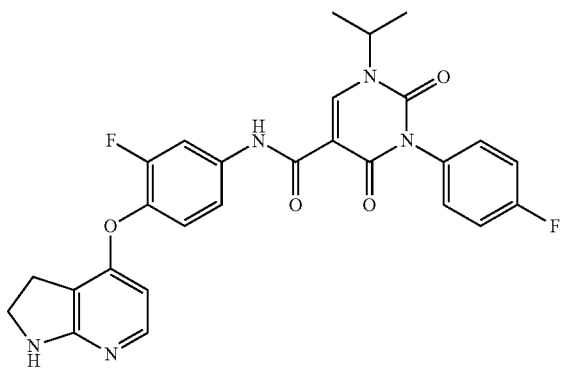

Step 1: Preparation of 4-chloro-2,3-dihydro-1H-pyrrolo[2,3-b]pyridine

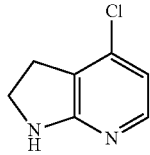

4-chloro-7-azaindole (1 g, 6.5 mmol) and borane dimethyl thioether complex (20 mL, 2 mol/L) were refluxed under stirring. After 16 hours, the reaction mixture was diluted with ethyl acetate, filtered by suction and the filtrate was retained. The filtrate was concentrated and purified by column chromatography to obtain 131.5 mg of product, yield: 13%.

$^1$H NMR (400 MHz, CD$_3$OD) δ 7.56 (d, J=5.9 Hz, 1H), 6.47 (d, J=6.4 Hz, 1H), 3.63 (t, J=8.6 Hz, 2H), 3.09 (t, J=8.6 Hz, 2H).

Step 2: Preparation of tert-butyl 4-chloro-2,3-dihydro-1H-pyrrolo[2,3-b]pyridin-1-formate

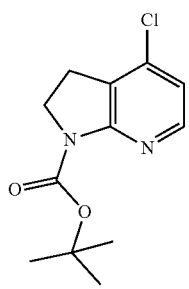 [SMILES: CC(C)(C)OC(=O)N1CCc2c(Cl)ccnc21]

4-chloro-2,3-dihydro-1H-pyrrolo[2,3-b]pyridine (100 mg, 0.65 mmol), 4-dimethylaminopyridine (8 mg, 0.065 mmol) and triethylamine (270 μL, 1.94 mmol) were added to 3 mL of dichloromethane, and the temperature of the mixture was cooled in an ice bath. Di-tert-butyl dicarbonate (178 μL, 0.78 mmol) was added dropwise, and then the temperature was raised to room temperature, and the mixture was continued to be stirred. After 42 hours, the reaction solution was concentrated and purified by column chromatography to obtain 43 mg of product, yield: 26%.

$^1$H NMR (400 MHz, CDCl$_3$) δ 8.03 (d, J=5.8 Hz, 1H), 7.01 (d, J=5.7 Hz, 1H), 3.96 (t, J=8.5 Hz, 2H), 3.04 (t, J=8.5 Hz, 2H), 1.48 (s, 9H).

Step 3: Preparation of tert-butyl 4-(4-amino-2-fluorophenoxy)-2,3-dihydro-1H-pyrrolo[2,3-b]pyridin-1-formate

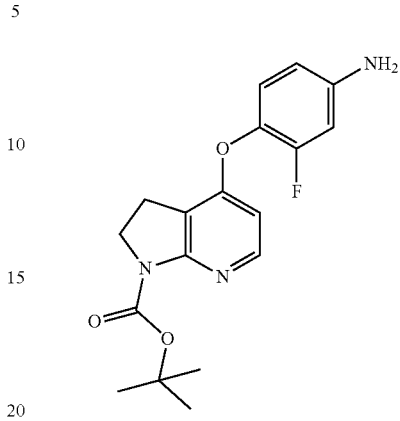

Tert-butyl 4-chloro-2,3-dihydro-1H-pyrrolo[2,3-b]pyridin-1-formate (40 mg, 0.16 mmol), 4-amino-2-fluorophenol (40 mg, 0.31 mmol) and cesium carbonate (154 mg, 0.47 mmol) were added to 1.5 mL of dimethylformamide, and the mixture was reacted at 125° C. After 12 hours, the temperature was cooled to room temperature, and the reaction solution was extracted with ethyl acetate and water. The ethyl acetate layer was concentrated, and then purified by column chromatography to obtain 21 mg of product, yield: 38%.

$^1$H NMR (400 MHz, CDCl$_3$) δ 8.05 (d, J=5.9 Hz, 1H), 6.91 (t, J=8.7 Hz, 1H), 6.54-6.40 (m, 2H), 6.17 (dd, J=6.0, 1.1 Hz, 1H), 4.02 (t, J=8.7 Hz, 2H), 3.05 (t, J=8.6 Hz, 2H), 1.55 (s, 9H).

Step 4: Preparation of tert-butyl 4-(2-fluoro-4-(3-(4-fluorophenyl)-1-isopropyl-2,4-dioxo-1,2,3,4-tetrahydropyrimidin-5-formamido)phenoxy)-2,3-dihydro-1H-pyrrolo[2,3-b]pyridin-1-formate

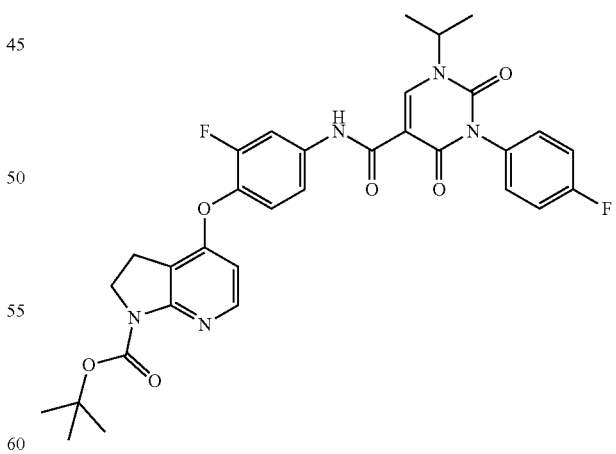

3-fluoro-4-((2-(1-methyl-1H-pyrazol-4-yl)pyridin-4-yl)oxy) aniline was replaced with tert-butyl 4-(4-amino-2-fluorophenoxy)-2,3-dihydro-1H-pyrrolo[2,3-b]pyridin-1-formate, 3-(4-fluorophenyl)-1-methyl-2,4-dioxo-1,2,3,4-tetrahydropyrimidin-5-carboxylic acid replaced 3-(4-fluorophenyl)-1-isopropyl-2,4-dioxo-1,2,3,4- tetrahydropyrimidin-5-carboxylic acid, and the remaining required raw materials, reagents and preparation methods were the same as step 7 in Example 1 to obtain a product with a yield of 96%.

¹H NMR (400 MHz, CDCl₃) δ 10.90 (s, 1H), 8.67 (d, J=1.4 Hz, 1H), 8.05 (d, J=6.0 Hz, 1H), 7.81 (d, J=12.1 Hz, 1H), 7.28-7.18 (m, 5H), 7.07 (t, J=8.6 Hz, 1H), 6.19 (d, J=5.9 Hz, 1H), 4.95 (p, J=6.7 Hz, 1H), 4.02 (t, J=8.6 Hz, 2H), 3.04 (t, J=8.7 Hz, 2H), 1.52 (s, 9H), 1.49 (d, J=6.8 Hz, 6H).

Step 5: Preparation of N-(4-((2,3-dihydro-1H-pyrrolo[2,3-b]pyridin-4-yl)oxy)-3-fluorophenyl)-3-(4-fluorophenyl)-1-isopropyl-2,4-dioxo-1,2,3,4-tetrahydropyrimidin-5-carboxamide Tert-butyl 4-(5-(2-fluoro-4-(3-(4-fluorophenyl)-1-isopropyl-2,4-dioxo-1,2,3,4-tetrahydropyrimidin-5-formylamino)phenoxy)-1-methyl-1H-indazol-6-yl)-1H-pyrazol-1-formate was replaced with tert-butyl 4-(2-fluoro-4-(3-(4-fluorophenyl)-1-isopropyl-2,4-dioxo-1,2,3,4-tetrahydropyrimidin-5-form amido)phenoxy)-2,3-dihydro-1H-pyrrolo[2,3-b]pyridin-1-formate, and the remaining required raw materials, reagents and preparation methods were the same as in Example 50, yield: 68%.

¹H NMR (400 MHz, DMSO-d₆) δ 10.96 (s, 1H), 8.65 (s, 1H), 7.90 (dd, J=13.1, 2.5 Hz, 1H), 7.59 (d, J=6.0 Hz, 1H), 7.45-7.29 (m, 5H), 7.23 (t, J=9.0 Hz, 1H), 6.48 (s, 1H), 5.87 (d, J=6.1 Hz, 1H), 4.76 (p, J=6.7 Hz, 1H), 3.45 (t, J=8.4 Hz, 2H), 2.83 (t, J=8.6 Hz, 2H), 1.40 (d, J=6.7 Hz, 6H).

Example 52

3-(4-fluorophenyl)-1-ethyl-N-(4-((3-(1-methyl-1H-pyrazol-4-yl)pyridin-4-yl)oxy)phenyl)-2,4-dioxo-1,2,3,4-tetrahydropyrimidin-5-carboxamide

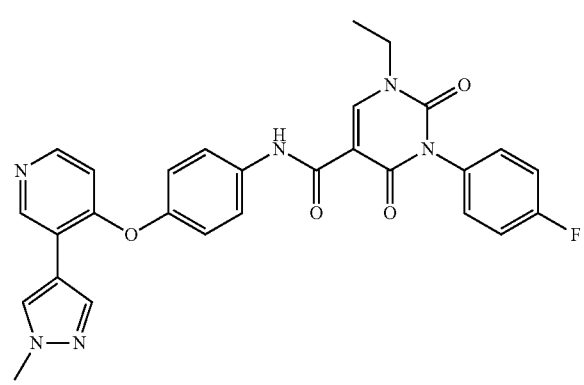 [SMILES: CCn1cc(C(=O)Nc2ccc(Oc3ccncc3-c3cnn(C)c3)cc2)c(=O)n(-c2ccc(F)cc2)c1=O]

3-fluoro-4-((2-(1-methyl-1H-pyrazol-4-yl)pyridin-4-yl)oxy) aniline was replaced with 4-((3-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-ethyl-2,4-dioxo-1,2,3,4-tetrahydropyrimidin-5-carboxylic acid, and the remaining required raw materials, reagents and preparation methods were the same as step 7 in Example 1 to obtain a product with a yield of 72%.

¹H NMR (300 MHz, DMSO-d₆) δ 10.90 (s, 1H), 8.86 (s, 2H), 8.26-8.22 (m, 2H), 8.04-7.99 (m, 1H), 7.82-7.73 (m, 2H), 7.48-7.30 (m, 4H), 7.18 (d, J=8.9 Hz, 2H), 6.70 (d, J=5.7 Hz, 1H), 4.01 (q, J=6.9 Hz, 2H), 3.88 (s, 3H), 1.29 (t, J=7.1 Hz, 3H).

Example 53

3-(4-fluorophenyl)-1-methyl-N-(4-((3-(1-methyl-1H-pyrazol-4-yl)pyridin-4-yl)oxy)phenyl)-2,4-dioxo-1,2,3,4-tetrahydropyrimidin-5-carboxamide

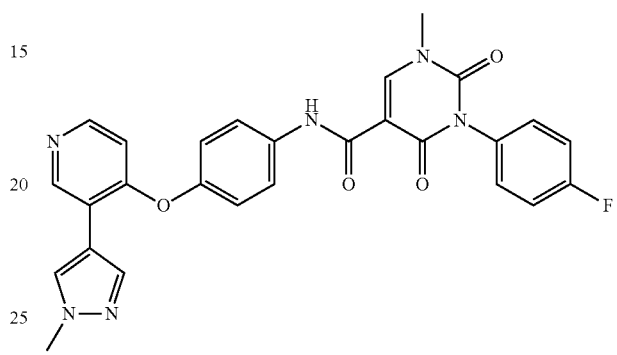

3-fluoro-4-((2-(1-methyl-1H-pyrazol-4-yl)pyridin-4-yl)oxy) aniline was replaced with 4-((3-(1-methyl-1H-pyrazol-4-yl)pyridin-4-yl)oxy) aniline, and the remaining required raw materials, reagents and preparation methods were the same as step 7 in Example 1 to obtain a product with a yield of 47%.

¹H NMR (300 MHz, DMSO-d₆) δ 10.90 (s, 1H), 8.85 (s, 2H), 8.25 (d, J=2.8 Hz, 2H), 8.04-7.98 (m, 1H), 7.77 (dd, J=8.9, 2.0 Hz, 2H), 7.46-7.30 (m, 4H), 7.22-7.12 (m, 2H), 6.70 (dd, J=5.6, 2.0 Hz, 1H), 3.88 (s, 3H), 3.53 (s, 3H).

Example 54

3-(4-fluorophenyl)-N-(4-((3-(1-methyl-1H-pyrazol-4-yl)pyridin-4-yl)oxy)phenyl)-2,4-dioxo-1-((tetrahydro-2H-pyran-4-yl)methyl)-1,2,3,4-tetrahydropyrimidin-5-carboxamide

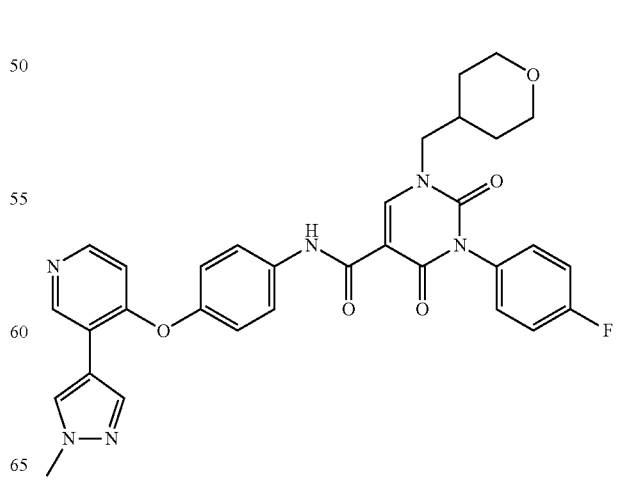

Step 1: Preparation of ethyl 3-(4-fluorophenyl)-2,4-dioxo-1-((tetrahydro-2H-pyran-4-yl)methyl)-1,2,3,4-tetrahydropyrimidin-5-formate

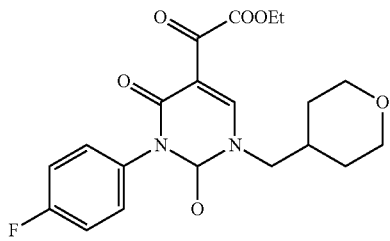

The methyl iodide was replaced with 4-iodomethyltetrahydropyran, and the remaining required raw materials, reagents and preparation methods were as shown in step 3 in Example 1 to obtain a product with a yield of 68%.

$^1$H NMR (300 MHz, DMSO-$d_6$) δ 8.61 (s, 1H), 7.34-7.26 (m, 4H), 4.20 (q, J=7.1 Hz, 2H), 3.89-3.75 (m, 4H), 3.24 (t, J=11.5 Hz, 2H), 2.01-1.88 (m, 1H), 1.55 (d, J=12.8 Hz, 2H), 1.31-1.14 (m, 5H).

Step 2: Preparation of 3-(4-fluorophenyl)-2,4-dioxo-1-((tetrahydro-2H-pyran-4-yl)methyl)-1,2,3,4-tetrahydropyrimidin-5-carboxylic acid

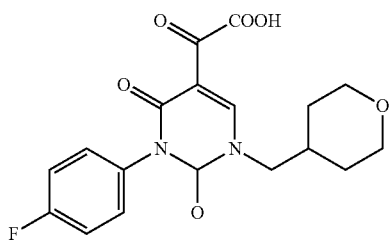 [SMILES: O=C(O)C(=O)C1=CN(CC2CCOCC2)C(O)N(c2ccc(F)cc2)C1=O]

Ethyl 3-(4-fluorophenyl)-1-methyl-2,4-dioxo-1,2,3,4-tetrahydropyrimidin-5-formate was replaced with ethyl 3-(4-fluorophenyl)-2,4-dioxo-1-((tetrahydro-2H-pyran-4-yl)methyl)-1,2,3,4-tetrahydropyrimidin-5-formate, and the remaining required raw materials and preparation methods were the same as step 4 in Example 1 to obtain a product with a yield of 52%.

$^1$H NMR (300 MHz, DMSO-$d_6$) δ 12.66 (s, 1H), 8.75 (s, 1H), 7.43-7.27 (m, 4H), 3.92-3.78 (m, 4H), 3.24 (t, J=11.1 Hz, 2H), 2.05-1.87 (m, 1H), 1.62-1.50 (m, 2H), 1.33-1.15 (m, 2H).

Step 3: Preparation of 3-(4-fluorophenyl)-N-(4-((3-(1-methyl-1H-pyrazol-4-yl)pyridin-4-yl)oxy)phenyl)-2,4-dioxo-1-((tetrahydro-2H-pyran-4-yl)methyl)-1,2,3,4-tetrahydropyrimidin-5-carboxamide 3-fluoro-4-((2-(1-methyl-1H-pyrazol-4-yl)pyridin-4-yl)oxy) aniline was replaced with 4-((3-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-2,4-dioxo-1-((tetrahydro-2H-pyran-4-yl)methyl)-1,2,3,4-tetrahydropyrimidin-5-carboxylic acid, and the remaining required raw materials, reagents and preparation methods were the same as step 7 in Example 1 to obtain a product with a yield of 71%.

$^1$H NMR (300 MHz, DMSO-$d_6$) δ 10.93 (s, 1H), 8.86 (s, 1H), 8.80 (s, 1H), 8.28-8.22 (m, 2H), 8.02 (d, J=0.8 Hz, 1H), 7.77 (d, J=9.0 Hz, 2H), 7.47-7.32 (m, 4H), 7.18 (d, J=9.0 Hz, 2H), 6.70 (d, J=5.7 Hz, 1H), 3.95-3.81 (m, 7H), 3.26 (t, J=11.4 Hz, 2H), 1.99 (s, 1H), 1.59 (d, J=11.8 Hz, 2H), 1.35-1.20 (m, 2H).

Example 55

N-(3-fluoro-4-((2-(1-methyl-1H-pyrazol-4-yl)pyridin-4-yl)oxy)phenyl)-3-(4-fluorophenyl)-1-(3-methoxypropyl)-2,4-dioxo-1,2,3,4-tetrahydropyrimidin-5-carboxamide

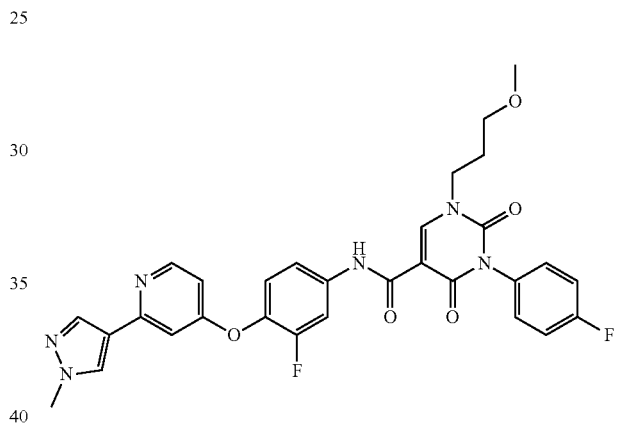

Step 1: Preparation of ethyl 3-(4-fluorophenyl)-1-(3-methoxypropyl)-2,4-dioxo-1,2,3,4-tetrahydropyrimidin-5-formate

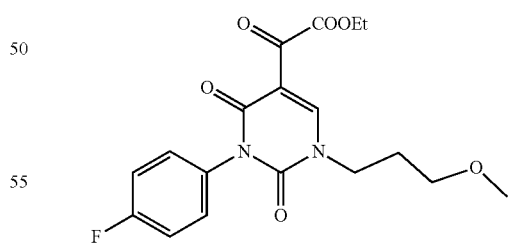

Methyl iodide was replaced with 3-bromopropyl methyl ether, and the remaining required raw materials, reagents and preparation methods were the same as step 3 in Example 1 to obtain a product with a yield of 96%.

$^1$H NMR (300 MHz, CDCl$_3$) δ 8.34 (s, 1H), 7.16 (d, J=7.0 Hz, 4H), 4.33 (q, J=7.1 Hz, 2H), 4.00 (t, J=6.6 Hz, 2H), 3.44 (t, J=5.6 Hz, 2H), 3.34 (s, 3H), 2.01 (p, J=6.2 Hz, 2H), 1.35 (t, J=7.1 Hz, 3H).

Step 2: Preparation of 3-(4-fluorophenyl)-1-(3-methoxypropyl)-2,4-dioxo-1,2,3,4-tetrahydropyrimidin-5-carboxylic acid

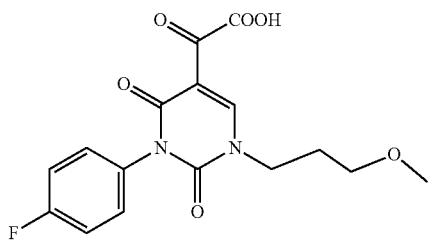 [SMILES: COCCCn1cc(C(=O)C(=O)O)c(=O)n(-c2ccc(F)cc2)c1=O]

Ethyl 3-(4-fluorophenyl)-1-methyl-2,4-dioxo-1,2,3,4-tetrahydropyrimidin-5-formate was replaced with ethyl 3-(4-fluorophenyl)-1-(3-methoxypropyl)-2,4-dioxo-1,2,3,4-tetrahydropyrimidin-5-formate, and the remaining required raw materials, reagents and preparation methods were the same as step 4 in Example 1 to obtain a product with a yield of 52%.

$^1$H NMR (400 MHz, DMSO-$d_6$) δ 12.62 (s, 1H), 8.72 (s, 1H), 7.35 (d, J=6.7 Hz, 4H), 3.98 (t, J=7.5 Hz, 2H), 3.40 (t, J=5.1 Hz, 2H), 3.23 (s, 3H), 1.89 (p, 2H).

Step 3: Preparation of N-(3-fluoro-4-((2-(1-methyl-1H-pyrazol-4-yl)pyridin-4-yl)oxy)phenyl)-3-(4-fluorophenyl)-1-(3-methoxypropyl)-2,4-dioxo-1,2,3,4-tetrahydropyrimidin-5-carboxamide 3-(4-fluorophenyl)-1-methyl-2,4-dioxo-1,2,3,4-tetrahydropyrimidin-5-carboxylic acid was replaced with 3-(4-fluorophenyl)-1-(3-methoxypropyl)-2,4-dioxo-1,2,3,4-tetrahydropyrimidin-5-carboxylic acid, and the remaining required raw materials, reagents and preparation methods were the same as step 7 in Example 1 to obtain a product with a yield of 60%.

$^1$H NMR (400 MHz, DMSO-$d_6$) δ 11.02 (s, 1H), 8.80 (s, 1H), 8.38 (d, J=5.7 Hz, 1H), 8.27 (s, 1H), 7.98 (dd, J=12.8, 2.4 Hz, 1H), 7.98 (s, 1H), 7.55-7.48 (m, 1H), 7.47-7.32 (m, 5H), 7.25 (d, J=2.4 Hz, 1H), 6.65 (dd, J=5.8, 2.4 Hz, 1H), 4.05 (t, J=6.8 Hz, 2H), 3.86 (s, 3H), 3.42 (t, J=6.0 Hz, 2H), 3.25 (s, 3H), 1.93 (p, J=6.4 Hz, 2H).

Example 56

4-(4-fluorophenyl)-2-isopropyl-N-(4-((3-(1-methyl-1H-pyrazol-4-yl)pyridin-4-yl)oxy)phenyl)-3,5-dioxo-2,3,4,5-tetrahydro-1,2,4-triazin-6-carboxamide

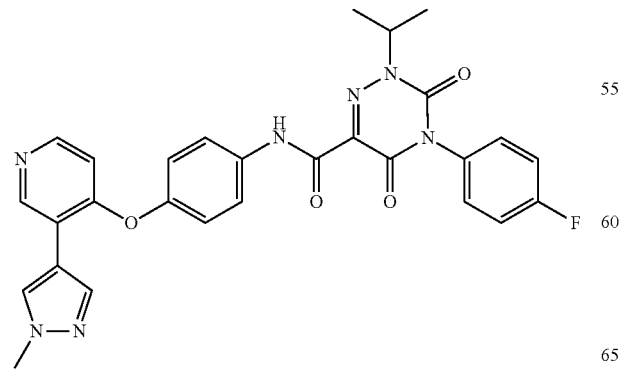

3-fluoro-4-((2-(1-methyl-1H-pyrazol-4-yl)pyridin-4-yl)oxy) aniline was replaced with 4-((3-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 4-(4-fluorophenyl)-2-isopropyl-3,5-dioxo-2,3,4,5-tetrahydro-1,2,4-triazin-6-carboxylic acid, and the remaining required raw materials, reagents and preparation methods were the same as step 7 in Example 1 to obtain a product with a yield of 60%.

$^1$H NMR (400 MHz, DMSO-$d_6$) δ 10.70 (s, 1H), 8.85 (s, 1H), 8.27-8.20 (m, 2H), 8.01 (s, 1H), 7.83-7.73 (m, 2H), 7.47-7.32 (m, 4H), 7.20 (d, J=9.0 Hz, 2H), 6.70 (d, J=5.6 Hz, 1H), 4.88 (p, J=6.6 Hz, 1H), 3.87 (s, 3H), 1.36 (d, J=6.6 Hz, 6H).

Example 57

N-(3-chloro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide

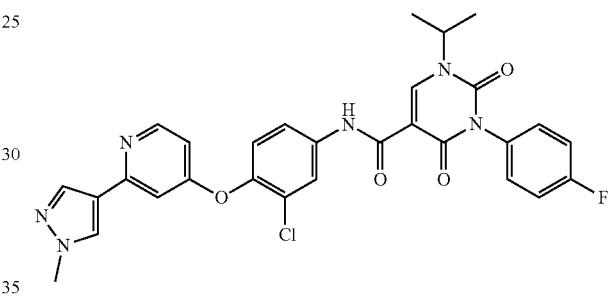

Step 1: Preparation of 3-chloro-4-((2-(1-methyl-1H-pyrazol-4-yl)pyridin-4-yl)oxy)aniline

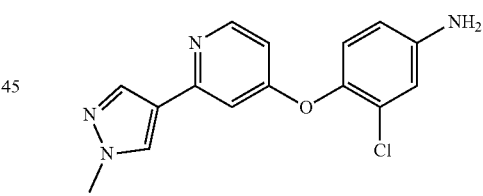

4-amino-2-fluorophenol was replaced with 4-amino-2-chlorophenol, and the remaining required raw materials, reagents and preparation methods were the same as steps 5 to 6 in Example 1 to obtain a product with a yield of 91%.

$^1$H NMR (400 MHz, CDCl$_3$) δ 8.35 (d, J=5.8 Hz, 1H), 7.86 (d, J=4.2 Hz, 2H), 6.98-6.90 (m, 2H), 6.79 (d, J=2.7 Hz, 1H), 6.60 (dd, J=8.6, 2.7 Hz, 1H), 6.55 (dd, J=5.7, 2.4 Hz, 1H), 3.92 (s, 3H), 3.81 (s, 2H).

Step 2: Preparation of N-(3-chloro-4-((2-(1-methyl-1H-pyrazol-4-yl)pyridin-4-yl)oxy)phenyl)-3-(4-fluorophenyl)-1-isopropyl-2,4-dioxo-1,2,3,4-tetrahydropyrimidin-5-carboxamide 3-fluoro-4-((2-(1-methyl-1H-pyrazol-4-yl)pyridin-4-yl) oxy) aniline was replaced with 3-chloro-4-((2-(1-methyl-1H-pyrazol-4-yl)pyridin-4-pyridin)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 59%.

$^1$H NMR (400 MHz, Acetone-$d_6$) δ 11.05 (s, 1H), 8.66 (s, 1H), 8.37 (d, J=5.7 Hz, 1H), 8.23 (d, J=2.5 Hz, 1H), 8.11 (s, 1H), 7.93 (d, J=0.8 Hz, 1H), 7.66 (dd, J=8.8, 2.6 Hz, 1H), 7.50-7.40 (m, 2H), 7.39-7.26 (m, 3H), 7.14 (d, J=2.4 Hz, 1H), 6.59 (dd, J=5.7, 2.4 Hz, 1H), 4.93 (p, J=6.8 Hz, 1H), 3.90 (s, 3H), 1.50 (d, J=6.8 Hz, 6H).

Example 58

3-(4-fluorophenyl)-1-isopropyl-N-(3-methoxy-4-((2-(1-methyl-1H-pyrazol-4-yl)pyridin-4-yl)oxy)phenyl)-2,4-dioxo-1,2,3,4-tetrahydropyrimidin-5-carboxamide

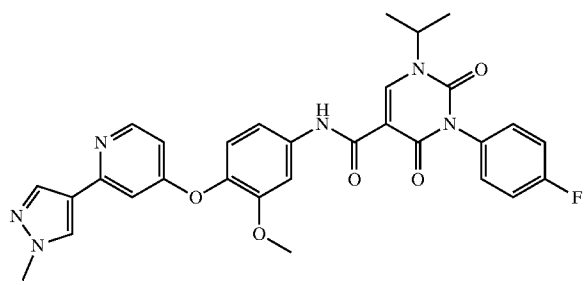 [SMILES: COc1cc(NC(=O)c2cn(C(C)C)c(=O)n(-c3ccc(F)cc3)c2=O)ccc1Oc1ccnc(-c2cnn(C)c2)c1]

Step 1: Preparation of 3-methoxy-4-((2-(1-methyl-1H-pyrazol-4-yl)pyridin-4-yl)oxy)aniline

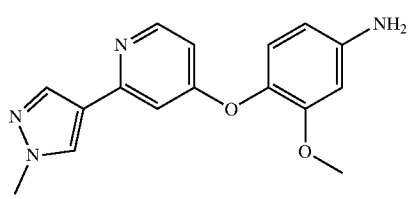 [SMILES: COc1cc(N)ccc1Oc1ccnc(-c2cnn(C)c2)c1]

The 4-amino-2-fluorophenol was replaced with 4-amino-2-methoxy phenol, and the remaining required raw materials, reagents and preparation methods were the same as steps 5 to 6 in Example 1 to obtain a product with a yield of 64%.

$^1$H NMR (400 MHz, CDCl$_3$) δ 8.32 (d, J=5.8 Hz, 1H), 7.88-7.84 (m, 2H), 6.95 (d, J=2.4 Hz, 1H), 6.89 (d, J=8.4 Hz, 1H), 6.57 (dd, J=5.8, 2.4 Hz, 1H), 6.37 (d, J=2.5 Hz, 1H), 6.29 (dd, J=8.4, 2.6 Hz, 1H), 3.93 (s, 3H), 3.74 (s, 3H), 3.72 (s, 2H).

Step 2: Preparation of 3-(4-fluorophenyl)-1-isopropyl-N-(3-methoxy-4-((2-(1-methyl-1H-pyrazol-4-yl)pyridin-4-yl)oxy)phenyl)-2,4-dioxo-1,2,3,4-tetrahydropyrimidin-5-carboxamide 3-fluoro-4-((2-(1-methyl-1H-pyrazol-4-yl)pyridin-4-yl)oxy) aniline was replaced with 3-methoxy-4-((2-(1-methyl-1H-pyrazol-4-yl)pyridin-4-yl)oxy) aniline, 3-(4-fluorophenyl)-1-methyl-2,4-dioxo-1,2,3,4-tetrahydropyrimidin-5-carboxylic acid was replaced with 3-(4-fluorophenyl)-1-isopropyl-2,4-dioxo-1,2,3,4-tetrahydropyrimidin-5-carboxylic acid, and the remaining required raw materials, reagents and preparation methods were the same as step 7 in Example 1 to obtain a product with a yield of 72%.

$^1$H NMR (400 MHz, Acetone-$d_6$) δ 10.96 (s, 1H), 8.66 (s, 1H), 8.30 (d, J=5.7 Hz, 1H), 8.08 (s, 1H), 7.90 (s, 1H), 7.70 (d, J=2.4 Hz, 1H), 7.52-7.38 (m, 3H), 7.38-7.28 (m, 2H), 7.13 (d, J=8.6 Hz, 1H), 7.06 (d, J=2.4 Hz, 1H), 6.53 (dd, J=5.7, 2.4 Hz, 1H), 4.94 (p, J=6.8 Hz, 1H), 3.90 (s, 3H), 3.81 (s, 3H), 1.51 (d, J=6.8 Hz, 6H).

Example 59: Effect of Compound on Kinase Activity at Molecular Level

1. ELISA Method was Used to Detect the Effect of Compounds on Axl and c-Met Kinase Activity
   (1) Enzyme reaction substrate Poly(Glu,Tyr)4:1 was diluted with potassium ion-free PBS (10 mM sodium phosphate buffer, 150 mM NaCl, pH=7.2-7.4) to 20 μg/mL, ELISA plate was coated in 125 μL/well, and reacted at 37° C. for 12-16 hours. The liquid in the well was discarded. The plate was washed with T-PBS (PBS containing 0.1% Tween-20 without potassium ions, 200 μL/well) for three times, 5 minutes each time. The ELISA plate was dried in an oven at 37° C. for 1-2 hours.
   (2) 49 μL of ATP solution diluted with reaction buffer (50 mM HEPES pH=7.4, 50 mM MgCl$_2$, 0.5 mM MnCl$_2$, 0.2 mM Na$_3$VO$_4$, 1 mM DTT) was added to each well, 1 μL of compound to be tested was added to each well, and 50 μL of Axl or c-Met kinase domain recombinant protein diluted with reaction buffer was added to start the reaction. Two wells without ATP as a control were set for each experiment. The reaction was carried out in a 37° C. shaker (100 rpm) for 1 hour. The liquid in the well was discarded and the plate was washed with T-PBS for three times.
   (3) Antibody PY99 diluent (antibody diluted with T-PBS containing BSA 5 mg/mL, diluted in 1:500) was added, 100 μL/well, and the reaction was carried out in a shaker at 37° C. for 0.5 h. The liquid in the well was discarded and the plate was washed with T-PBS for three times.
   (4) Horseradish peroxidase labeled goat anti-mouse secondary antibody diluent (antibody diluted with T-PBS containing BSA 5 mg/mL, diluted in 1:2000) was added, 100 μL/well, and the reaction was carried out in a shaker at 37° C. for 0.5 h. The liquid in the well was discarded and the plate was washed with T-PBS for three times.
   (5) 2 mg/mL of OPD color developing solution (diluted with 0.1M citric acid-sodium citrate buffer (pH=5.4) containing 0.03% H$_2$O$_2$) was added in 100 μL/well, and reacted at 25° C. for 1-10 minutes in the dark.
   (6) 2M H$_2$SO$_4$ 50 μL/well was added to stop the reaction, and wavelength adjustable microplate reader VERSAmax was used to read at a wavelength of 490 nm.
   (7) Analysis of Results Inhibition rate(%) =

$$\left(1 - \frac{OD \text{ value of the compound} - OD \text{ value of the control well without } ATP}{OD \text{ value of the negative control} - OD \text{ value of the control well without } ATP}\right) \times 100\%$$

The IC$_{50}$ value was obtained by four-parameter regression using the software attached to the microplate reader.

2. Experimental Results:

TABLE 2

Inhibitory Activity of Compounds on Axl and c-Met Kinase Activities

| Compound | Axl activity | c-Met activity |
|---|---|---|
| No. 1 | A | A |
| No. 2 | A | A |
| No. 3 | A | A |
| No. 4 | A | A |
| No. 5 | A | A |
| No. 6 | B | B |
| No. 7 | A | A |
| No. 8 | B | B |
| No. 9 | C | B |
| No. 10 | A | A |
| No. 11 | A | A |
| No. 12 | C | C |
| No. 13 | B | B |
| No. 14 | A | A |
| No. 15 | A | A |
| No. 16 | C | C |
| No. 17 | A | A |
| No. 18 | A | B |
| No. 19 | A | A |
| No. 20 | C | C |
| No. 21 | B | C |
| No. 22 | B | C |
| No. 23 | B | B |
| No. 24 | A | B |
| No. 25 | A | A |
| No. 26 | A | A |
| No. 27 | A | B |
| No. 28 | A | A |
| No. 29 | A | A |
| No. 30 | B | NT |
| No. 31 | A | B |
| No. 32 | B | B |
| No. 33 | B | B |
| No. 34 | A | B |
| No. 35 | A | B |
| No. 36 | A | B |
| No. 37 | A | B |
| No. 38 | A | A |
| No. 39 | A | B |
| No. 40 | C | C |
| No. 41 | A | A |
| No. 42 | A | A |
| No. 43 | NT | NT |
| No. 44 | A | B |
| No. 45 | B | C |
| No. 46 | NT | NT |
| No. 47 | NT | NT |
| No. 48 | A | B |
| No. 49 | NT | NT |
| No. 50 | A | B |
| No. 51 | A | A |
| No. 52 | B | B |
| No. 53 | C | C |
| No. 54 | B | B |
| No. 55 | B | B |
| No. 56 | C | NT |
| No. 57 | B | NT |
| No. 58 | C | NT | wherein
A indicates that the IC$_{50}$ is less than (≤)10 nM
B indicates that the IC$_{50}$ is less than (≤)100 nM and greater than (>)10 nM
C indicates that IC$_{50}$ is greater than (>) 100 nM
"NT" means not tested.

As can be seen from Table 2, the compounds of the present invention have a significant inhibitory effect on Axl kinase and c-Met kinase at a concentration of nM.

Example 60: Compound Activity at Cell Level

1. BaF3-TEL-AXL Cell Proliferation Effect Assay

TEL-AXL fusion protein in BaF3-TEL-AXL cells was expressed in the cytoplasm and was an Axl-dependent sensitive cell line. BaF3 background cells did not have the ability to proliferate and survive, and can only proliferate and survive after the addition of IL-3.

The inhibitory effect of the compound on the proliferation of BaF3-TEL-AXL cells was detected by the CCK-8 Cell Counting Kit (Dojindo). The specific steps were as follows: the BaF3-TEL-AXL cells in the logarithmic growth phase were inoculated into the 96-well culture plate at a appropriate density, after being cultured overnight, different concentrations of compounds were added for 72 hours, and a solvent control group (negative control) was set. After the compound had acted on the cells for 72 hours, the effect of the compound on cell proliferation was detected by CCK-8 cell counting kit (Dojindo), 10 μL CCK-8 reagent was added to each well, placed in an incubator at 37° C. for 2-4 hours, and the full wavelength microplate reader SpectraMax 190 was used to read, and the measurement wavelength was 450 nm.

The inhibition rate of the compound on the growth of tumor cells was calculated by the following formula (%):

Inhibition rate (%)=(OD of control well−OD of administration well)/OD of control well×100%

The IC$_{50}$ value was obtained by four-parameter regression using the software attached to the microplate reader.

2. MKN45 Cell Proliferation Effect Assay

MKN45 is a gastric cancer cell line. MET gene amplification leads to continuous activation of Met cell line, which is a c-Met-dependent tumor cell line.

The inhibitory effect of the compound on the proliferation of MKN45 cells was detected by sulforhodamine B (SRB) protein staining method. The specific steps were as follows: MKN45 cells in the logarithmic growth phase are inoculated into a 96-well culture plate at an appropriate density. After being cultured overnight, compounds of different concentrations were added for 72 hours. Three duplicate wells for each concentration, and a solvent control group (Negative control) were set. After the action was over, the culture solution was discarded, 10% (w/v) trichloroacetic acid (100 μL/well) was added, and fixed at 4° C. for 1 hour, then washed with distilled water for five times. After drying at room temperature, 100 μL of SRB solution was added to each well, incubated and dyed at room temperature for 15 min, washed off the unbound SRB with 1% glacial acetic acid. After drying at room temperature, 10 mM Tris solution was added to each well, and full wavelength microplate SpectraMax 190 was used to test OD value at the wavelength of 515 nm.

The inhibition rate of the compound on the growth of tumor cells was calculated by the following formula (%):

Inhibition rate (%)=(OD of control well−OD of administration well)/OD of control well×100%

The IC$_{50}$ value was obtained by four-parameter regression using the software attached to the microplate reader.

3. Test Results:

Several compounds in the examples were tested according to the cell proliferation effect assay, and the results showed that the IC$_{50}$ value of compounds No. 41, No. 50 and other compounds on BaF3-TEL-AXL cell proliferation inhibition was less than 10 nM, and the IC$_{50}$ value of MKN45 cell proliferation inhibition was less than 100 nM.

From the above test results, it can be seen that the compound of the present invention has a significant inhibitory effect on the proliferation activity of Axl-dependent cell lines and c-Met-dependent cell lines.

All literatures mentioned in the present invention are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:

1. A compound of formula (I) or its stereoisomer, geometric isomer, tautomer, its pharmaceutically acceptable salt, its hydrate or solvate,

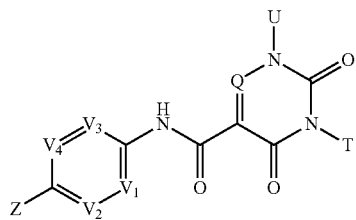

(I)

wherein, T is selected from the group consisting of substituted or unsubstituted 5-10 membered aryl; the "substituted" means that one or more hydrogen atoms on the group is substituted by a substituent selected from the group consisting of unsubstituted C1-C6 alkyl, unsubstituted C3-C8 cycloalkyl, or halogen;

U is selected from the group consisting of substituted or unsubstituted C1-C6 alkyl, substituted or unsubstituted C2-C6 alkenyl, substituted or unsubstituted C2-C6 alkynyl; the "substituted" means that one or more hydrogen atoms on the group is substituted by a substituent selected from the group consisting of unsubstituted C1-C6 alkoxy;

Q is selected from N or C—$R^c$;

V1, V2, V3 and V4 are the same or different, and are each independently C—$R^d$;

$R^c$ is H;

$R^d$ is selected from the group consisting of H, unsubstituted C1-C6 alkyl, or halogen;

Z is formula (V):

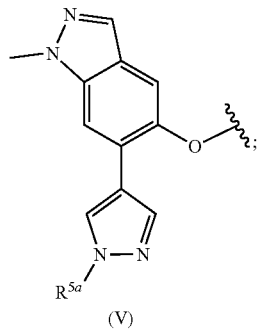

(V)

wherein $R^{5a}$ is at each occurrence independently selected from the group consisting of H, unsubstituted C1-C6 alkyl, unsubstituted C2-C6 alkenyl, or unsubstituted C2-C6 alkynyl;

or the compound having formula (I) has formula (VI) or formula (VII):

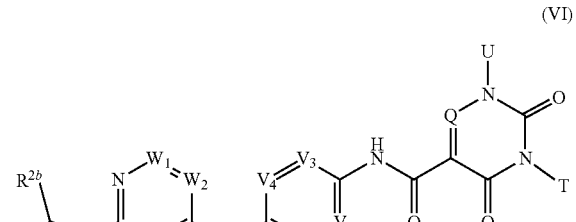

(VI)

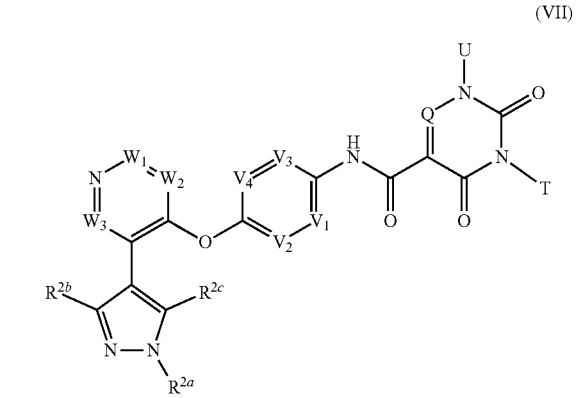

(VII)

wherein $R^{2a}$, $R^{2b}$ and $R^{2c}$ are at each occurrence independently selected from the group consisting of H, unsubstituted C1-C6 alkyl, unsubstituted C2-C6 alkenyl, unsubstituted C2-C6 alkynyl, unsubstituted-$(CH_2)_t$—(C3-C11 cycloalkyl), unsubstituted —$(CH_2)_t$-(3-11 membered heterocycloalkyl), and unsubstituted-$(CH_2)_t$—$OR^{2d}$;

$R^{2d}$ is H;

W1, W2, W3, and W4 are at each occurrence independently selected from C—$R^{1a}$;

each $R^{1a}$ is H;

each t is independently selected from 0, 1, 2, 3, or 4;

or the compound having formula (I) has formula (XI) or formula (XII):

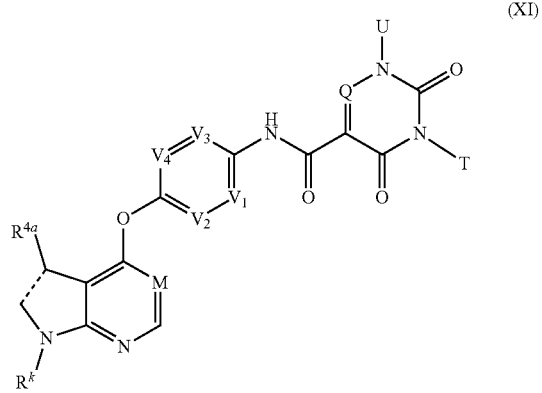

(XI)

135
-continued

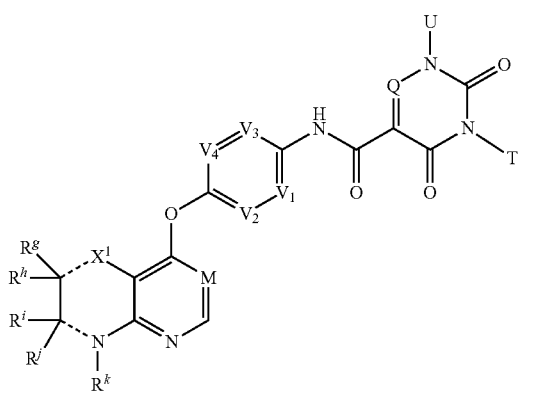

(XII)

wherein $X^1$ is N or O;
$R^{4a}$ is selected from the group consisting of H, halogen, and unsubstituted C1-C6 alkyl;
$R^g$, $R^h$, $R^i$, $R^j$ are at each occurrence independently H;
for compound (XI), dotted line is a double bond;
for compound (XII), dotted line is a single bond;
M is C—H or N;
$R^k$ is at each occurrence independently selected from the group consisting of H, unsubstituted C1-C6 alkyl, unsubstituted C2-C6 alkenyl, or unsubstituted C2-C6 alkynyl.

2. The compound or its stereoisomer, geometric isomer, tautomer, its pharmaceutically acceptable salt, its hydrate or solvate of claim 1, wherein, the compound has formula (VI):

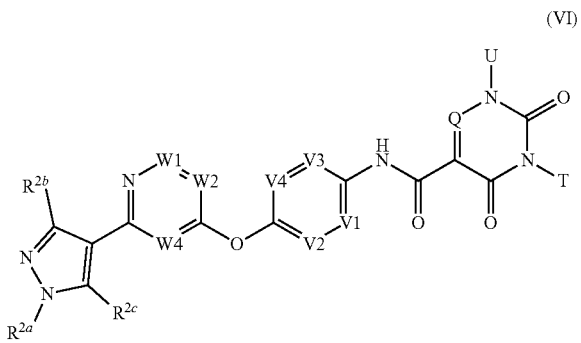

(VI)

136

3. The compound or its stereoisomer, geometric isomer, tautomer, its pharmaceutically acceptable salt, its hydrate or solvate of claim 1, wherein, the compound has formula (XI):

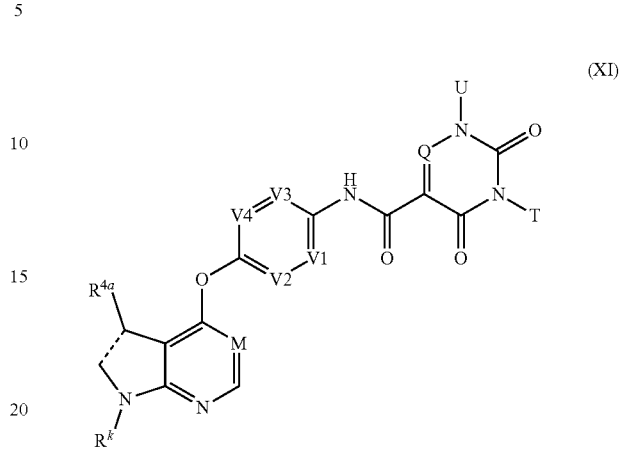

(XI)

4. The compound or its stereoisomer, geometric isomer, tautomer, its pharmaceutically acceptable salt, its hydrate or solvate of claim 1, wherein Q is C—H.

5. The compound or its stereoisomer, geometric isomer, tautomer, its pharmaceutically acceptable salt, its hydrate or solvate of claim 1, wherein T is selected from the group consisting of substituted or unsubstituted 5-10 membered aryl; the "substituted" means that one or more hydrogen atoms on a group is substituted by a substituent selected from the group consisting of unsubstituted C1-C6 alkyl, or halogen.

6. A pharmaceutical composition comprising a pharmaceutically acceptable carrier and one or more therapeutically effective amounts of the compound or its stereoisomer, geometric isomer, tautomer, its pharmaceutically acceptable salt, its hydrate or solvate of claim 1.

7. A compound or its stereoisomer, geometric isomer, tautomer, its pharmaceutically acceptable salt, its hydrate or solvate, wherein, the compound is selected from the group consisting of:

| Compound | Structural formula |
|---|---|
| No. 1 | ![structure] |

| Compound | Structural formula |
|---|---|
| No. 2 | 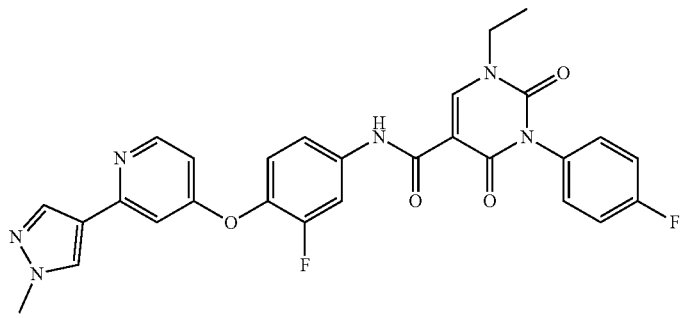 [SMILES: CCn1cc(C(=O)Nc2ccc(Oc3ccnc(-c4cnn(C)c4)c3)c(F)c2)c(=O)n(-c2ccc(F)cc2)c1=O] |
| No. 3 | 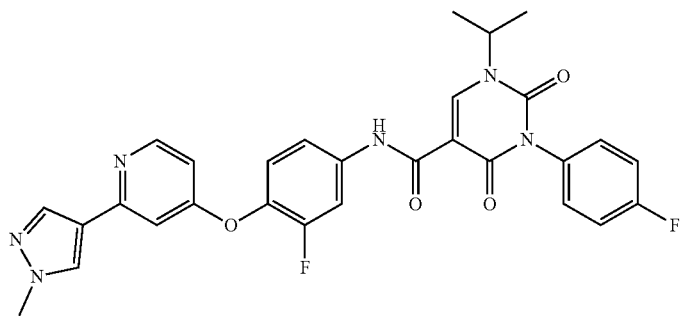 [SMILES: CC(C)n1cc(C(=O)Nc2ccc(Oc3ccnc(-c4cnn(C)c4)c3)c(F)c2)c(=O)n(-c2ccc(F)cc2)c1=O] |
| No. 4 | 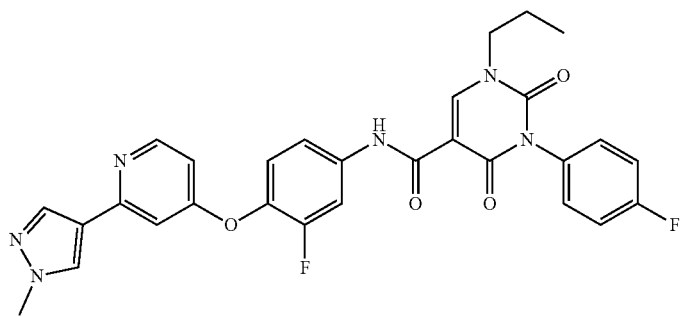 |
| No. 5 | 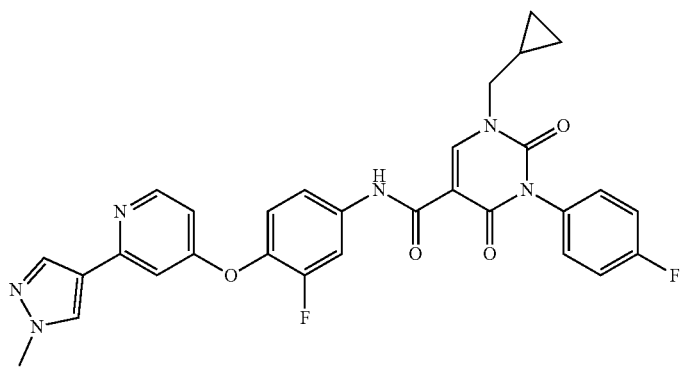 [SMILES: Cn1cc(-c2cc(Oc3ccc(NC(=O)c4cn(CC5CC5)c(=O)n(-c5ccc(F)cc5)c4=O)cc3F)ccn2)cn1] |

-continued
| Compound | Structural formula |
|---|---|
| No. 7 | 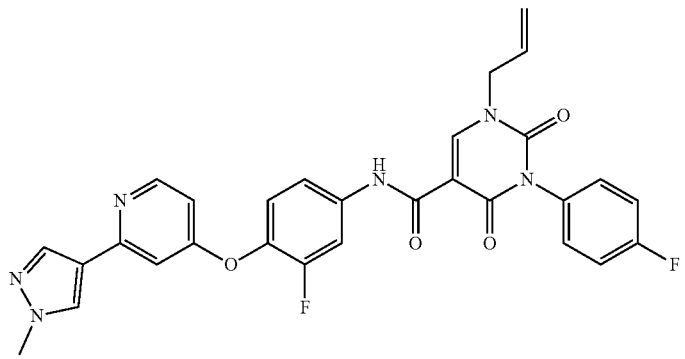 [SMILES: C=CCn1cc(C(=O)Nc2ccc(Oc3ccnc(-c4cnn(C)c4)c3)c(F)c2)c(=O)n(-c2ccc(F)cc2)c1=O] |
| No. 10 | 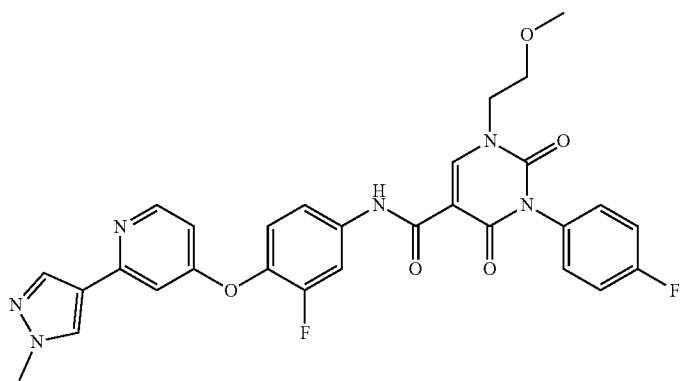 [SMILES: COCCn1cc(C(=O)Nc2ccc(Oc3ccnc(-c4cnn(C)c4)c3)c(F)c2)c(=O)n(-c2ccc(F)cc2)c1=O] |
| No. 11 | 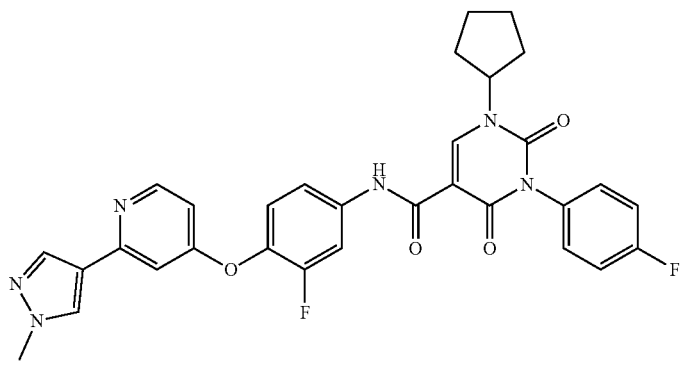 [SMILES: Cn1cc(-c2cc(Oc3ccc(NC(=O)c4cn(C5CCCC5)c(=O)n(-c5ccc(F)cc5)c4=O)cc3F)ccn2)cn1] |
| No. 14 | 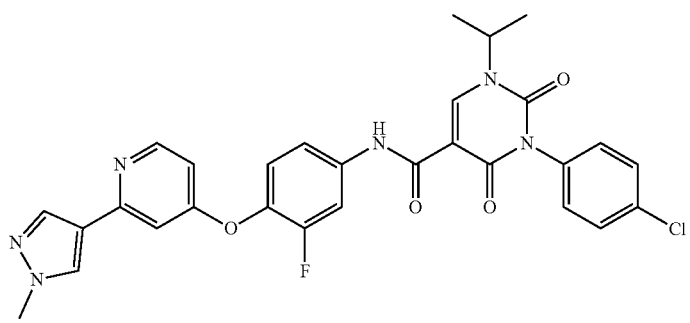 [SMILES: CC(C)n1cc(C(=O)Nc2ccc(Oc3ccnc(-c4cnn(C)c4)c3)c(F)c2)c(=O)n(-c2ccc(Cl)cc2)c1=O] |

-continued

| Compound | Structural formula |
|---|---|
| No. 15 | |
| No. 17 | |
| No. 19 | |
| No. 25 | |
| No. 26 | |

| Compound | Structural formula |
|---|---|
| No. 28 | 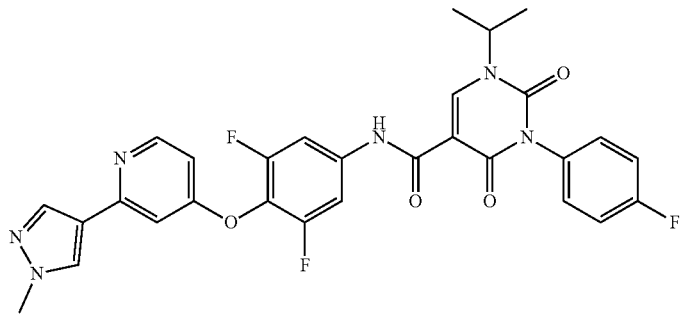 [SMILES: CC(C)n1cc(C(=O)Nc2cc(F)c(Oc3ccnc(-c4cnn(C)c4)c3)c(F)c2)c(=O)n(-c2ccc(F)cc2)c1=O] |
| No. 29 | 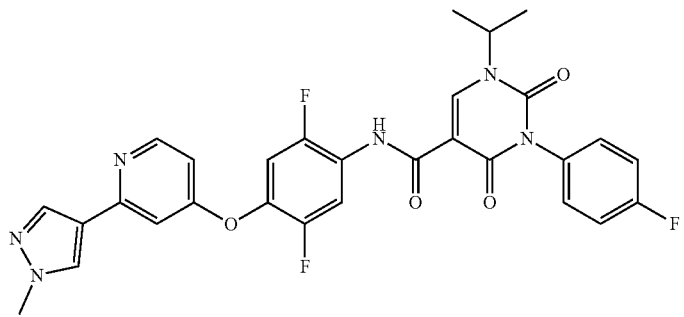 [SMILES: CC(C)n1cc(C(=O)Nc2cc(F)c(Oc3ccnc(-c4cnn(C)c4)c3)cc2F)c(=O)n(-c2ccc(F)cc2)c1=O] |
| No. 38 | 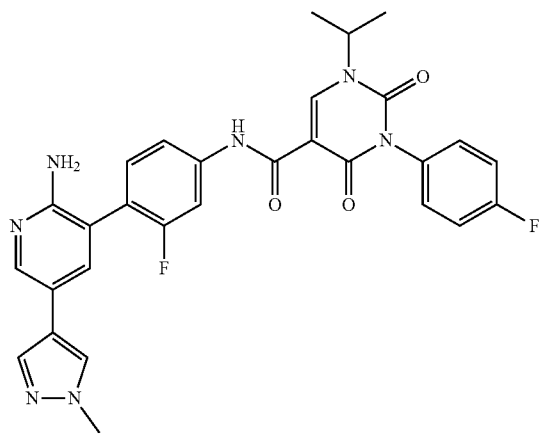 [SMILES: CC(C)n1cc(C(=O)Nc2ccc(-c3cc(-c4cnn(C)c4)cnc3N)c(F)c2)c(=O)n(-c2ccc(F)cc2)c1=O] |
| No. 41 | 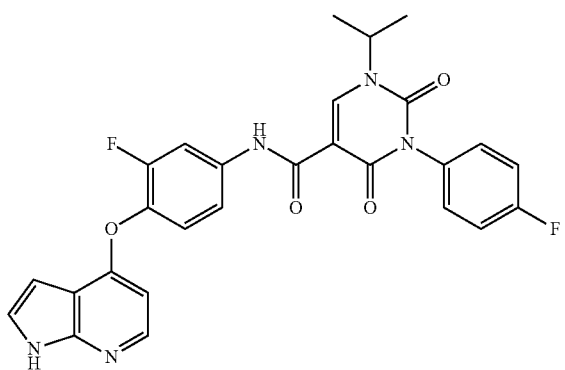 [SMILES: CC(C)n1cc(C(=O)Nc2ccc(Oc3ccnc4[nH]ccc34)c(F)c2)c(=O)n(-c2ccc(F)cc2)c1=O] |

| Compound | Structural formula |
|---|---|
| No. 42 | (structure) |
| No. 51 | (structure) |

* * * * *